US007773065B2

(12) United States Patent
Kumamoto

(10) Patent No.: US 7,773,065 B2
(45) Date of Patent: Aug. 10, 2010

(54) LIQUID CRYSTAL DISPLAY AND ITS LIGHT SOURCE DRIVING METHOD

(75) Inventor: Yasuhiro Kumamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 874 days.

(21) Appl. No.: 11/631,785

(22) PCT Filed: Jun. 29, 2005

(86) PCT No.: PCT/JP2005/011959

§ 371 (c)(1),
(2), (4) Date: Jan. 8, 2007

(87) PCT Pub. No.: WO2006/006404

PCT Pub. Date: Jan. 19, 2006

(65) Prior Publication Data

US 2008/0074381 A1 Mar. 27, 2008

(30) Foreign Application Priority Data

Jul. 13, 2004 (JP) ............................. 2004-205637
Feb. 15, 2005 (JP) ............................. 2005-037929

(51) Int. Cl.
G09G 3/36 (2006.01)
(52) U.S. Cl. ........................................ 345/87; 345/102
(58) Field of Classification Search ............. 345/38–39, 345/42, 44, 46, 47, 82–84, 87–92, 98–99, 345/102, 204, 208, 214
See application file for complete search history.

(56) References Cited

U.S. PATENT DOCUMENTS 5,844,540 A * 12/1998 Terasaki ..................... 345/102

(Continued)

FOREIGN PATENT DOCUMENTS

JP 7-325286 12/1995

(Continued)

OTHER PUBLICATIONS

Taiichiro Kurita, "Picture Quality of Hold Type Display for Moving Images", A paper of Technical Report of IEICE, the Institute of Electronics, Information and Communication Engineers, EID99-10, pp. 55-60 (Jun. 1999) (along with English abstract).

(Continued)

Primary Examiner—Richard Hjerpe
Assistant Examiner—Mansour M Said
(74) Attorney, Agent, or Firm—Wenderoth, Lind & Ponack, L.L.P.

(57) ABSTRACT

A black insertion dimming PWM generation portion (32) outputs a black insertion PWM pulse VBL to drive a fluorescent lamp (43) in such a manner that a black insertion period during which the fluorescent lamp (43) is lit OFF and a light-ON period during which the fluorescent lamp (43) is lit ON are provided within one vertical period. A luminance dimming PWM generation portion (31) outputs a dimming PWM pulse Vpwm1 to PWM-drive the fluorescent lamp (43) so as to be lit ON and lit OFF repetitively during the light-ON period. An AND circuit (33) outputs an inverter driving signal Vout1 generated by superimposing the dimming PWM pulse Vpwm1 and the black insertion PWM pulse VBL. An inverter (42) drives the fluorescent lamp (43) by applying a voltage corresponding to the inverter driving signal Vout1 to the fluorescent lamp (43).

11 Claims, 40 Drawing Sheets

U.S. PATENT DOCUMENTS

| | | | |
|---|---|---|---|
| 6,456,266 B1 | 9/2002 | Iba et al. | |
| 6,980,225 B2 * | 12/2005 | Funamoto et al. | 345/691 |
| 7,106,294 B2 * | 9/2006 | Kumamoto et al. | 345/102 |
| 7,417,616 B2 * | 8/2008 | Min et al. | 345/102 |
| 7,550,932 B2 * | 6/2009 | Kung et al. | 315/307 |
| 2002/0000960 A1 | 1/2002 | Yoshihara et al. | |
| 2002/0057238 A1 | 5/2002 | Nitta et al. | |
| 2002/0057241 A1 | 5/2002 | Oda et al. | |

FOREIGN PATENT DOCUMENTS

| | | |
|---|---|---|
| JP | 8-500915 | 1/1996 |
| JP | 11-202285 | 7/1999 |
| JP | 11-202286 | 7/1999 |
| JP | 2000-19487 | 1/2000 |
| JP | 2001-296838 | 10/2001 |
| JP | 2002-156950 | 5/2002 |

OTHER PUBLICATIONS

Supplementary European Search Report issued Jul. 14, 2009 in corresponding European Application No. 05 75 5737.

* cited by examiner

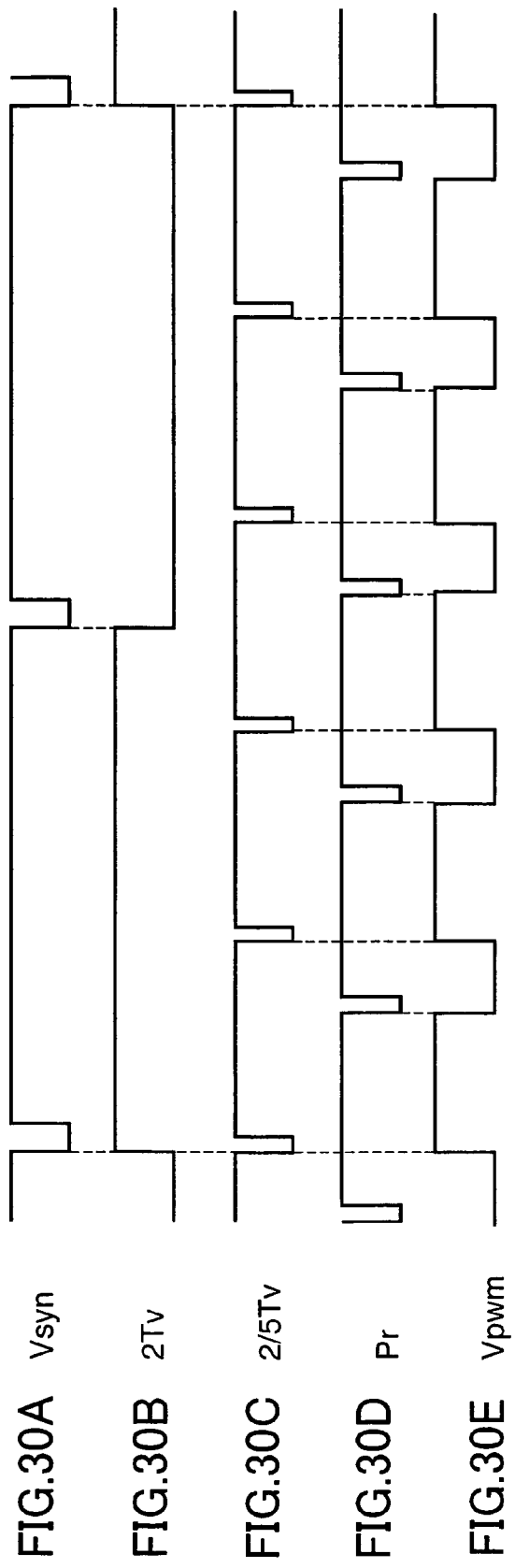
FIG.30A Vsyn
FIG.30B 2Tv
FIG.30C 2/5Tv
FIG.30D Pr
FIG.30E Vpwm

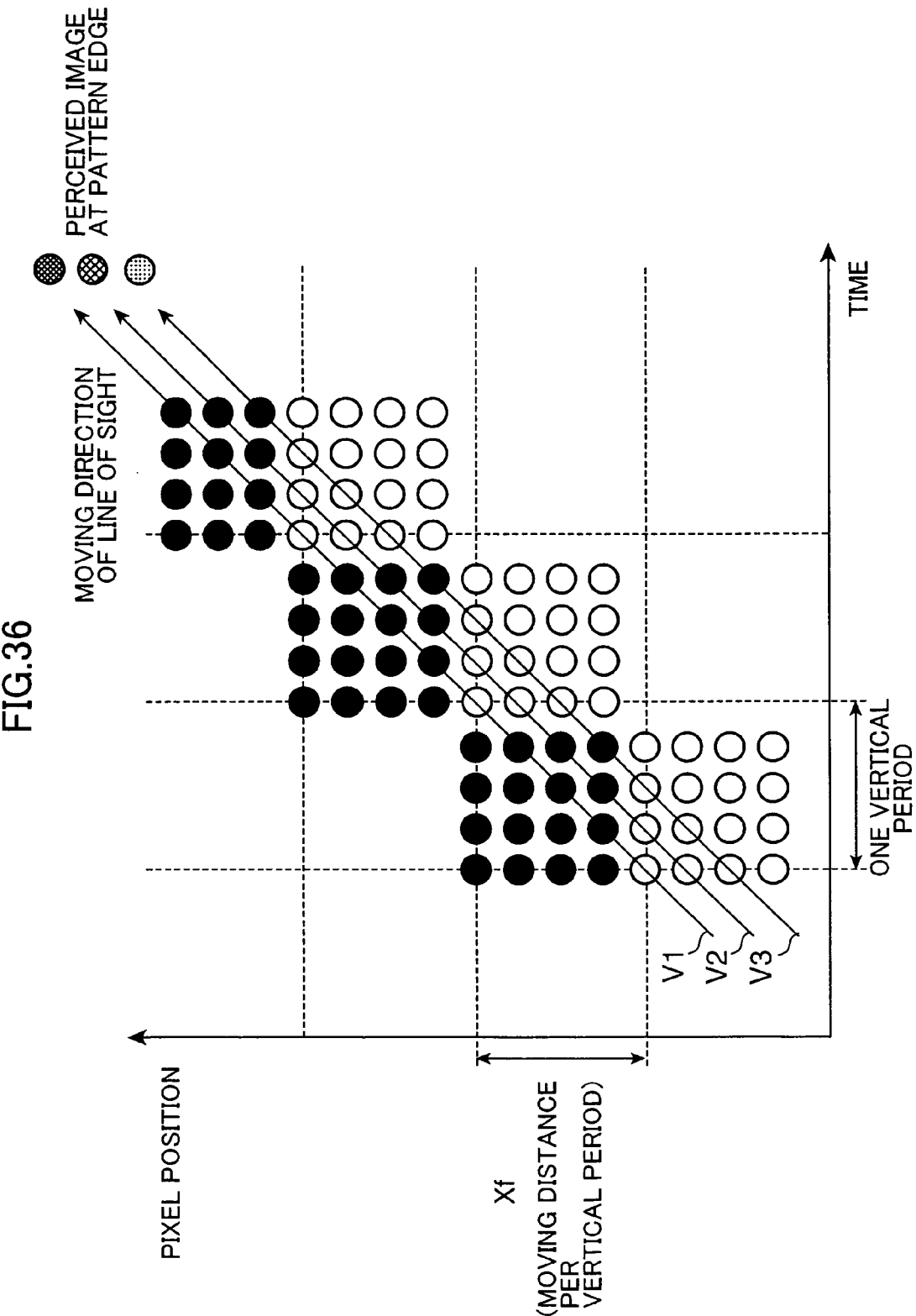

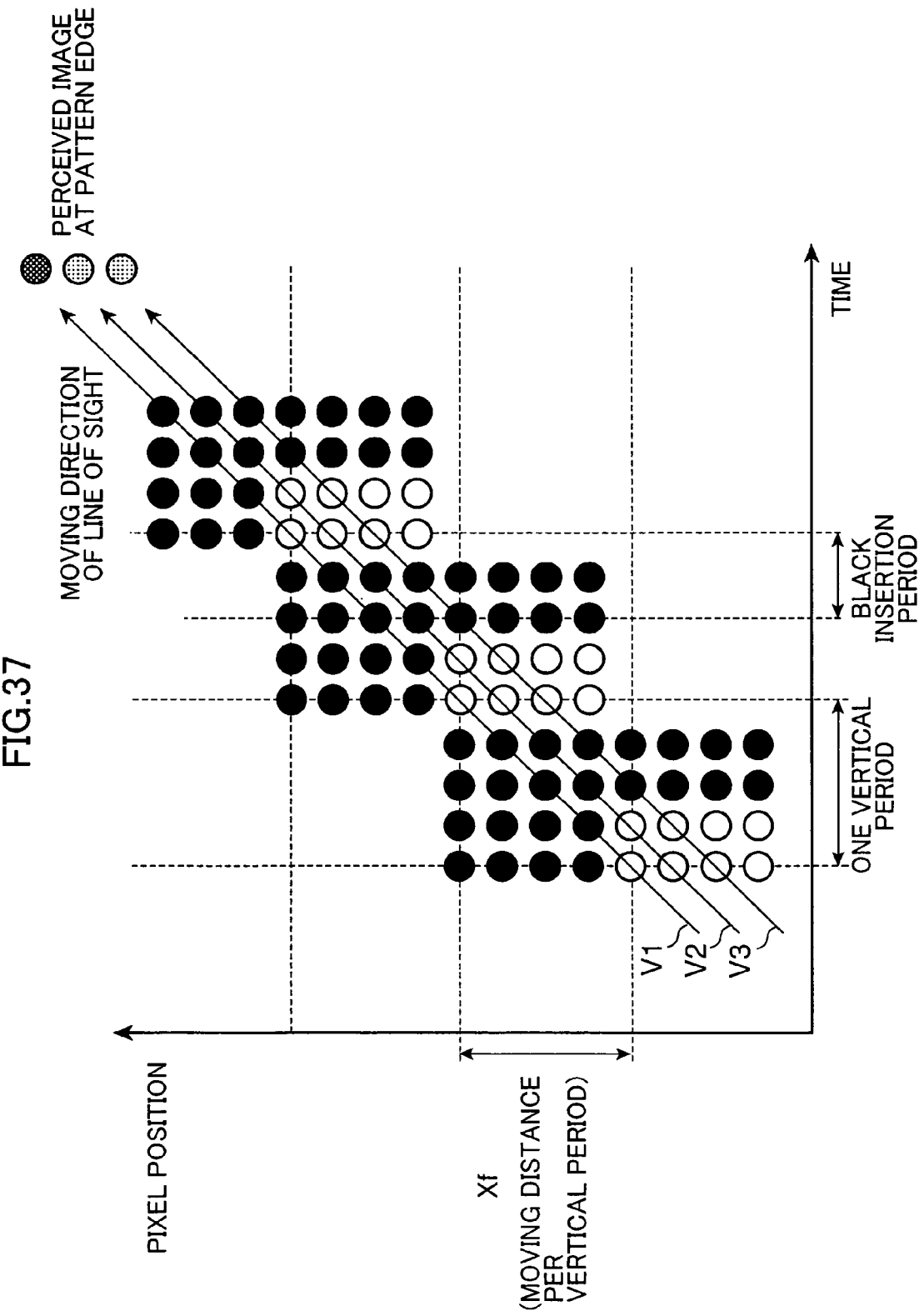

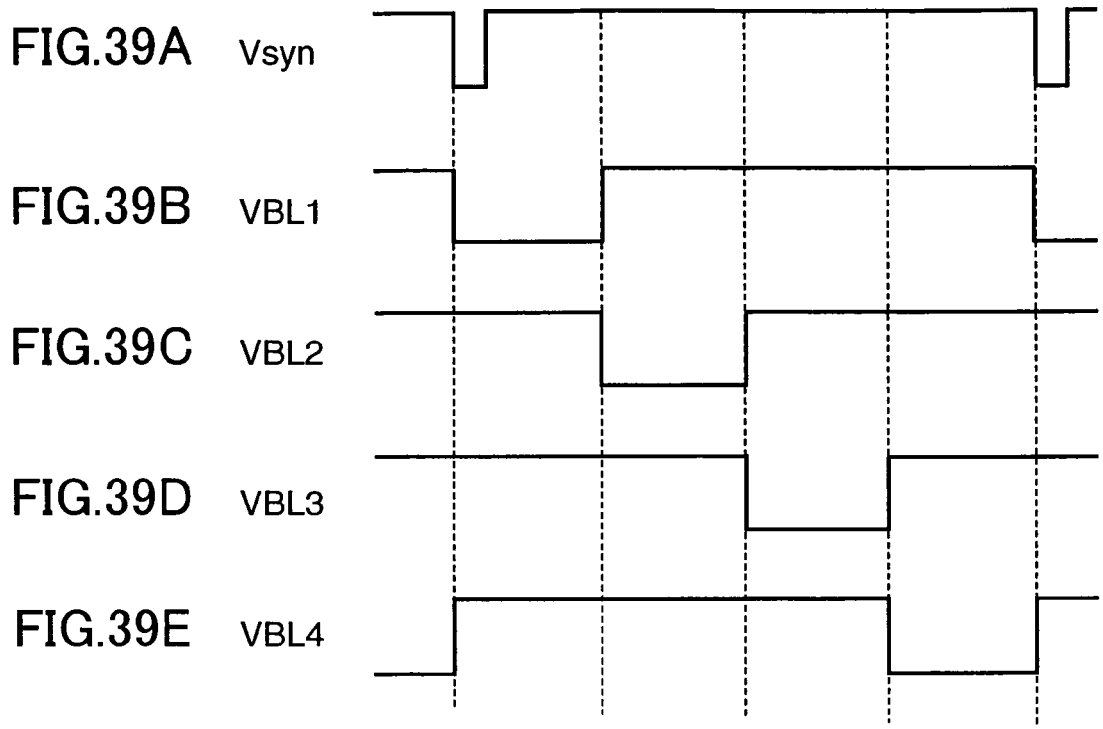

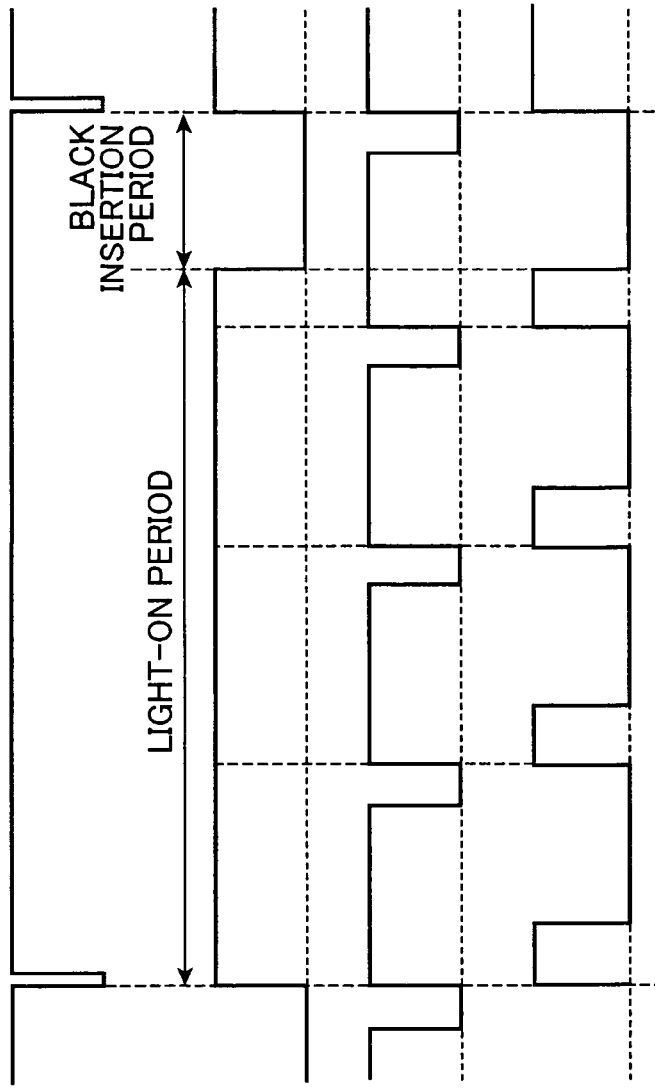

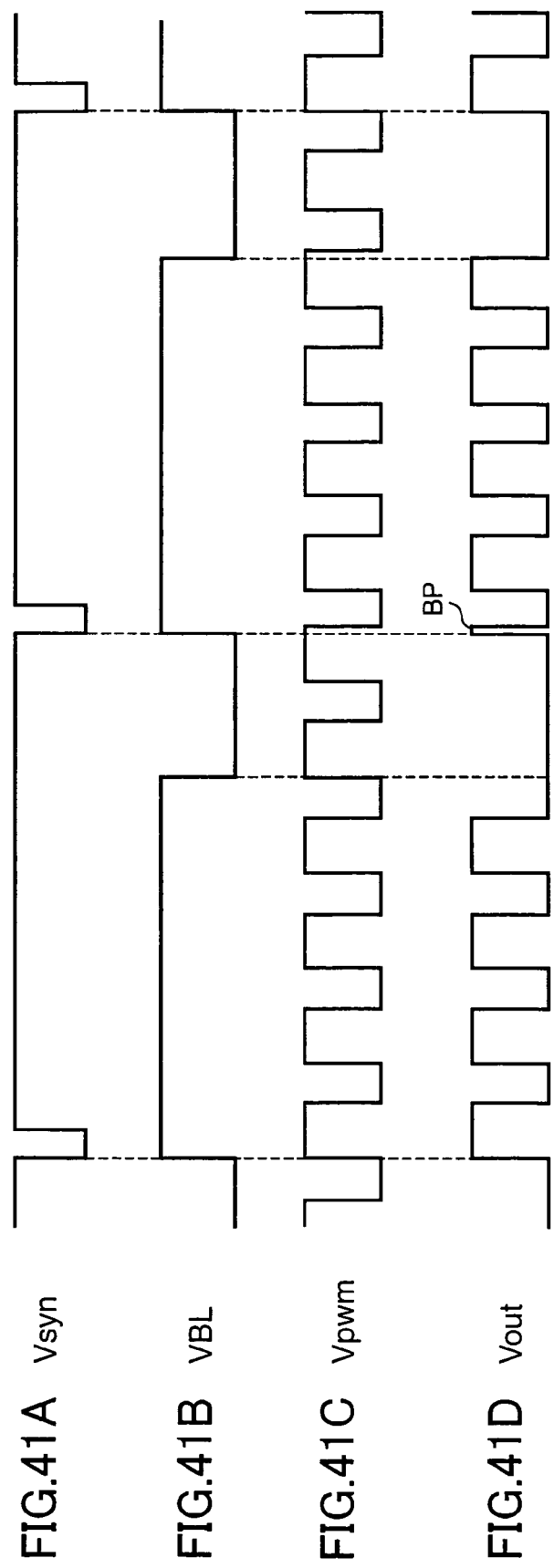

US 7,773,065 B2

LIQUID CRYSTAL DISPLAY AND ITS LIGHT SOURCE DRIVING METHOD

TECHNICAL FIELD

The present invention relates to a liquid crystal display equipped with a light source provided on the back surface of the liquid crystal panel and a driving method of the light source, and more particularly, to a liquid crystal display that performs dimming by blinking the light source periodically while varying a time ratio of a light-ON period and a light-OFF period.

BACKGROUND ART

A liquid crystal display comprises a liquid crystal panel and a backlight portion equipped with a light source provided on the back surface thereof. Each pixel in the liquid crystal panel transmits light emitted from the backlight portion as the liquid crystals are driven according to a video signal so that an image is displayed on the liquid crystal panel.

Generally, a fluorescent tube (fluorescent lamp) is used often as the light source in the backlight portion. In the fluorescent tube, a hollow glass tube is filled with a discharge gas, mercury, and the like. A discharge occurs as a high voltage is applied to the electrode tubes disposed at the both ends of the fluorescent tube. A vapor of mercury inside the tube is excited by receiving high energy generated by this discharge, and a UV ray is emitted when the vapor of mercury returns to a low energy state again. Also, a fluorescent material is applied on the interior of the tube, and light is emitted when the UV ray is changed to a visible ray.

As has been described, it is necessary to apply a high voltage to cause the fluorescent tube to emit light. Generally, DC power at a low voltage is converted to AC power at a high voltage and a high frequency (about 30 kHz to 100 kHz) using a power supply circuit known as an inverter and applied to the fluorescent tube.

The voltage dimming method and the PWM (Pulse Width Modulation) dimming method are used as a method in the related art for dimming the fluorescent tube using the inverter. The voltage dimming method is a dimming method by which a voltage applied to the fluorescent tube is varied via the inverter. However, a discharge becomes unstable when an applied voltage to the fluorescent tube is lowered exceedingly. Hence, a stable dimming ratio in the voltage dimming method is 2 to 3:1, which makes it impossible to secure a broad dimming range.

Meanwhile, the PWM dimming method is a method of performing dimming by blinking the light source periodically while varying a time ratio of the light-ON period and the light-OFF period. Hence, by choosing the blinking cycles appropriately, it is possible to achieve a dimming ratio of 100:1. The PWM dimming method is therefore adopted in many liquid crystal displays to control the backlight.

When the PWM dimming method is used, however, a flicker (flickering) occurs because the display driving cycle of the liquid crystal panel does not coincide with the blinking cycle of the light source in the backlight portion, and the luminance becomes unstable. This makes a flicker noticeable in some images displayed on the liquid crystal panel. Regarding a flicker, human eyes are insensitive to a flicker when a flickering frequency is high to some extent. In a case where the PWM dimming method is applied to a liquid crystal display that is equipped with the backlight and displays a video signal on the screen according to a horizontal synchronization signal and a vertical synchronization signal, in order to prevent a flicker, it is necessary to set the PWM dimming frequency fPWM sufficiently larger than a vertical synchronization frequency fV of the liquid crystal panel to establish fPWM>>fV. When configured in this manner, it is possible to prevent the occurrence of a flicker even when the PWM dimming pulse and the synchronization signal of the liquid crystal panel are asynchronous.

For example, when the vertical synchronization frequency fV is 60 Hz, it is ideal to set the PWM dimming frequency fPWM to about 600 Hz, which is a frequency ten times the vertical synchronization frequency fv. However, when the PWM dimming frequency becomes so high, light ON efficiency of the inverter is deteriorated and audible sounds (whining sounds) from the inverter transformer are increased as adverse effects. The PWM dimming frequency fPWM therefore cannot be set much higher. For this reason, generally, the PWM dimming frequency fPWM is often set to be a frequency of 400 Hz or lower.

As a liquid crystal display in the related art that improves the occurrence of a flicker and instability of luminance even at the low PWM dimming frequency as specified above, a liquid crystal display disclosed, for example, in Patent Document 1 has been used. FIG. 29 is a block diagram showing the configuration of the liquid crystal display in the related art.

The liquid crystal display in the related art shown in FIG. 29 comprises a liquid crystal module 100, a video processing portion 200, a PWM dimming driving circuit portion 300, and a backlight portion 400. The liquid crystal module 100 comprises a panel control circuit 111, a source driver 112, a gate driver 113, and a liquid crystal panel 114. The video processing portion 200 comprises a video signal processing circuit 221 and a system control circuit 222.

The video signal processing circuit 221 generates video signals VR, VG, and VB for respective three primary colors, a vertical synchronization signal Vsyn, a horizontal synchronization signal Hsyn, and a pixel clock CLK from an input video signal. The panel control circuit 111 outputs the video signals VR, VG, and VB and the clock pulse CLK to the source driver 112, and outputs the vertical synchronization signal Vsyn and the horizontal synchronization signal Hsyn to the gate driver 113. The source driver 112 and the gate driver 113 apply source voltages corresponding to the video signals VR, VG, and VB to the signal electrodes while scanning the gate electrodes of the liquid crystal panel 114 according to the respective synchronization signals Vsyn and Hsyn for an image to be displayed on the liquid crystal panel 114.

The PWM dimming driving circuit portion 300 comprises a divide two vertical periods by five circuit 331, a ½ frequency-dividing circuit 332, a pulse count circuit 333, and a PWM generation circuit 334. The ½ frequency-dividing circuit 332 outputs a frequency-divided signal 2Tv by ½ frequency-dividing the vertical synchronization signal Vsyn for the liquid crystal panel. The divide two vertical periods by five circuit 331 outputs a dividing signal 2/5Tv that divides two vertical periods by five according to the frequency-divided signal 2Tv. The pulse count circuit 333 is reset by the dividing signal 2/5Tv, and after it is reset, it generates a reset pulse Pr by counting a specific number of clock pulses pre-set by duty data of a digital control signal for dimming received from the system control circuit 222. The PWM generation circuit 334 generates a PWM dimming pulse Vpwm that determines a light-ON period of the backlight portion 400 according to the dividing signal 2/5Tv and the reset pulse Pr.

FIGS. 30A through 30E are timing charts of the respective signals inputted into and outputted from the PWM dimming driving circuit portion 300 shown in FIG. 29. It is understood from FIGS. 30A through 30E that five cycles' worth of PWM dimming pulses Vpwm are outputted within two vertical periods. An effect achieved by the driving using such a PWM dimming method will be described hereinafter.

FIGS. 31A and 31B are views in which PWM dimming pulses of a first screen and a second screen within two vertical periods are aligned for ease of understanding of timing with respect to the vertical synchronization signal. FIG. 31A shows a case where six cycles' worth of PWM dimming pulses are outputted within two vertical periods, and FIG. 31B shows a case where five cycles' worth of PWM dimming pulses are outputted within two vertical periods. In FIGS. 31A and 31B, a time ratio of a light-ON period and a light-OFF period of the PWM dimming is set to 1:1 (generally referred to as the light-ON duty of 50%) for ease of description.

In a case where six cycles' worth of PWM dimming pulses are outputted within two vertical periods, as is shown in FIG. 31A, given that the timing from the vertical synchronization signal is the same, then, the timings of the light-ON period and the light-OFF period become exactly the same in the first screen and the second screen within the two vertical periods when driven using the PWM dimming frequency obtained by multiplying (by a factor of 3 herein) the vertical synchronization frequency, and the PWM dimming pulses become the same outputs.

Meanwhile, in a case where five cycles' worth of PWM dimming pulses are outputted within two vertical periods, as is shown in FIG. 31B, the timings of the light-ON period and the light-OFF period become totally opposite in the first screen (first frame) and the second screen (second frame) within the two vertical periods. This results in an effect close to that achieved when blinking is performed twice as much during a certain period by the PWM dimming method. In other words, when attention is focused on one vertical period alone, the PWM dimming cycles are 2.5 cycles. However, when the two vertical periods are averaged, the PWM dimming frequency behaves as if it had doubled apparently. The same effect can be achieved when the PWM dimming pulses outputted within the two vertical periods are odd-number cycles' worth. For example, in a case where blinking is performed by setting the PWM dimming frequency to 330 Hz when the vertical synchronization frequency is 60 Hz, 5.5 cycles' worth of PWM dimming pulses are outputted within one vertical period. The flicker reducing effect is the same as a frequency of about 660 Hz, which is a frequency twice the PWM dimming frequency.

Capabilities required for the liquid crystal display as a display device include the motion picture display capability, and the liquid crystal display is inferior to the CRT in terms of the motion picture display capability. This is because the liquid crystal display is a hold-type display device, and the underlying principle is described in Non-Patent Document 1, which will be described briefly hereinafter.

FIGS. 32A and 32B are schematic views used to describe the motion picture display capability of a CRT. When a motion picture is displayed on the CRT that has been used extensively, as is shown in FIG. 32A, a level at which an image is displayed varies in every vertical period (16.6 ms), and the image is displayed only during the initial period (1 ms or less) in each vertical period. A display device that displays a motion picture in this manner is referred to as an impulse type display device. In a case where a motion picture is displayed on such a CRT (when a display is moved at a constant speed), the image is displayed as is shown in FIG. 32B. When a human sees this display, the line of sight follows a display of the pixels in the direction indicated by an arrow. He is therefore able to perceive a clear motion picture display with no after image.

FIGS. 33A and 33B are schematic views used to describe the motion picture display capability of a liquid crystal display. In FIGS. 33A and 33B, for ease of description, pixels in the time direction are indicated by three points (black circles in the drawing) for each vertical period. Because the liquid crystal display is a hold-type display device, as is shown in FIG. 33A, a display on the liquid crystal panel remains the same over one vertical period (it actually varies by an amount comparable to a response time), and the luminance varies in each vertical period. In a case where a motion picture is displayed on the liquid crystal display, pixels are displayed as are shown in FIG. 33B. When a human sees this display, although the line of sight follows the direction indicated by an arrow as with the case of the CRT, the human eyes perceive the display on average because the display remains the same over one vertical period, and the edge of the motion picture being displayed becomes blur (referred to as the edge blur or motion picture blur), which deteriorates the motion picture display capability.

There is a display method disclosed, for example, in Patent Document 2 as a method of improving the edge blur described above. FIG. 34 is a view used to describe the display method of improving the edge blur. According to the display method shown in FIG. 34, attention is focused on a given pixel, and a light-OFF period during which the light source in the backlight portion is lit OFF for a certain period is provided within one vertical period in sync with the vertical synchronization signal. By driving the light source in this manner, as with the impulse type display device, such as the CRT, the liquid crystal display displays an image for a certain period within one vertical period. The edge blur during the display of a motion picture can be therefore improved. In this specification, this dimming method is referred to as the black insertion dimming by the backlight.

The effect of the black insertion dimming by the backlight will now be described more concretely. FIGS. 35A and 35B are views showing an example of a display pattern to evaluate the effect of the black insertion dimming by the backlight. FIG. 36 is a schematic view used to describe a perception state in a case where the black insertion dimming by the backlight is not performed. FIG. 37 is a schematic view used to describe a perception state in a case where the black insertion dimming by the backlight is performed. In FIG. 36 and FIG. 37, black circles represent light-OFF pixels and white circles represent light-ON pixels.

As is shown in FIG. 35A, in a case where a scroll display to move a white pattern WP on a black background BP at a constant speed Xf (a moving distance in one vertical period) is performed, as is shown in FIG. 35B, the both edge portions of the white pattern WP in the moving direction become blur, thereby giving rise to the edge blur.

In a case where the black insertion dimming by the backlight is not performed, as is shown in FIG. 36, the light-ON pixels and the light-OFF pixels are switched collectively per vertical period. Accordingly, one light-ON pixel and three light-OFF pixels are successively displayed in a moving direction V1 of the line of sight, two light-ON pixels and two light-OFF pixels are successively displayed in a moving direction V2 of the line of sight, and three light-ON pixels and one light-OFF pixel are successively displayed in a moving direction V3 of the line of sight. Consequently, the moving direction V1 of the line of sight is perceived at the lowest brightness, the moving direction V3 of the line of sight is perceived at the highest brightness, and the moving direction V2 of the line of sight is perceived at the intermediate brightness between those in the other two directions. Hence, as is shown in FIG. 35B, the both edge portions of the white pattern WP in the moving direction are perceived as being blurred.

On the contrary, in a case where the black insertion dimming by the backlight is performed, as is shown in FIG. 37, all the pixels are lit OFF during the black insertion period within one vertical period, and the light-ON pixels and the light-OFF pixels are switched collectively per vertical period during the rest period within the vertical period. Accordingly, one light-ON pixel and three light-OFF pixels are successively displayed in the moving direction V1 of the line of sight, two light-ON pixels and two light-OFF pixels are successively displayed in the moving directions V2 and V3 of the line of sight. Consequently, the moving direction V1 of the line of sight is perceived at the lowest brightness and the moving directions V2 and V3 of the line of sight are perceived at the same brightness. Hence, the degree of blur at the both edge portions of the white pattern WP in the moving direction shown in FIG. 35B is lowered, and the motion picture visibility is improved.

However, because an image is displayed on the liquid crystal panel by successively performing scans from top to bottom, when the backlight portion is lit ON and lit OFF for the entire screen within one vertical period as described above, the edge blur becomes inhomogeneous during the display of a motion picture through the action of a response speed of the liquid crystals. As a liquid crystal display that improves such non-uniformity, there is a liquid crystal display disclosed, for example, in Patent Document 3.

FIG. 38 is a block diagram showing the configuration of a major portion of the liquid crystal display in the related art that improves the non-uniformity of the edge blur. As is shown in FIG. 38, a backlight 401 is divided by M in the horizontal direction (divided by four in the case of FIG. 38) to form light-emission regions 444a through 444d, and fluorescent lamps 443a through 443d are disposed respectively in these regions. The fluorescent lamps 443a through 443d are connected to inverters 442a through 442d, respectively, and the inverters 442a through 442d are connected to a PWM dimming driving circuit portion 301. The PWM dimming driving circuit portion 301 receives a vertical synchronization signal Vsyn for a liquid crystal panel display, and outputs a PWM dimming pulse (the PWM frequency is equal to the vertical synchronization frequency) that controls the dimming by the respective inverters 442a through 442d in sync with the vertical synchronization signals Vsyn. The inverters 442a through 442d respectively drive the fluorescent lamps 443a through 443d independently.

FIGS. 39A through 39E are timing charts of the respective signals in the liquid crystal display in the related art shown in FIG. 38. As is shown in FIGS. 39A through 39E, for example, a PWM dimming pulse VBL1 of the light-emission region 444a shifts to dimming-OFF immediately before a display of the liquid crystal directly above starts and holds a certain light-OFF period. A PWM dimming pulse of the light-emission region 444b is set in such a manner that dimming-ON and dimming-OFF timings are delayed with respect to the PWM dimming pulse VBL1 by a ¼ phase of the vertical synchronization period. Thereafter, dimming-ON and dimming-OFF timings for the light-emission regions 444c and 444d are set so as to be delayed by a ¼ of the vertical synchronization period with respect to one to another. By successively lighting ON the divided fluorescent lamps 443a through 443d directly below in sync with the vertical synchronization signal through the PWM dimming to correspond to a scanning display on the liquid crystal panel, it is possible to improve the non-uniformity while improving the edge blur.

As has been described, it is possible to improve the non-uniformity while improving the edge blur with the use of the black insertion dimming by the backlight. However, because the light-OFF period can be set only once within one vertical period in the black insertion dimming by the backlight, it is impossible to blink the light source periodically at a frequency as high as the frequency of the PWM dimming, which makes it difficult to perform the dimming in a stable manner at a low current.

It may be possible to use the light-OFF period of the PWM dimming as the light-OFF period of the black insertion dimming by the backlight. It is, however, necessary to lower the PWM frequency when a light-OFF period of a certain period or longer is inserted while maintaining a duty ratio of the PWM dimming pulse at a constant level. In this case, the screen becomes darker, which makes the dimming in a bright region difficult.

The result is the same as above in a case where a light-OFF period of a certain period or longer is inserted without varying the PWM frequency as will be described below. FIGS. 40A through 40D are timing charts showing driving waveforms in a case where a light-OFF period as long as the period of the black insertion dimming by the backlight is inserted without varying the PWM frequency. As is shown in FIGS. 40A through 40D, in a case where a light-OFF period by the PWM driving (PWM dimming) in the related art shown in FIG. 40C is changed to be as long as the light-OFF period of the black insertion period by the black insertion driving (black insertion dimming by the backlight) in the related art shown in FIG. 40B, the light-OFF period of the PWM dimming becomes as is shown in FIG. 40D. When a light-OFF period of a certain period or longer is inserted without varying the PWM frequency in this manner, it becomes necessary to extend the low period of the PWM dimming pulse (substantially equivalent to the black insertion period). Hence, in this case, too, the screen becomes darker, which makes the dimming in a bright region difficult.

Further, it may be possible to combine the black insertion dimming by the backlight and the PWM dimming. However, when the black insertion dimming by the backlight and the PWM dimming are merely combined, problems as follows are posed. FIGS. 41A through 41D are timing charts used to describe unwanted pulses generated when the black insertion dimming by the backlight and the PWM dimming are combined.

Assume that the black insertion dimming by the backlight is performed to improve the edge blur and a PWM dimming pulse Vpwm in sync with the vertical synchronization signal Vsyn of the liquid crystal panel is superimposed to adjust the luminance. Herein, as has been described above, when the PWM dimming is performed in an interleave relation with respect to the vertical synchronization signal Vsyn to suppress a flicker in a display on the liquid crystal panel, as is shown in FIGS. 41A through 41D, a PWM dimming pulse VBL (the PWM dimming frequency is equal to the vertical synchronization frequency, for example, 60 Hz) of the black insertion dimming by the backlight interferes with a PWM dimming pulse Vpwm by the interleave. It is therefore anticipated that a whisker-shaped pulse BP having an extremely small duty is generated near the timing of the falling edge of the vertical synchronization signal Vsyn once within two vertical periods under the condition that the duty (a time ratio of the light-ON period with respect to the dimming cycle) of the PWM dimming pulse exceeds 50%.

A case where the backlight is successively lit ON is the same as the black insertion dimming when attention is focused on every light-emission region. Hence, it is anticipated that a whisker-shaped pulse is generated as well. Because such a whisker-shaped pulse has an extremely narrow duty (a time ratio of 1% or less), a light-ON action corresponding to the duty cannot be performed; moreover, a malfunction may possibly be induced in some inverters.

Patent Document 1: JP-A-7-325286
Patent Document 2: JP-T-8-500915
Patent Document 3: JP-A-11-202285
Non-Patent Document 1: *Technical Report of IEICE, The Institute of Electronics, Information and Communication Engineers*, EID99-10, pp. 55-60 (1999-06)

DISCLOSURE OF THE INVENTION

An object of the invention is therefore to provide a liquid crystal display not only capable of improving the motion picture visibility, but also capable of performing dimming over a broad range in a stable manner at a low current without generating unwanted pulses and a driving method of the light source thereof.

A liquid crystal display according to one aspect of the invention includes: a liquid crystal panel; panel driving portion for driving the liquid crystal panel; a light source provided on a back surface of the liquid crystal panel; and light source driving portion for driving the light source in such a manner that a black insertion period during which the light source is lit OFF and a light-ON period during which the light source is lit ON are provided within one vertical period and PWM-driving the light source so as to be lit ON and lit OFF repetitively during the light-ON period.

With this liquid crystal display, because the light source is driven in such a manner that the black insertion period during which the light source is lit OFF and the light-ON period during which the light source is lit ON are provided within one vertical period, it is possible to enhance the motion picture visibility by the black insertion dimming. At the same time, because the light source is PWM-driven so as to be lit ON and lit OFF repetitively during the light-ON period, it is possible to perform the dimming over a broad range in a stable manner at a low current without generating unwanted pulses.

A driving method according to another aspect of the invention is a driving method of driving a light source provided on a back surface of a liquid crystal panel, wherein the light source is driven in such a manner that a black insertion period during which the light source is lit OFF and a light-ON period during which the light source is lit ON are provided within one vertical period and the light source is PWM-driven so as to be lit ON and lit OFF repetitively during the light-ON period.

According to this driving method, because the light source is driven in such a manner that the black insertion period during which the light source is lit OFF and the light-ON period during which the light source is lit ON are provided within one vertical period, it is possible to enhance the motion picture visibility by the black insertion dimming. At the same time, because the light source is PWM-driven so as to be lit ON and lit OFF repetitively during the light-ON period, it is possible to perform the dimming over a broad range in a stable manner at a low current without generating unwanted pulses.

BRIEF DESCRIPTION OF THE DRAWINGS

FIGS. 30A through 30E are timing charts of respective signals inputted into and outputted from a PWM dimming driving circuit portion shown in FIG. 29.

FIG. 36 is a schematic view used to describe a perception state in a case where the black insertion dimming by the backlight is not performed.

FIG. 37 is a schematic view used to describe a perception state in a case where the black insertion dimming by the backlight is performed.

FIGS. 39A through 39E are timing charts of respective signals of the liquid crystal display in the related art shown in FIG. 38.

FIGS. 40A through 40D are timing charts showing driving waveforms in a case where a light-OFF period as long as the period of the black insertion dimming by the backlight is inserted without varying the PWM frequency.

FIGS. 41A through 41D are timing charts used to describe unwanted pulses generated when the black insertion dimming by the backlight and the PWM dimming are combined.

BEST MODE FOR CARRYING OUT THE INVENTION

Hereinafter, a liquid crystal display according to respective embodiments of the invention will be described with reference to the drawings.

First Embodiment

Figure 1:
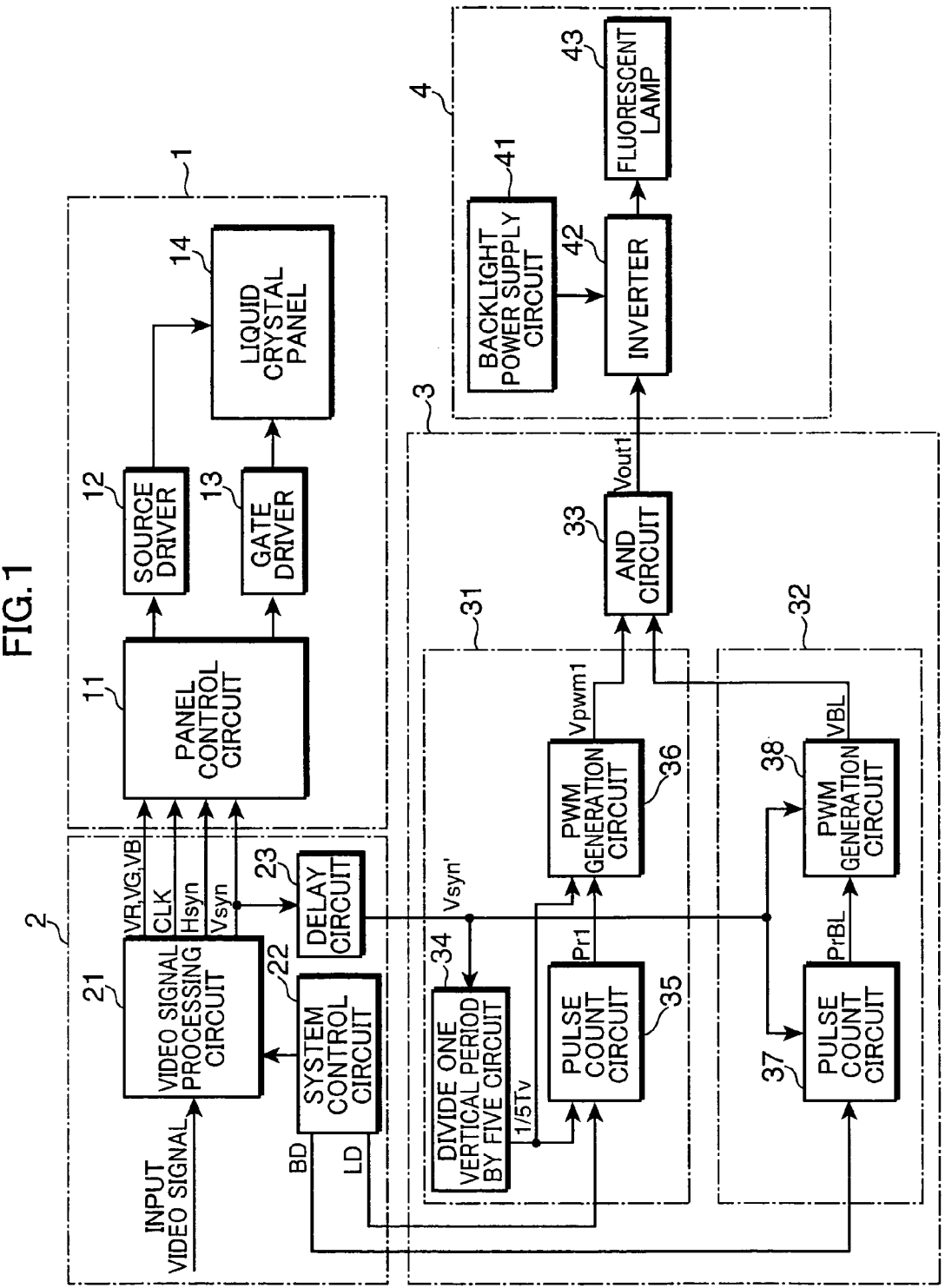
FIG. 1 is a block diagram showing the configuration of a liquid crystal display according to a first embodiment of the invention.
Figure 2:
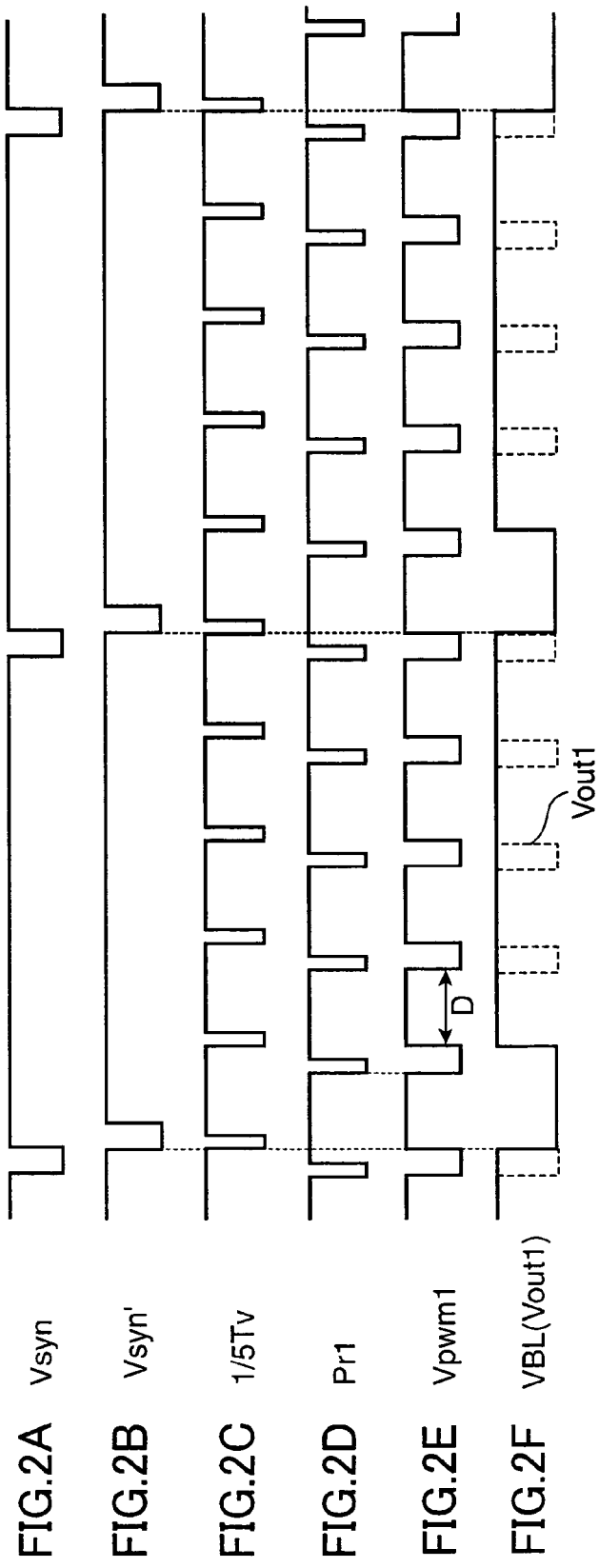
FIGS. 2A through 2F are timing charts used to describe a backlight dimming operation by the liquid crystal display shown in FIG. 1.

Firstly, a liquid crystal display according to a first embodiment of the invention will be described. FIG. 1 is a block diagram showing the configuration of the liquid crystal display according to the first embodiment of the invention. The liquid crystal display shown in FIG. 1 includes a liquid crystal module 1, a video processing portion 2, a PWM dimming driving circuit portion 3, and a backlight portion 4.

The video processing portion 2 includes a video signal processing circuit 21, a system control circuit 22, and a delay circuit 23. The video signal processing circuit 21 converts an input video signal, such as a video signal of a TV signal, into a signal suitable to the processing performed inside the liquid crystal module 1. To be more concrete, the video signal processing circuit 21 outputs video signals VR, VG, and VB separated into three primary colors (RGB), a vertical synchronization signal Vsyn, a horizontal synchronization signal Hsyn, and a pixel clock CLK from an input video signal. The delay circuit 23 outputs a delayed vertical synchronization signal Vsyn' by delaying the vertical synchronization signal Vsyn by a specific period. The system control circuit 22 comprises a micro computer or the like, and controls the device in response to operations by the user using the operation terminal (not shown). Also, the system control circuit 22 creates not only black insertion duty data BD to determine a ratio of a black insertion period (light-OFF period) within one vertical period used in black insertion dimming, but also light-ON duty data LD to determine a duty ratio of a PWM dimming pulse used in PWM dimming for adjusting the luminance of the liquid crystal panel 14.

The liquid crystal module 1 includes a panel control circuit 11, a source driver 12, a gate driver 13, and a liquid crystal panel 14. The panel control circuit 11 receives the video signals VR, VG, and VB, the vertical synchronization signal Vsyn, the horizontal synchronization signal Hsyn, and the pixel clock CLK. Then, it outputs the video signals VR, VG, and VB and the clock pulse CLK to the source driver 12, and outputs the vertical synchronization signal Vsyn and the horizontal synchronization signal Hsyn to the gate driver 13. The source driver 12 and the gate driver 13 apply source voltages corresponding to the video signals VR, VG, and VB to the signal electrodes while scanning the gate electrodes of the liquid crystal panel 14 according to the vertical synchronization signal Vsyn and the horizontal synchronization signal Hsyn for an image to be displayed on the liquid crystal panel 14. In this instance, the source driver 12 and the gate driver 13 perform scanning successively from the uppermost line of the screen to the lowermost line of the screen. As the liquid crystal module 1, for example, a liquid crystal module of the active matrix driving method using TFT's (Thin Film Transistors) is used.

The PWM dimming driving circuit portion 3 includes a luminance dimming PWM generation portion 31, a black insertion dimming PWM generation portion 32, and an AND circuit (signal waveform superimposing circuit) 33. The luminance dimming PWM generation portion 31 includes a divide one vertical period by five circuit 34, a pulse count circuit 35, and a PWM generation circuit 36. The black insertion dimming PWM generation portion 32 includes a pulse count circuit 37 and a PWM generation circuit 38.

The divide one vertical period by five circuit 34 receives the delayed vertical synchronization signal Vsyn' and outputs a divide-by-five synchronization signal 1/5Tv generated by dividing one vertical period of the delayed vertical synchronization signal Vsyn' by five. The pulse count circuit 35 receives the divide-by-five synchronization signal 1/5Tv and the light-ON duty data LD, and outputs a light-OFF start timing signal Pr1 having the start timing of the ON period (light-ON period) same as the synchronization timing of the divide-by-five synchronization signal 1/5Tv and the light-ON period determined according to the light-ON duty data LD. The PWM generation circuit 36 receives the divide-by-five synchronization signal 1/5Tv and the light-OFF start timing signal Pr1, and outputs a dimming PWM pulse Vpwm1 that comes ON in sync with the divide-by-five synchronization signal 1/5Tv and goes OFF in sync with the light-OFF start timing signal Pr1.

The pulse count circuit 37 receives the delayed vertical synchronization signal Vsyn' and the black insertion duty data BD, and outputs a light-ON start timing signal PrBL having the start timing of the black insertion period (light-OFF period) same as the synchronization timing of the delayed vertical synchronization signal Vsyn' and the black insertion period determined according to the black insertion duty data BD. The PWM generation circuit 38 receives the delayed vertical synchronization signal Vsyn' and the light-ON start timing signal PrBL, and outputs a black insertion PWM pulse VBL that starts the black insertion period in sync with the delayed vertical synchronization signal Vsyn' and ends the black insertion period in sync with the light-ON start timing signal PrBL. The AND circuit 33 receives the dimming PWM pulse Vpwm1 and the black insertion PWM pulse VBL, and outputs an inverter driving signal Vout1 that takes an AND of these two pulses.

The backlight portion 4 includes a backlight power supply circuit 41, an inverter 42, and a fluorescent lamp 43. The fluorescent lamp 43 is provided on the back surface of the liquid crystal panel 14 and illuminates the liquid crystal panel 14 from behind. The backlight power supply circuit 41 supplies the inverter 42 with power, and the inverter 42 drives the fluorescent lamp 43 by applying a voltage corresponding to the inverter driving signal Vout1 to the fluorescent lamp 43.

In this embodiment, the fluorescent lamp 43 means a fluorescent lamp driven as one light-emission region. Regardless of whether one or more than one fluorescent lamp is used, in a case where all the fluorescent lamps are driven collectively, all the fluorescent lamps driven as a single light-emission region are illustrated and described as a single fluorescent lamp 43. In addition, the light source used as the backlight is not particularly limited to the fluorescent lamp, and it may be an LED or the like. The same can be said in this regard in the respective embodiments described below.

In this embodiment, the liquid crystal panel 14 corresponds to one example of the liquid crystal panel, the video processing portion 2, the panel control circuit 11, the source driver 12, and the gate driver 13 correspond to one example of the panel driving portion, the fluorescent lamp 43 corresponds to one example of the light source, the PWM dimming driving circuit portion 3, the backlight power supply circuit 41, and the inverter 42 correspond to one example of the light driving portion.

A backlight dimming operation by the liquid crystal display configured as above will now be described. FIGS. 2A through 2F are timing charts used to describe the backlight dimming operation by the liquid crystal display shown in FIG. 1.

Initially, the system control circuit 22 outputs the black insertion duty data BD and the light-ON duty data LD corresponding to the duty ratios of the black insertion period and the PWM dimming pulse that are determined in advice for the device. In a case where the user adjusts the luminance of the liquid crystal panel 14, the system control circuit 22 changes the light-ON duty data LD to achieve the adjusted luminance.

Subsequently, the delay circuit 23 outputs the delayed vertical synchronization signal Vsyn' by delaying the vertical synchronization signal Vsyn outputted from the video signal processing circuit 21 by a specific period so that the phase of the black insertion period becomes a phase described below with respect to the vertical synchronization signal. The divide one vertical period by five circuit 34 receives the delayed vertical synchronization signal Vsyn' and outputs the divide-by-five synchronization signal 1/5Tv having a frequency five times the frequency of the delayed vertical synchronization signal Vsyn'.

In this instance, the pulse count circuit 35 outputs the light-OFF start timing signal Pr1 to generate the PWM dimming pulse Vpwm1 that starts the light-ON period in sync with the divide-by-five synchronization signal 1/5Tv and has a duty ratio corresponding to the light-ON duty data LD. The PWM generation circuit 36 receives the divide-by-five synchronization signal 1/5Tv and the light-OFF start timing signal Pr1, and outputs the dimming PWM pulse Vpwm1 that starts the light-ON period in sync with the divide-by-five synchronization signal 1/5Tv and ends the light-ON period in sync with the light-OFF start timing signal Pr1. The dimming PWM pulse Vpwm1 to perform the PWM dimming for adjusting the luminance of the liquid crystal panel 14 is generated in this manner.

Meanwhile, the pulse count circuit 37 receives the delayed vertical synchronization signal Vsyn' and the black insertion duty data BD, and outputs the light-ON start timing signal PrBL to generate the black insertion PWM pulse VBL that starts the black insertion period in sync with the delayed vertical synchronization signal Vsyn' and has the black insertion period corresponding to the black insertion duty data BD. The PWM generation circuit 38 receives the delayed vertical synchronization signal Vsyn' and the light-ON start timing signal PrBL, and outputs the black insertion PWM pulse VBL that starts the black insertion period in sync with the delayed vertical synchronization signal Vsyn' and ends the black insertion period in sync with the light-ON start timing signal PrBL. The black insertion PWM pulse VBL to perform the black insertion dimming by the backlight for improving the motion picture visibility during the display of a motion picture is generated in this manner.

Subsequently, the AND circuit 33 outputs the inverter driving signal Vout1 by superimposing the dimming PWM pulse Vpwm1 on the pulse of the light-ON period of the black insertion PWM pulse VBL. The inverter 42 lights ON or lights OFF the fluorescent lamp 43 using the inverter driving signal Vout1. Hence, it is possible to provide the black insertion period of a certain period within one vertical period without being affected by the duty ratio of the dimming PWM pulse. Accordingly, it is possible to perform the PWM dimming for adjusting the luminance of the liquid crystal panel 14 while performing concurrently the black insertion dimming by the backlight for improving the motion picture visibility during the display of a motion picture. Hence, not only is it possible to enhance the motion picture visibility by the black insertion dimming, but it is also possible to perform the dimming over a broad range in a stable manner at a low current without generating unwanted pulses.

In this embodiment, the divide-by-five synchronization signal 1/5Tv used to generate the luminance dimming PWM dimming pulse Vpwm1 is generated in the divide one vertical period by five circuit 34. It should be noted, however, that a synchronization signal having a dividing number other than five can be used as well as long as it divides one vertical period by N (N=1, 2, 3, and so forth).

Figure 3:
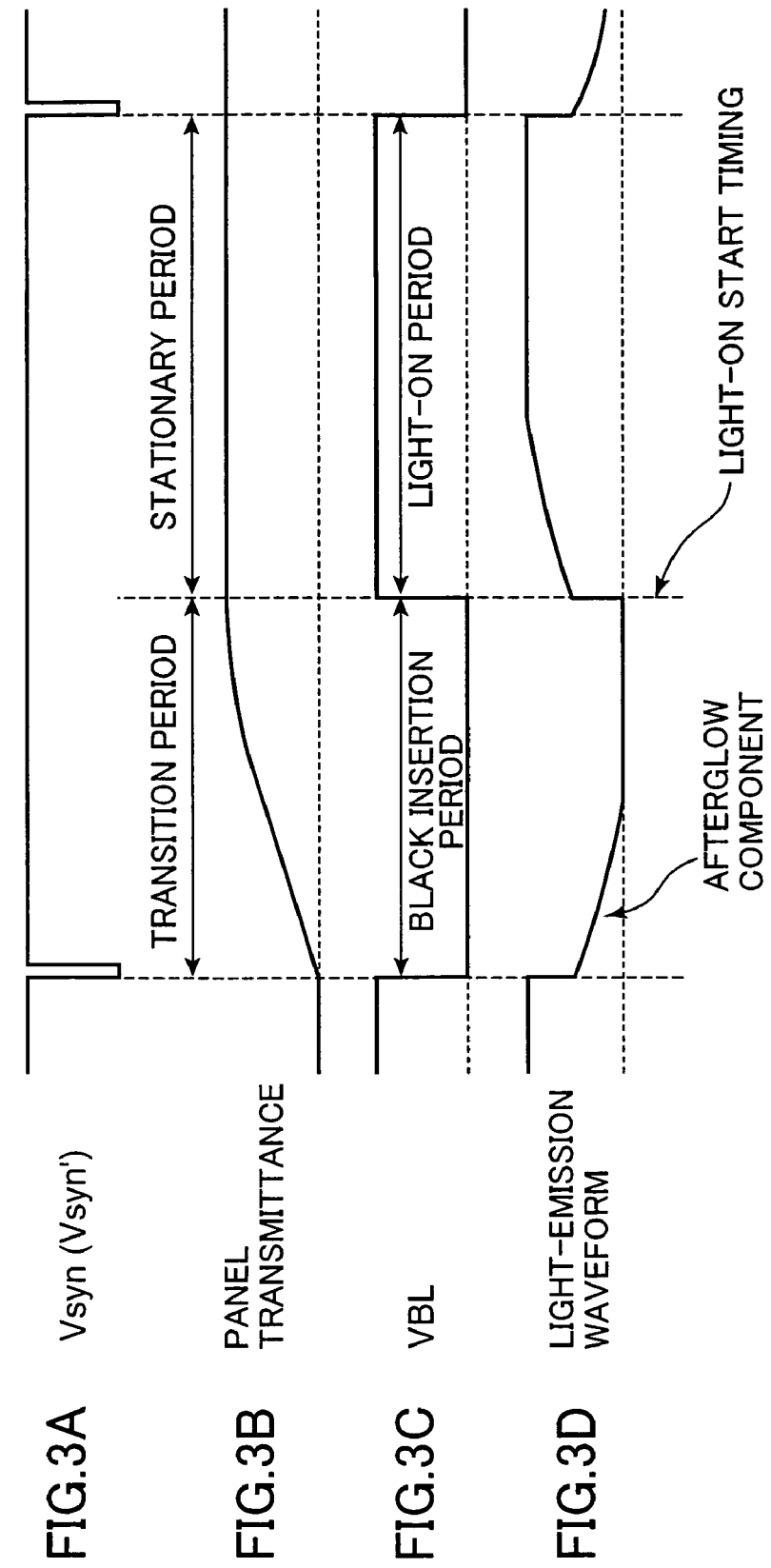
FIGS. 3A through 3D are timing charts used to describe a relation of panel transmittance and a black insertion period.

The phase of the black insertion period will now be described more in detail. FIGS. 3A through 3D are timing charts used to describe a relation of the panel transmittance and the black insertion period. As is shown in FIG. 3A, in a case where the liquid crystal panel 14 is driven in sync with the vertical synchronization signal Vsyn, the panel transmittance varies as shown in FIG. 3B, and it is divided into a transition period during which the panel transmittance varies and a stationary period during which the panel transmittance stays almost at a constant level. In the transition period, the panel transmittance does not reach the original transmittance after the driving, whereas in the stationary period, the panel transmittance reaches the original transmittance after the driving. It is therefore possible to display an image corresponding to the panel transmittance in a satisfactory manner by allowing as much light from the fluorescent lamp 43 as possible to pass through during the stationary period. Hence, it is preferable to generate the black insertion PWM pulse VBL in such a manner that the transition period of the transmittance of the liquid crystal panel 14 overlaps the black insertion period. It is more preferable to generate the black insertion PWM pulse VBL in such a manner that the black insertion period starts near the start point of the transition period of the transmittance of the liquid crystal panel 14.

For example, as is shown in FIG. 3C, the black insertion PWM pulse VBL may be generated by setting a delay time by the delay circuit 23 to 0 ms, so that the respective periods are provided in sync with the vertical synchronization signal Vsyn in order of the black insertion period and the light-ON period. In this case, the light-emission waveform is shaped as is shown in FIG. 3D. Although an afterglow component remains slightly in the black insertion period, not only is it possible to achieve an almost perfect black display (light-OFF period), but it is also possible to allow sufficient light corresponding to the original panel transmittance to pass through during the light-ON period. It should be noted that the delay circuit 23 may be omitted in this case.

Alternatively, because the initial change of rate of the panel transmittance is small during the transition period, it may be configured in such a manner that the black insertion period starts when the panel transmittance has varied by 5%. In this case, a time needed for the panel transmittance to vary by 5% is measured in advance, and the delay circuit 23 generates the delayed vertical synchronization signal Vsyn' delayed by the measured time. Conversely, by taking the afterglow component into account, it may be configured in such a manner that the black insertion period starts immediately before the transition period starts.

Figure 4:
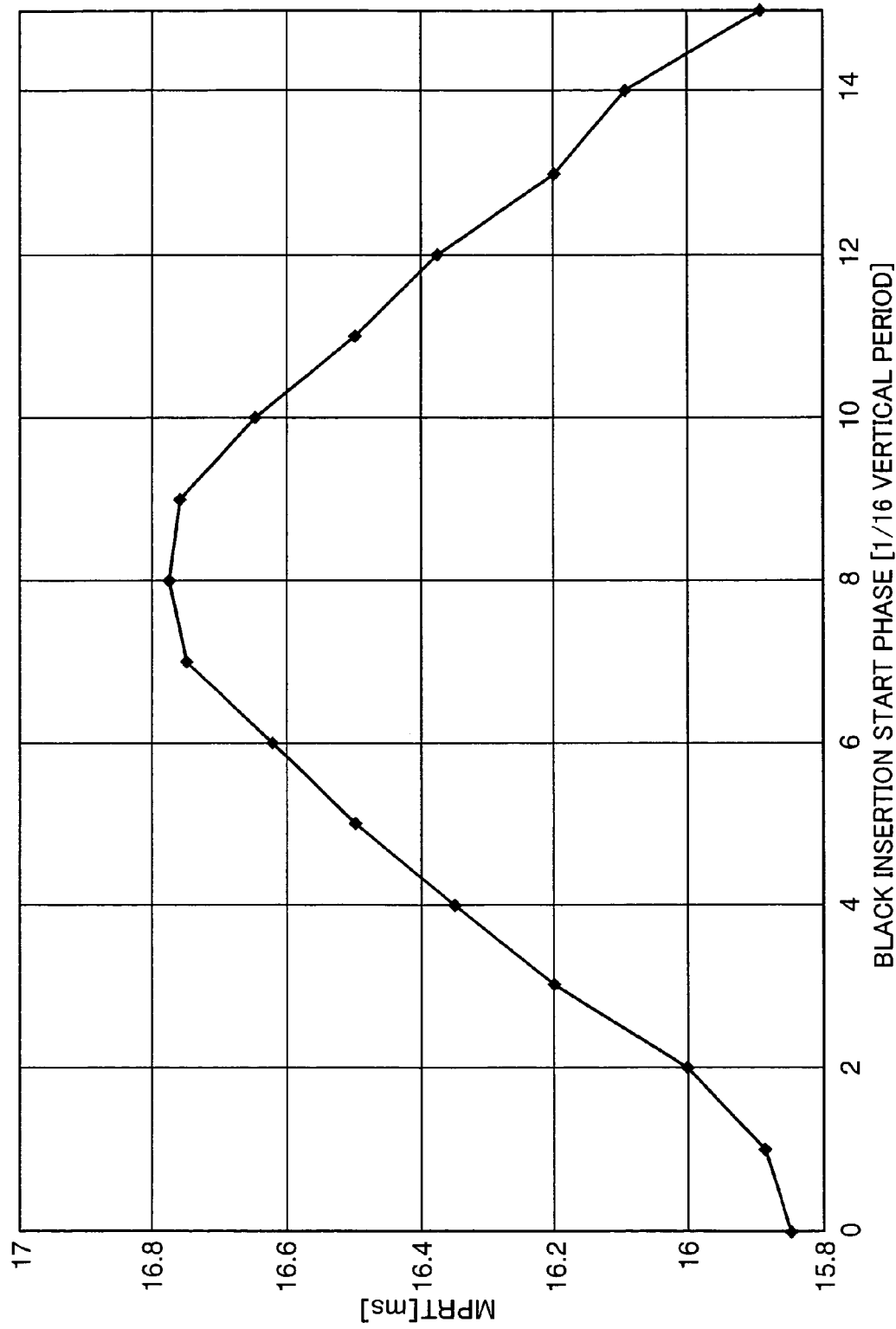
FIG. 4 is a view showing a measurement result of an MPRT value when the start phase of the black insertion period is varied.

On the basis of those findings, the motion picture visibility was evaluated using an MPRT (Motion Picture Response Time) value by varying the start phase of the black insertion period. FIG. 4 is a view showing the measurement result of the MPRT value when the start phase of the black insertion period was varied. In the case shown in FIG. 4, the value was measured using a liquid crystal panel in the VA (Vertically Aligned) mode by setting a percentage of the black insertion period in one vertical period to 30%. It is understood from FIG. 4 that the MPRT value becomes minimum when the start phase of the black insertion period is 9/16 of the vertical period (delay time is 0 ms), after which the MPRT value varies periodically. Accordingly, the evaluation of the motion picture visibility using the MPRT value also reveals that it is most preferable to generate the black insertion PWM pulse VBL in such a manner that the black insertion period starts near the start point of the transition period of the liquid crystal panel 14.

As has been described above, in this embodiment, because the fluorescent lamp 43 is driven in such a manner that the black insertion period during which the light source is lit OFF and the light-ON period during which the light source is light ON are provided within one vertical period, it is possible to enhance the motion picture visibility. At the same time, because the fluorescent lamp 43 is PWM-driven in such a manner that the fluorescent lamp 43 is lit ON and lit OFF repetitively during the light-ON period, it is possible to perform the dimming over a broad range in a stable manner at a low current without generating unwanted pulses.

Second Embodiment

Figure 5:
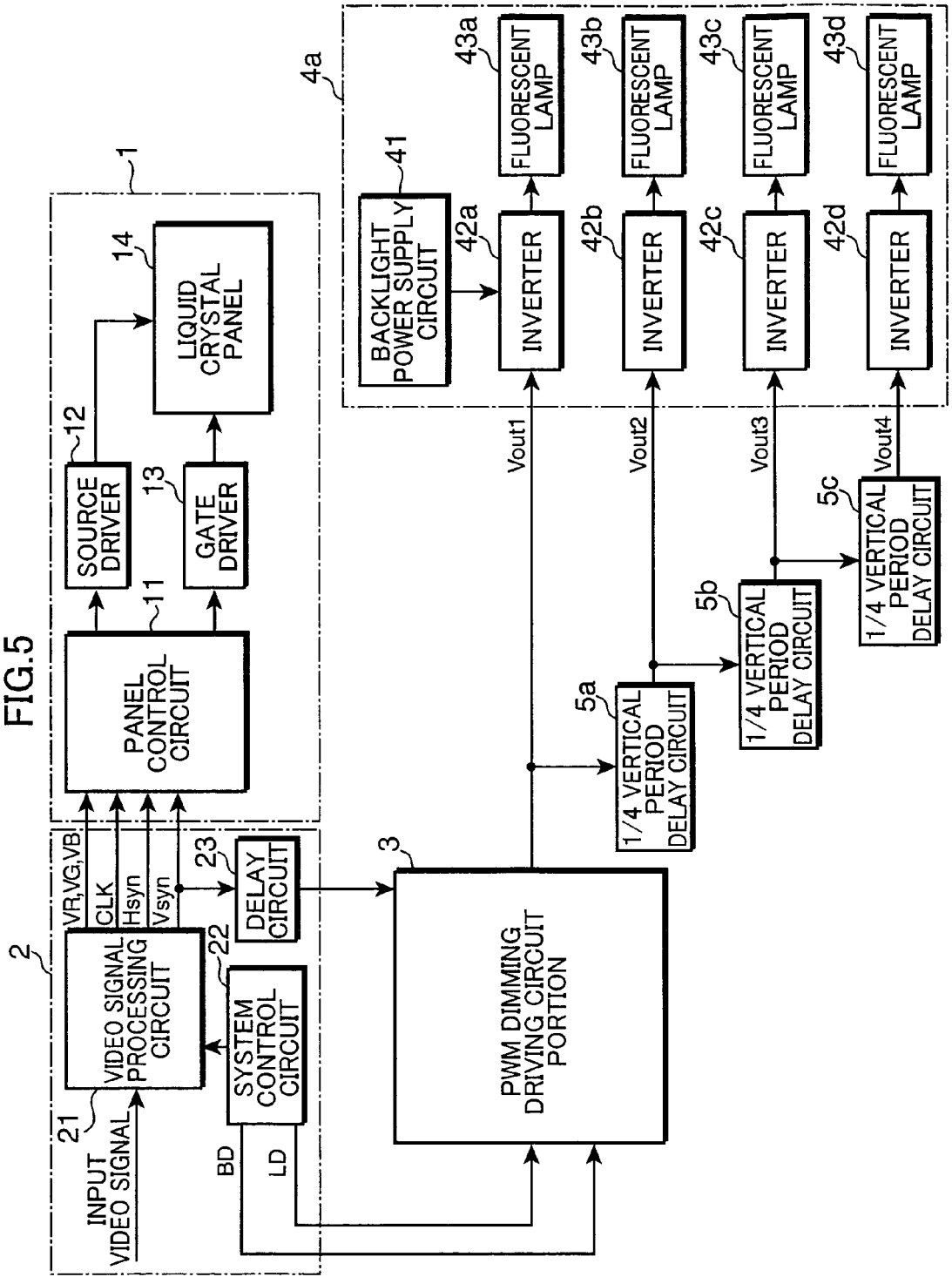
FIG. 5 is a block diagram showing the configuration of a liquid crystal display according to a second embodiment of the invention.

A liquid crystal display according to a second embodiment of the invention will now be described. FIG. 5 is a block diagram showing the configuration of the liquid crystal display according to the second embodiment of the invention. The liquid crystal display shown in FIG. 5 differs from the liquid crystal display shown in FIG. 1 in that the backlight portion 4 is replaced with a backlight portion 4a, and three ¼ vertical period delay circuits 5a through 5c are additionally provided. Because the rest is the same as the liquid crystal display shown in FIG. 1, descriptions of these components are omitted herein by labeling like components with like reference numerals, and different portions will be described in detail hereinafter.

The ¼ vertical period delay circuit 5a receives the inverter driving signal Vout1 from the PWM dimming driving circuit portion 3, and outputs an inverter driving signal Vout2 by delaying the inverter driving signal Vout1 by an ¼ vertical period. The ¼ vertical period delay circuit 5b receives the inverter driving signal Vout2 from the ¼ vertical period delay circuit 5a, and outputs an inverter driving signal Vout3 by delaying the inverter driving signal Vout2 by a ¼ vertical period. The ¼ vertical period delay circuit 5c receives the inverter driving signal Vout3 from the ¼ vertical period delay circuit 5b, and outputs an inverter driving signal Vout4 by delaying the inverter driving signal Vout3 by a ¼ vertical period.

The backlight portion 4a includes a backlight power supply circuit 41, four inverters 42a through 42d, and four fluorescent lamps 43a through 43d. The fluorescent lamps 43a through 43d are provided on the back surface of the liquid crystal panel 14, respectively, in light-emission regions obtained by dividing the liquid crystal panel 14 by four in a vertical direction. The backlight power supply circuit 41 supplies the inverters 42a through 42d with power, and the inverters 42a through 42d respectively drive the fluorescent lamps 43a through 43d independently by applying voltages corresponding to the inverter driving signals Vout1 through Vout4 to the fluorescent lamps 43a through 43d, respectively.

Figure 6:
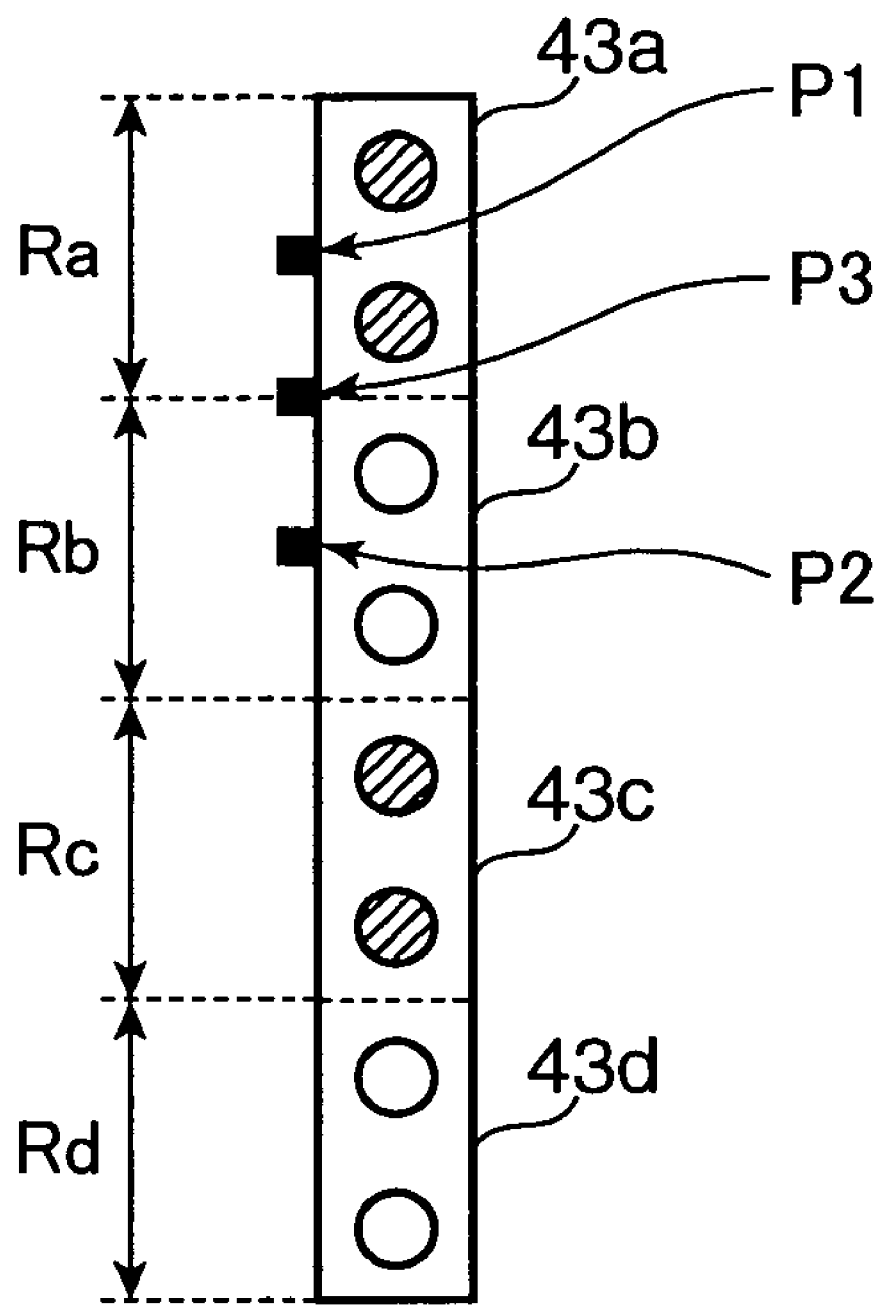
FIG. 6 is a schematic view used to describe locations of fluorescent lamps shown in FIG. 5.

FIG. 6 is a schematic view used to describe the locations of the fluorescent lamps 43a through 43d shown in FIG. 5. As is shown in FIG. 6, the fluorescent lamp 43a illuminates a light-emission region Ra at the uppermost portion of the liquid crystal panel 14 from behind. The fluorescent lamp 43b illuminates a light-emission region Rb below the light-emission region Ra from behind. The fluorescent lamp 43c illuminates a light-emission region Rc below the light-emission region Rb from behind. The fluorescent lamp 43d illuminates a light-emission region Rd at the lowermost portion of the liquid crystal panel 14 from behind. In this embodiment, the liquid crystal panel 14 is divided by four in the vertical direction. It should be appreciated, however, that the dividing number is not particularly limited to the number specified in this case, and any dividing number, for example, eight, can be used as well.

In this embodiment, the fluorescent lamps 43a through 43d correspond to one example of the light source, and the PWM dimming driving circuit portion 3, the backlight power supply circuit 41, and the inverters 42a through 42d correspond to one example of the light source driving portion. The rest is the same as the first embodiment.

Of the backlight dimming operation by the liquid crystal display configured as above, the black insertion dimming by the backlight will now be described more in detail. As is shown in FIG. 6, the black insertion dimming is performed on the respective fluorescent lamps 43a through 43d for the respective light-emission regions Ra through Rd at the most appropriate timing. Hence, at the boundary of the adjacent light-emission regions, beams of light in the both light-emission regions are mixed. This makes it impossible to improve the edge blur sufficiently in the vicinity of the boundary.

For example, in a case where the black insertion dimming is performed for the center point P1 of the light-emission region Ra and the center point P2 of the light-emission region Rb at the most appropriate timing while the light-emission region Ra is in the light-OFF period (black insertion period) and the light-emission region Rb is in the light-ON period, because a light emission state of the light-emission region Ra and a light emission state of the light-emission region Rb are mixed at the boundary point P3 of the light-emission region Ra and the light-emission region Rb, the effect of the black insertion dimming cannot be achieved sufficiently.

FIGS. 7A through 7E are timing charts used to describe a variance of the luminance level caused by the black insertion dimming in the liquid crystal display shown in FIG. 5. Because the PWM dimming is the same as the one in the first embodiment, the illustration of portions relating to the PWM dimming are omitted in FIGS. 7A through 7E and FIGS. 8A through 8E described below.

In this embodiment, the black insertion period of the fluorescent lamp 43d ends and the black insertion period of the fluorescent lamp 43a starts in sync with the vertical synchronization signal Vsyn. The black insertion period of the fluorescent lamp 43a ends and the black insertion period of the fluorescent lamp 43b starts at timing delayed by a ¼ vertical period from the vertical synchronization signal Vsyn. The black insertion period of the fluorescent lamp 43b ends and the black insertion period of the fluorescent lamp 43c starts at timing delayed by a 2/4 vertical period from the vertical synchronization signal Vsyn. The black insertion period of the fluorescent lamp 43c ends and the black insertion period of the fluorescent lamp 43d starts at timing delayed by a ¾ vertical period from the vertical synchronization signal Vsyn.

Figure 7:
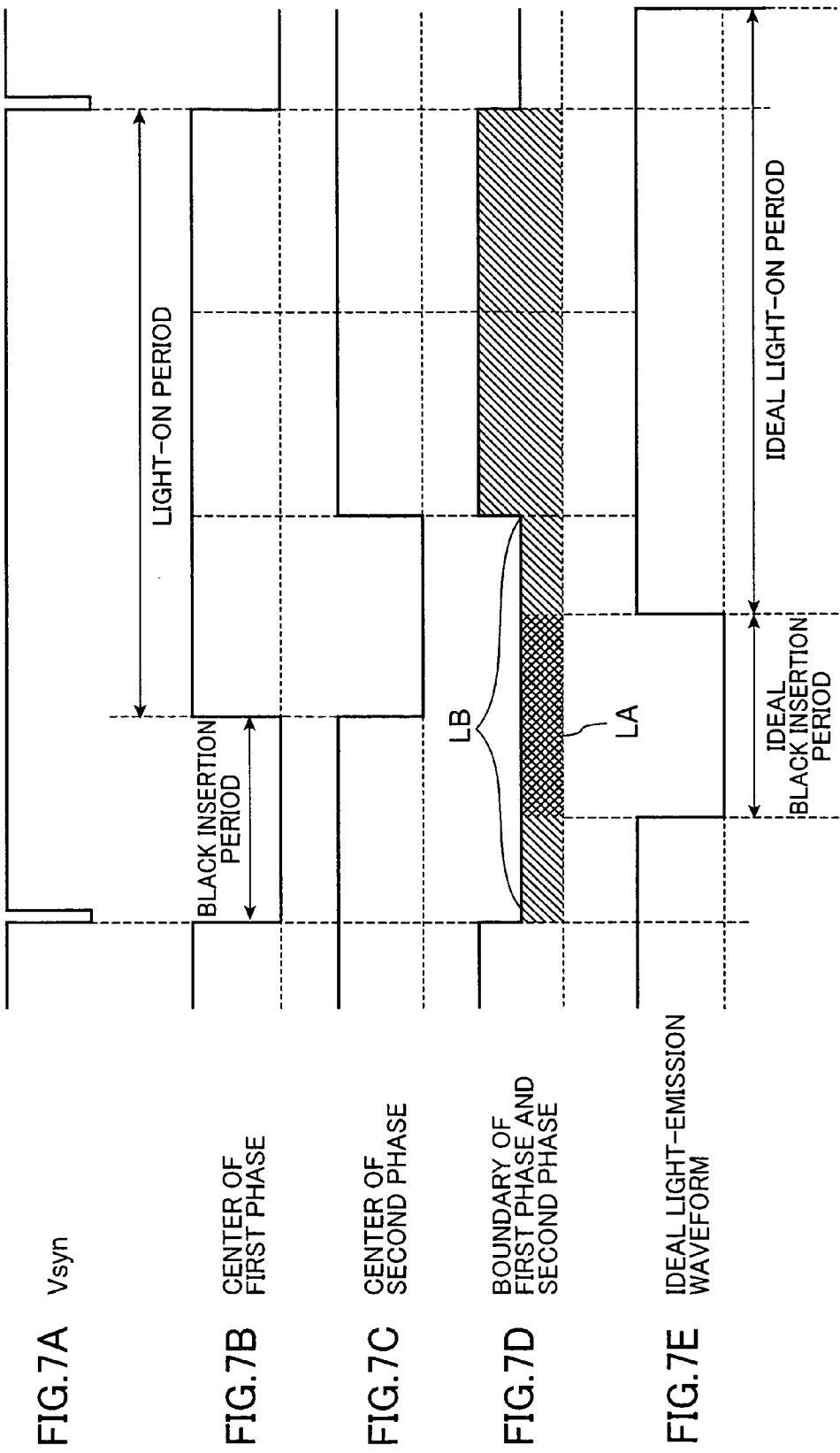
FIGS. 7A through 7E are timing charts used to describe a change of the luminance level caused by black insertion dimming in the liquid crystal display shown in FIG. 5.

Accordingly, the light-emission waveforms at the center point P1 of a first phase and the center point P2 of a second phase are shaped into the waveforms shown in FIG. 7B and FIG. 7C, respectively. The luminance level of the light-emission waveform at the boundary point P3 of the first phase and the second phase where the both waveforms are mixed is reduced to half from the falling timing of the vertical synchronization signal Vsyn to a ½ vertical period as is shown in FIG. 7D, which does not coincide with an ideal light-emission waveform shown in FIG. 7E.

Figure 8:
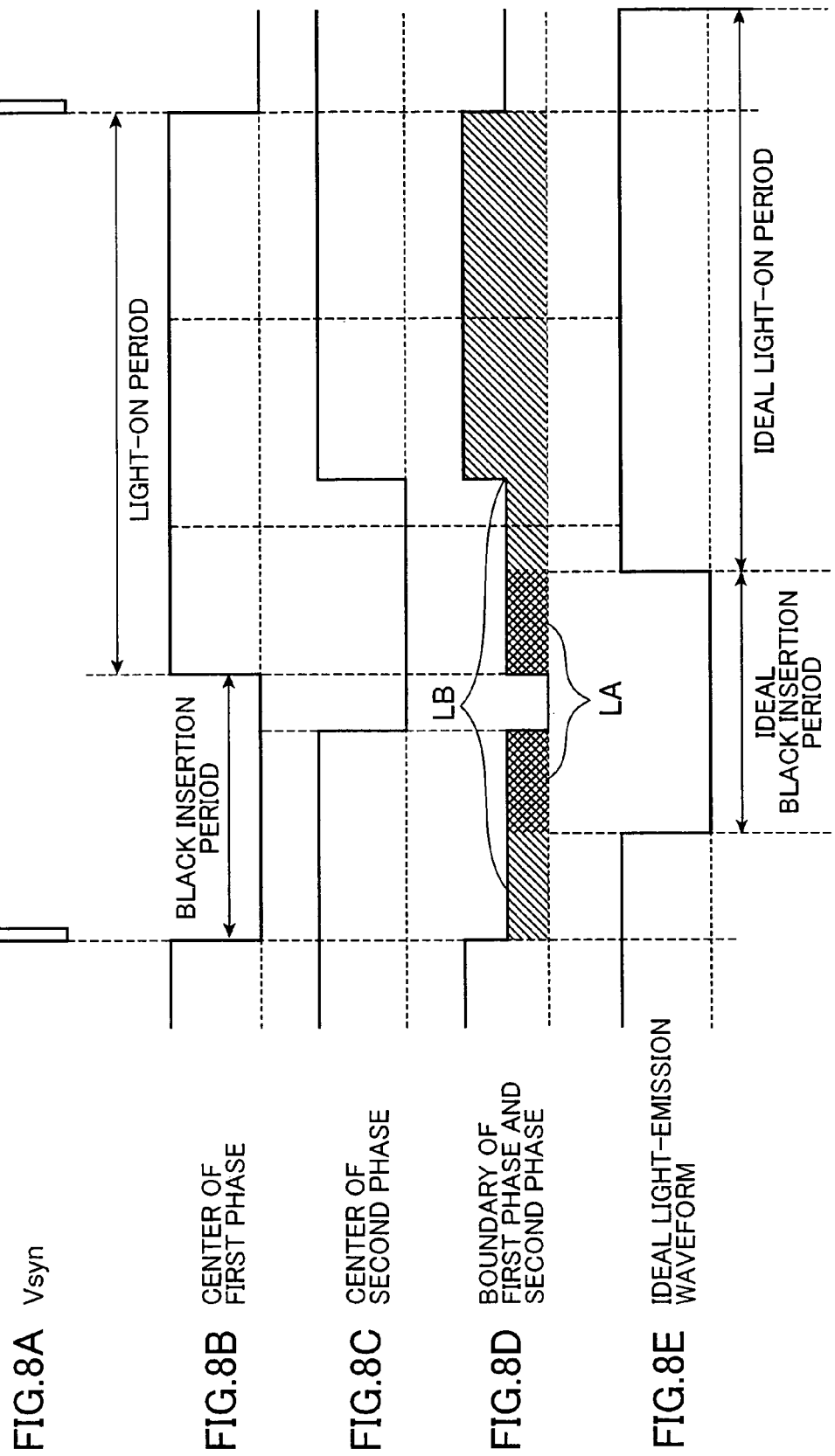
FIGS. 8A through 8E are timing charts used to describe a change of the luminance level caused by the black insertion dimming in the liquid crystal display shown in FIG. 5.

FIGS. 8A through 8E are timing charts used to describe a variance of the luminance level caused by the black insertion dimming in the liquid crystal display shown in FIG. 5. The case shown in FIGS. 8A through 8E is a case where the black insertion period is made longer than a ¼ vertical period. The light-emission waveforms at the center point P1 of a first phase and the center point P2 of a second phase are shaped into the waveforms shown in FIG. 8B and FIG. 8C, respectively. The luminance level of the light-emission waveform at the boundary point P3 of the first phase and the second phase where the both waveforms are mixed is reduced to half from the falling timing of the vertical synchronization signal Vsyn to the end of the black insertion period of the second phase as is shown in FIG. 8D, and further, it is reduced to 0 from the end of the black insertion period of the first phase to the start of the black insertion period of the second phase, which does not coincide with the ideal light-emission waveform shown in FIG. 8E.

As has been described, because emissions of light from the both sides are mixed, the light-emission waveform deforms at the end portion in comparison with the center portion of the light-emission region. A difference between the degree of motion picture blur at the center portion of the light-emission region and the degree of motion picture blur at the end portion gives rise to irregular motion picture blur. Herein, assume that the light-emission waveform at the center portion of the light-emission region is an ideal light-emission waveform, and a luminance level ratio (SA/(SA+SB)) of a luminance level during one vertical period (for example, a sum value of the area SA of the region LA and the area SB of the region LB shown in FIG. 7D and FIG. 8D) with respect to a luminance level (for example, the area SA of the region LA shown in FIG. 7D and FIG. 8D) during an ideal black insertion period (light-OFF period) is given as the index in the light-emission waveform at the end portion where emissions of light from the light-emission waveforms on the both sides are mixed evenly, the ratio is 0 in the ideal waveform, and it indicates that the greater the value of the ratio becomes, the less the irregular motion picture blur is improved. It is therefore possible to measure the degree of the irregular motion picture blur using the luminance level ratio (SA/(SA+SB)).

Figure 9:
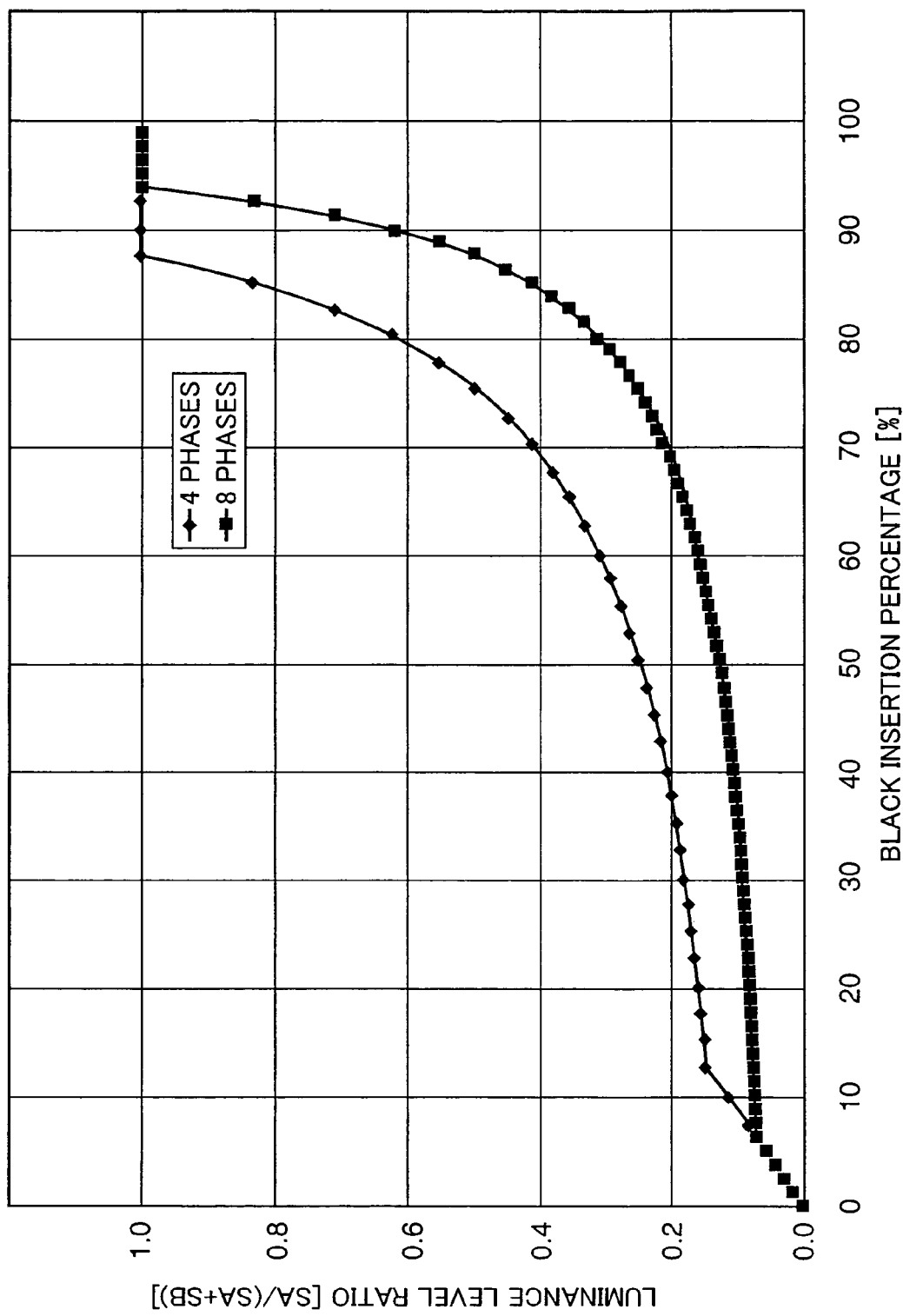
FIG. 9 is a view showing a relation of the black insertion percentage and a luminance level ratio.

FIG. 9 is a view showing a relation of the black insertion percentage and the luminance level ratio. The case shown in FIG. 9 indicates a relation of the black insertion percentage and the luminance level ratio in the cases of four phases (four light-emission regions Ra through Rd are formed by four fluorescent lamps 43a through 43d shown in FIG. 6, and the black insertion periods are shifted successively by a ¼ vertical period) and eight phases (eight light-emission regions are formed by eight fluorescent lamps and the black insertion periods are shifted successively by a ⅛ vertical period). The black insertion percentage indicates a percentage of the black insertion period in one vertical period. It is understood from FIG. 9 that the luminance level ratio becomes smaller as the black insertion percentage is smaller, and it follows that it is necessary to reduce the black insertion percentage, that is, shorten the black insertion period, in order to improve the irregular motion picture blur.

Figure 10:
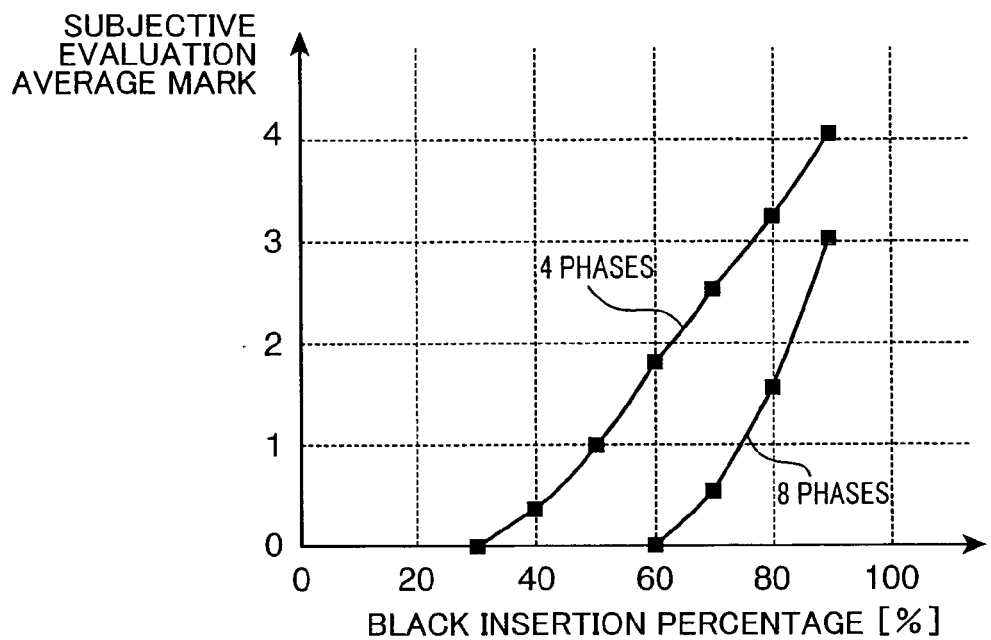
FIG. 10 is a view showing a subjective evaluation result on irregular motion picture blur when the black insertion percentage is varied.

FIG. 10 is a view showing a subjective evaluation result on the irregular motion picture blur when the black insertion percentage is varied. The subjective evaluation evaluates whether the motion picture blur at the end portion is improved with respect to the motion picture blur at the center portion of the light-emission region as the irregular motion picture blur. The subjective evaluation average mark 4 indicates that the irregular motion picture blur is annoying. The subjective evaluation average mark 3 indicates that the irregular motion picture blur is noticeable. The subjective evaluation average mark 2 indicates that the irregular motion picture blur is slightly noticeable. The subjective evaluation average mark 1 indicates that the irregular motion picture blur is within an allowable range. The subjective evaluation average mark 0 indicates that the irregular motion picture blur is not detected. Given the subjective evaluation average mark 1 indicating that the irregular motion picture blur is within an allowable range as the upper limit value, then, it is understood from FIG. 10 that the black insertion percentage is 50% or less in the case of four phases and the black insertion percentage is 75% or less in the case of eight phases. Hence, given M as the number of phases of the light-emission region (fluorescent lamp), then, the irregular motion picture blur is within an allowable range when the percentage of the black insertion period in one vertical period is (M−2)/M or less (M is an integer equal to 3 or greater).

Figure 11:
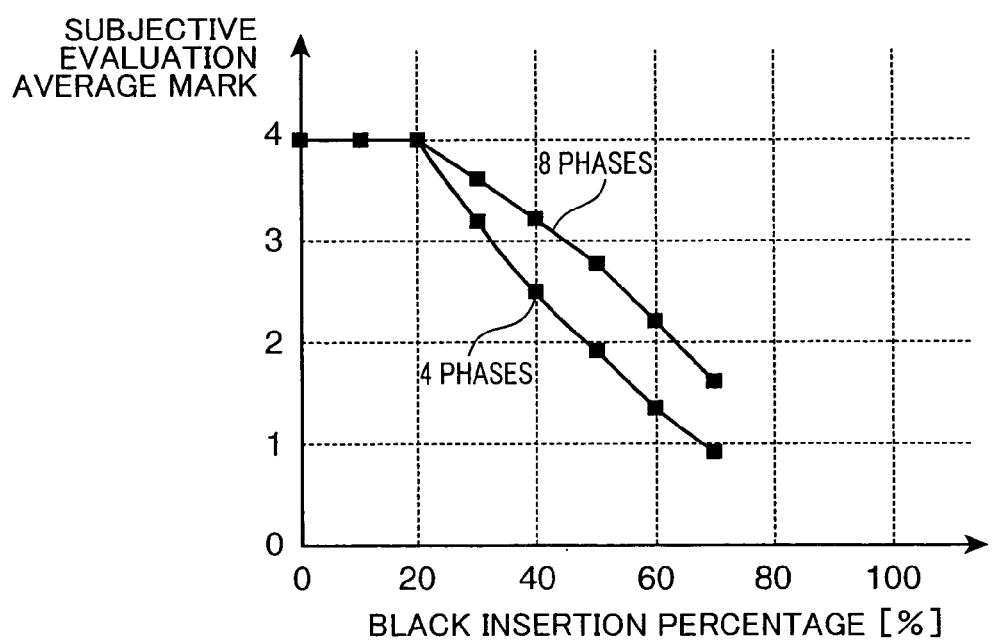
FIG. 11 is a view showing an objective evaluation result on motion picture blur when the black insertion percentage is varied.

FIG. 11 is a view showing a subjective evaluation result on the motion picture blur when the black insertion percentage is varied. This subjective evaluation evaluates whether the motion picture blur is improved across the entire screen as the motion picture blur. The subjective evaluation average mark 4 indicates that the motion picture blur has not changed. The subjective evaluation average mark 3 indicates that the motion picture blur is improved slightly. The subjective evaluation average mark 2 indicates that the motion picture blur is improved. The subjective evaluation average mark 1 indicates that the motion picture blur is slightly noticeable. The subjective evaluation average mark 0 indicates that no motion picture blur is noticeable. Given the achievement of the effect on the motion picture blur, that is, the subjective evaluation average mark 4, as the upper limit value, then, it is understood from FIG. 11 that the black insertion percentage is 20% or greater in both the cases of four phases and eight phases. Given the subjective evaluation average mark 3 indicating that the motion picture bur is slightly noticeable as the upper limit value, then, it is understood from FIG. 11 that the black insertion percentage is 30% or greater in the case of four phases and the black insertion percentage is 45% or greater in the case of eight phases.

Figure 12:
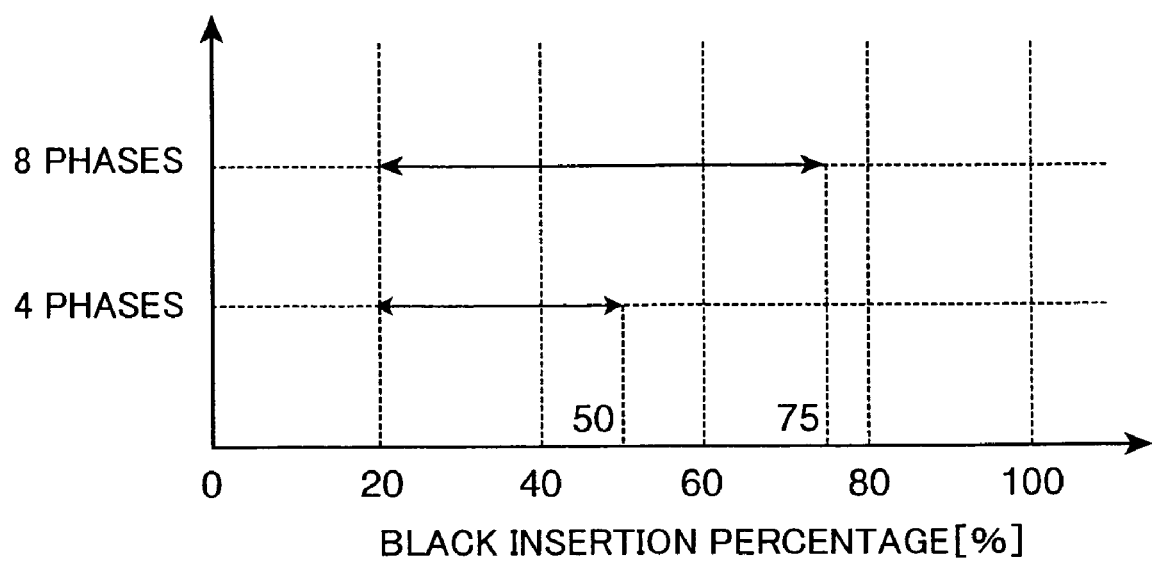
FIG. 12 is a view showing a preferable range of the black insertion percentage.

FIG. 12 is a view showing a preferable range of the black insertion percentage. From the subjective evaluations of FIG. 10 and FIG. 11, it is preferable that the black insertion percentage is 20% or greater and 50% or less in the case of four phases, and 20% or greater and 75% or less in the case of eight phases. Also, given the subjective evaluation average mark 3 of FIG. 11 as the upper limit value, then, it is preferable that the black insertion percentage is 30% or greater and 50% or less in the case of four phases and 45% or greater and 75% or less in the case of eight phases.

As has been described, in this embodiment, the black insertion period during which the respective fluorescent lamps 43*a* through 43*d* are lit OFF and the light-ON period during which these lamps are lit ON are provided within one vertical period, and the black insertion period can be inserted at phases such that make the motion picture visibility satisfactory for the four fluorescent lamps 43*a* through 43*d*. It is thus possible to enhance the motion picture visibility across the entire liquid crystal panel. Also, because the fluorescent lamps 43*a* through 43*d* are PWM-driven in such a manner so as to be lit ON and lit OFF repetitively during the respective light-ON periods, it is possible to perform the dimming over a broad range in a stable manner at a low current without generating unwanted pulses.

Third Embodiment

Figure 13:
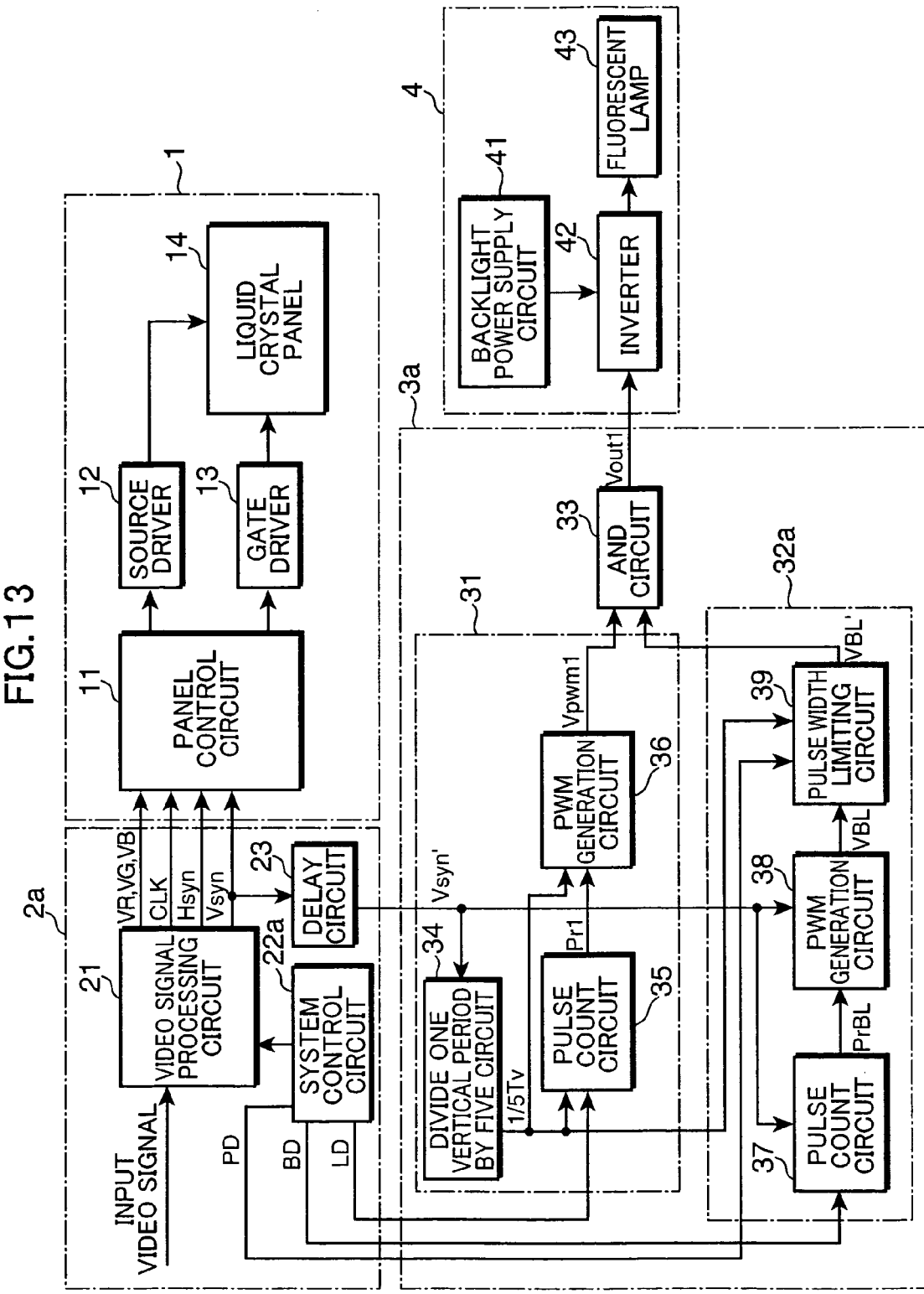
FIG. 13 is a block diagram showing the configuration of a liquid crystal display according to a third embodiment of the invention.
Figure 14:
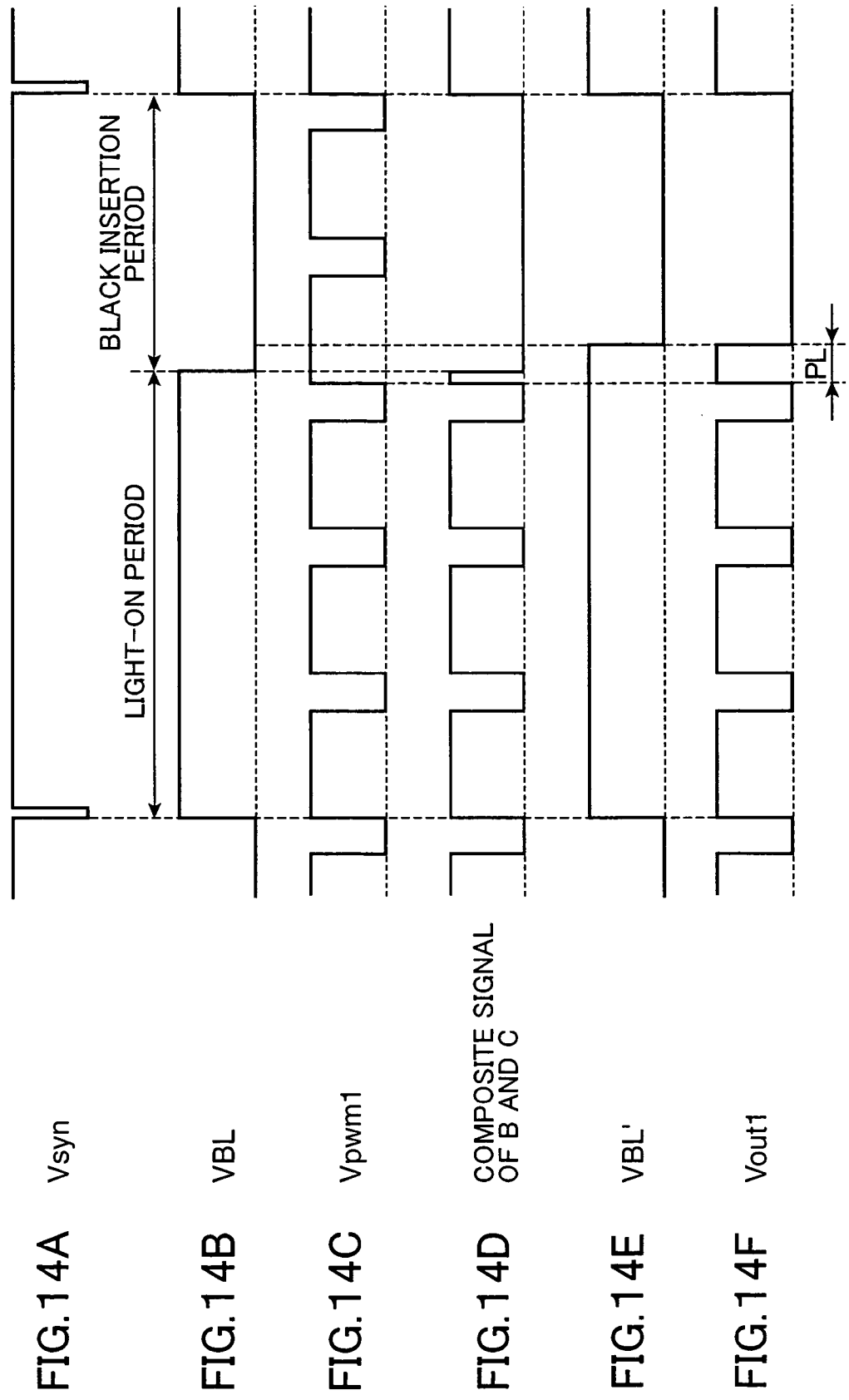
FIGS. 14A through 14F are timing charts used to describe a whisker pulse limiting operation by the liquid crystal display shown in FIG. 13.

A liquid crystal display according to a third embodiment of the invention will now be described. FIG. 13 is a block diagram showing the configuration of the liquid crystal display according to the third embodiment of the invention. The liquid crystal display shown in FIG. 13 differs from the liquid crystal display shown in FIG. 1 in that the system control circuit 22 is replaced with a system control circuit 22*a* that also outputs whisker pulse limiting duty data PD and the black insertion dimming PWM generation portion 32 is replaced with a black insertion dimming PWM generation portion 32*a* further provided with a pulse width limiting circuit 39. Because the rest is the same as the liquid crystal display shown in FIG. 1, descriptions of these components are omitted herein by labeling like components with like reference numerals, and different portions will be described in detail hereinafter.

The system control circuit 22*a* generates the black insertion duty data BD and the light-ON duty data LD as well as whisker pulse width limiting duty data PD to limit the pulse width of a whisker pulse in such a manner that the pulse width of a whisker pulse, which is a narrow pulse of the inverter driving signal Vout1 outputted from the AND circuit 33, will not become smaller than a specific value. For example, the minimum pulse width at which the inverter 42 is able to operate in a stable manner is found in advance from an experiment or the like, and the system control circuit 22*a* has pre-stored the data to limit the pulse width of a whisker pulse to this pulse width as the whisker pulse width limiting duty data PD.

The pulse width limiting circuit 39 receives the divide-by-five synchronization signal 1/5Tv from the divide one vertical period by five circuit 34, the whisker pulse width limiting duty data PD from the system control circuit 22*a*, and the black insertion PWM pulse VBL from the PWM generation circuit 38, and outputs to the AND circuit 33 a black insertion PWM pulse VBL' after the improvement of a whisker pulse, which is obtained by extending the light-ON period of the black insertion PWM pulse VBL so as to limit the pulse width of a whisker pulse of the inverter driving signal Vout1 to the pulse width corresponding to the whisker pulse width limiting duty data PD.

In this embodiment, the video processing portion 2*a*, the panel control circuit 11, the source driver 12, and the gate driver 13 correspond to one example of the panel driving portion, the PWM dimming driving circuit portion 3*a*, the backlight power supply circuit 41, and the inverter 42 correspond to one example of the light source driving portion, the luminance dimming PWM generation portion 31 corresponds to one example of the first signal generation portion, the pulse count circuit 37 and the PWM generation circuit 38 correspond to one example of the second signal generation portion, the pulse width limiting circuit 39 corresponds to one example of the limiting portion, and the AND circuit 33, the backlight power supply circuit 41, and the inverter 42 correspond to one example of the driving portion. The rest is the same as the first embodiment.

The whisker pulse limiting operation by the liquid crystal display configured as above will now be described. FIGS. 14A through 14F are timing charts used to describe the whisker pulse limiting operation by the liquid crystal display shown in FIG. 13. A case where the black insertion period is provided after the light-ON period will be described hereinafter. It should be appreciated, however, that a whisker pulse can be limited in the same manner as descried below even in a case where the black insertion period is provided before the light-ON period.

As are shown in FIGS. 14B and 14C, when the PWM generation circuit 38 outputs the black insertion PWM pulse VBL and the PWM generation circuit 36 outputs the dimming PWM pulse Vpwm1, a composite signal of these pulses is shaped into the waveform shown in FIG. 14D. A whisker pulse is therefore generated immediately before the light-ON period ends. Hence, in this embodiment, the pulse width limiting circuit 39 outputs the improved black insertion PWM pulse VBL' as shown in FIG. 14E obtained by extending the light-ON period of the black insertion PWM pulse VBL. As a consequence, the inverter driving signal Vout1 outputted from the AND circuit 33 is shaped into the waveform as shown in FIG. 14F. The pulse width of a whisker pulse is thus limited to the whisker pulse limiting width PL.

Figure 15:
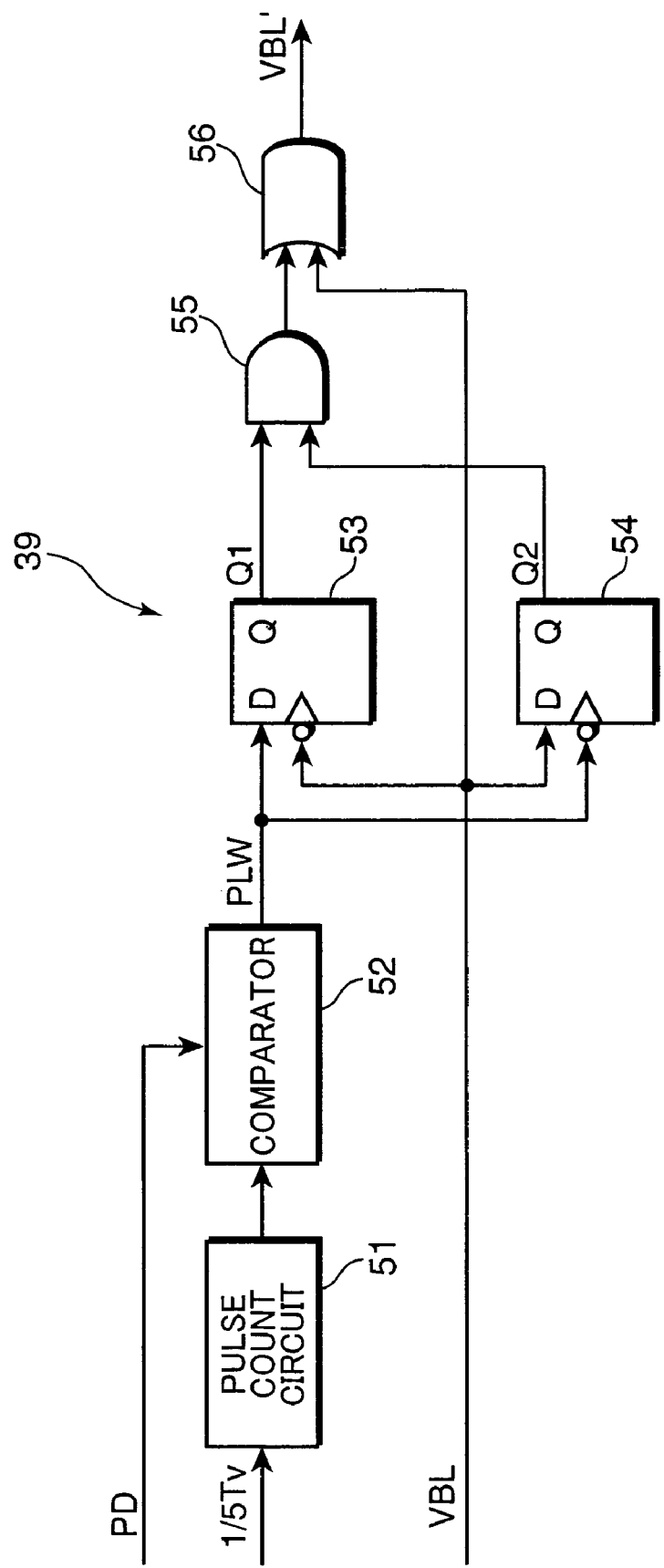
FIG. 15 is a circuit diagram showing an example of the configuration of a pulse width limiting circuit shown in FIG. 13.

The pulse width limiting circuit 39 will now be described more concretely. FIG. 15 is a circuit diagram showing an example of the configuration of the pulse width limiting circuit 39 shown in FIG. 13. As is shown in FIG. 15, the pulse width limiting circuit 39 includes a pulse count circuit 51, a comparator 52, a D-flipflops 53 and 54, an AND gate 55, and an OR gate 56. The pulse count circuit 51 starts a counting operation in sync with the divide-by-five synchronization signal 1/5Tv, and outputs the count value to the comparator 52. The comparator 52 compares the count value from the pulse count circuit 51 with the whisker pulse width limiting duty data PD, and outputs a limiting pulse PLW having a pulse width same as the whisker pulse limiting width PL to the input terminal D of the D-flipflop 53 and the clock terminal of the D-flipflop 54 in sync with the divide-by-five synchronization signal 1/5Tv. Also, the black insertion PWM pulse VBL is inputted into the clock terminal of the D-flipflop 53 and the input terminal D of the D-flipflop 54. The AND gate 55 outputs an AND of an output Q1 of the D-flipflop 53 and an output Q2 of the D-flipflop 54. The OR gate 56 outputs an OR of an output of the AND gate 55 and the black insertion PWM pulse VBL as the improved black insertion PWM pulse VBL'.

Figure 16:
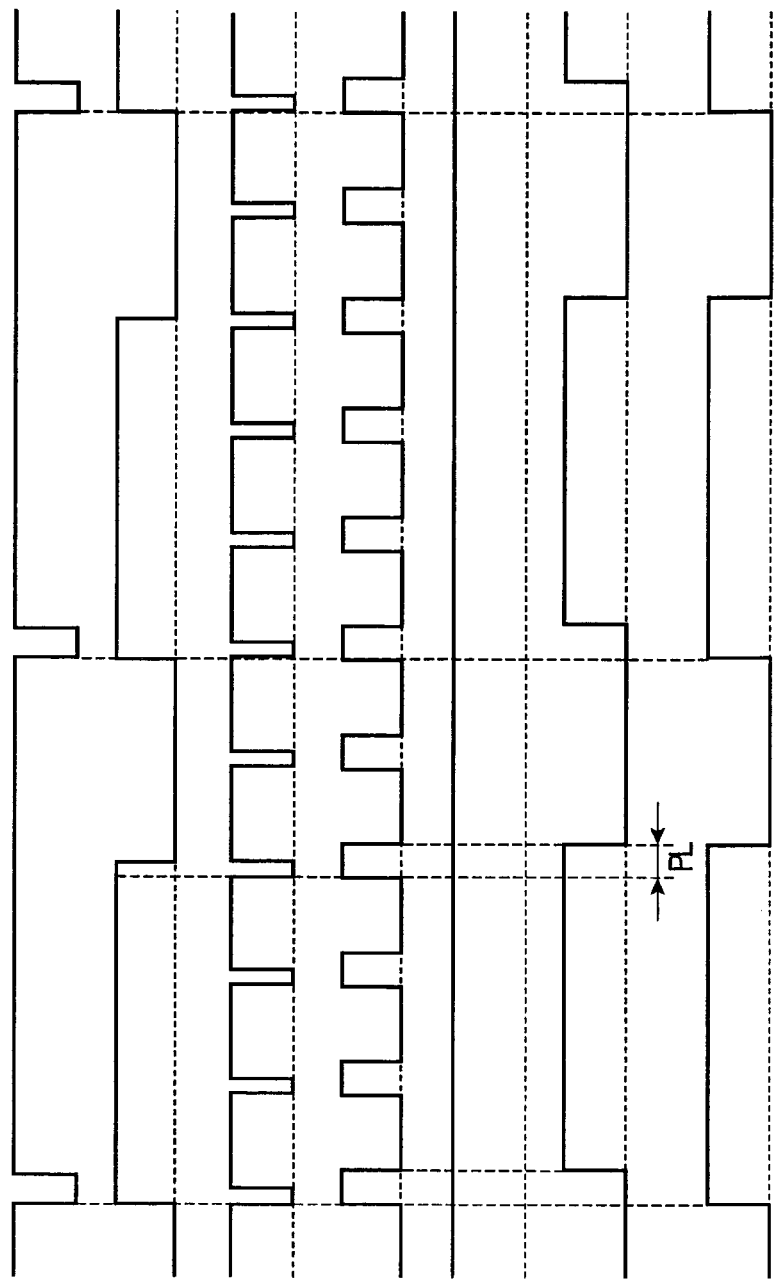
FIGS. 16A through 16G are timing charts used to describe an operation of the pulse width limiting circuit shown in FIG. 15.

FIGS. 16A through 16G are timing charts used to describe operations of the pulse width limiting circuit 39 shown in FIG. 15. When the divide-by-five synchronization signal 1/5Tv shown in FIG. 16C is inputted into the pulse count circuit 51, the comparator 52 outputs the limiting pulse PLW having a pulse width same as the whisker pulse limiting width PL as shown in FIG. 16D. In this instance, the output Q1 of the D-flipflop 53 is shaped into the waveform shown in FIG. 16E and the output Q2 of the D-flipflop 54 is shaped into the waveform shown in FIG. 16F. The OR gate 56 outputs the improved black insertion PWM pulse VBL' shown in FIG. 16G.

As a consequence, the black insertion PWM pulse VBL shown in FIG. 16B is changed to the improved black insertion PWM pulse VBL' that is extended to the falling of the limiting pulse PLW having the whisker pulse limiting width PL. Hence, as was described using FIG. 14, the pulse width of a whisker pulse is limited to the whisker pulse limiting width PL.

As has been described, in this embodiment, not only is it possible to achieve the same effect as the first embodiment, but it is also possible to always limit the pulse width of a whisker pulse to the whisker pulse limiting width PL. It is therefore possible to perform the dimming over a broad range in a stable manner at a low current without generating unwanted pulses.

Fourth Embodiment

Figure 17:
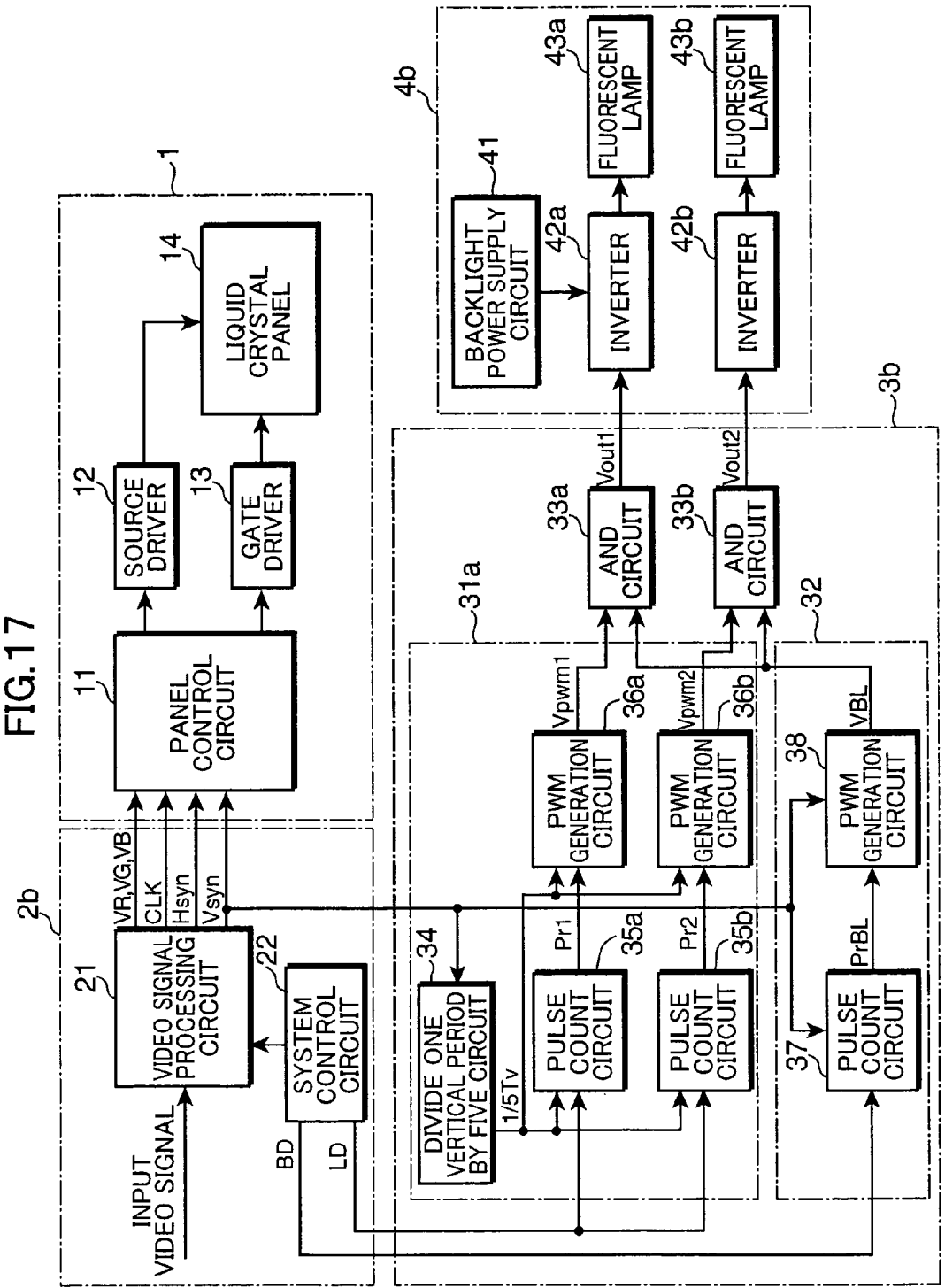
FIG. 17 is a block diagram showing the configuration of a liquid crystal display according to a fourth embodiment of the invention.
Figure 18:
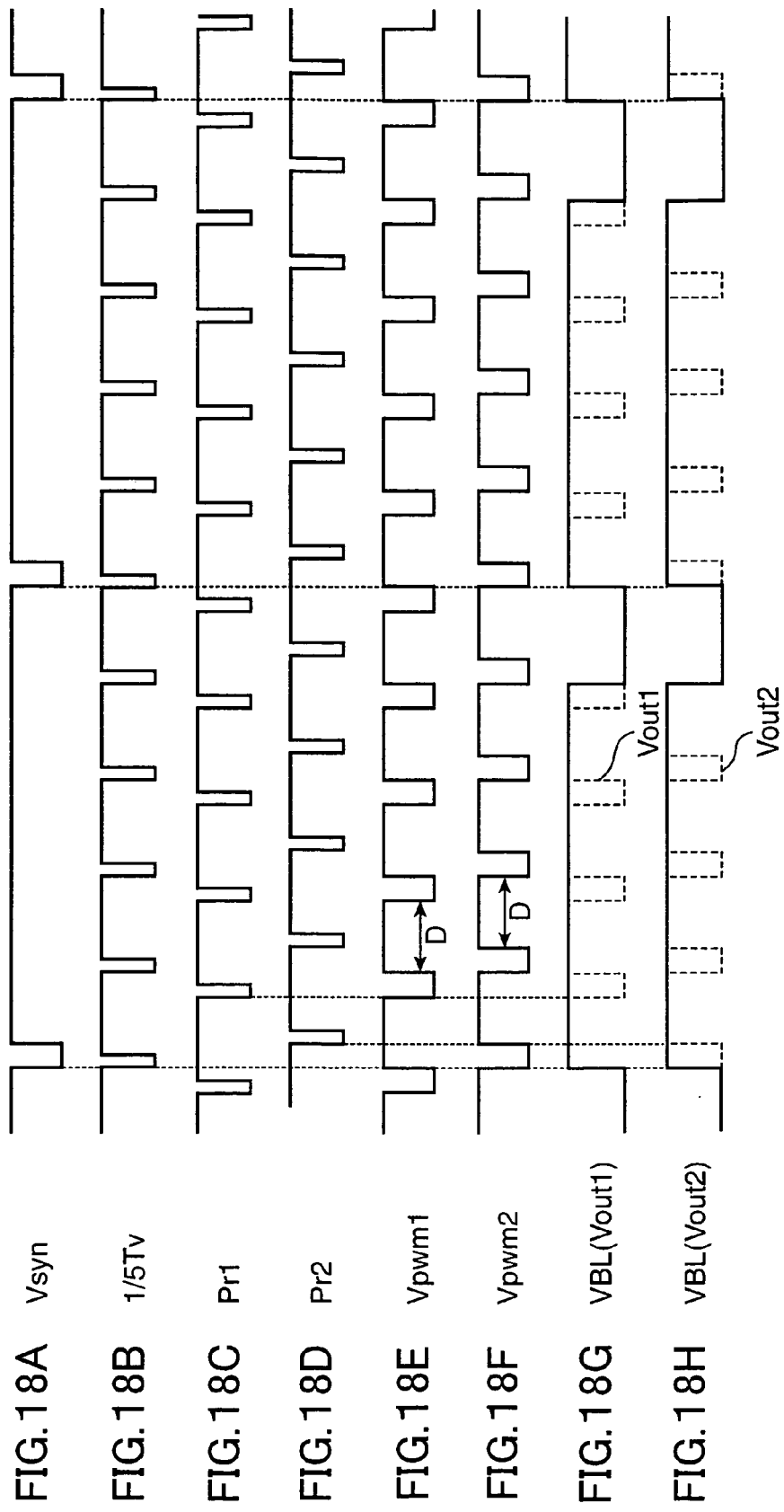
FIGS. 18A through 18H are timing charts used to describe a backlight dimming operation by the liquid crystal display shown in FIG. 17.

A liquid crystal display according to a fourth embodiment of the invention will now be described. FIG. 17 is a block diagram showing the configuration of the liquid crystal display according to the fourth embodiment of the invention. The liquid crystal display shown in FIG. 17 includes a liquid crystal module 1, a video processing portion 2b, a PWM dimming driving circuit portion 3b, and a backlight portion 4b.

As the liquid crystal module 1, those of the active matrix driving method using TFT's (Thin Film Transistors) can be used. The liquid crystal module 1 includes a liquid crystal panel 14, a source driver 12 and a gate driver 13 that drive the liquid crystal panel, and a panel control circuit 11 that displays an image on the liquid crystal panel 14 via the source driver 12 and the gate driver 13. Assume that according to the display driving method of the source driver 12 and the gate drier 13, scanning is performed successively from the uppermost line of the screen to the lowermost line of the screen.

The video processing portion 2b comprises a video signal processing circuit 21 and a system control circuit 22. The video signal processing circuit 21 converts an input video signal, such as a video signal of a TV signal, to a format suitable to the processing performed inside the liquid crystal module 1. The system control circuit 22 comprises a micro computer, and controls the device in response to operations (the operation terminal is omitted from the drawing) by the user. The video signal processing circuit 21 outputs video signals VR, VG, and VB separated into three primary colors (RGB), a vertical synchronization signal Vsyn, a horizontal synchronization signal Hsyn, and a pixel clock CLK from an input video signal.

The backlight portion 4b comprises two fluorescent lamps 43a and 43b (corresponding to light-emission regions) provided on the back surface of the liquid crystal panel 14, inverters 42a and 42b that respectively drive the fluorescent lamps 43a and 43b independently by applying voltages thereto, and a backlight power supply circuit 41 that supplies the inverters 42a and 42b with power.

The PWM dimming driving circuit portion 3b comprises a luminance dimming PWM generation portion 31a, a black insertion dimming PWM generation portion 32, and AND circuits (signal waveform superimposing circuits) 33a and 33b.

The luminance dimming PWM generation portion 31a comprises a divide one vertical period by five circuit 34 that receives the vertical synchronization signal Vsyn and outputs a divide-by-five synchronization signal 1/5Tv that divides one vertical period by five, a pulse count circuit 35a that receives the luminance dimming light-ON duty data LD from the system control circuit 22 and the divide-by-five synchronization signal 1/5Tv and outputs a light-OFF start timing signal Pr1 that gives a PWM dimming OFF instruction at a point in time at which the PWM dimming ON period according to the light-ON duty data LD has passed since the synchronization timing of the divide-by-five synchronization signal 1/5Tv, a pulse count circuit 35b that receives the luminance dimming light-ON duty data LD from the system control circuit 22 and the divide-by-five synchronization signal 1/5Tv and outputs a light-ON start timing signal Pr2 that gives a PWM dimming ON instruction at a point in time at which the PWM dimming OFF period according to the light-ON duty data LD has passed since the synchronization timing of the divide-by-five synchronization signal 1/5Tv, a PWM generation circuit 36a that receives the light-OFF start timing signal Pr1 and the divide-by-five synchronization signal 1/5Tv and outputs a PWM dimming pulse Vpwm1 that starts the PWM dimming ON period in sync with the divide-by-five synchronization signal 1/5Tv and starts the PWM dimming OFF period in sync with the light-OFF start timing signal Pr1, and a PWM generation circuit 36b that receives the light-ON start timing signal Pr2 and the divide-by-five synchronization signal 1/5Tv and outputs a PWM dimming pulse Vpwm2 that starts the PWM dimming OFF period in sync with the divide-by-five synchronization signal 1/5Tv and starts the PWM dimming ON period in sync with the light-ON start timing signal Pr2.

The black insertion dimming PWM generation portion 32 comprises a pulse count circuit 37 that receives the vertical synchronization signal Vsyn and the black insertion duty data BD for black insertion dimming and outputs a light-OFF start timing signal PrBL according to the black insertion duty data BD, and a PWM generation circuit 38 that receives the vertical synchronization signal Vsyn and the light-OFF start timing signal PrBL and outputs a black insertion PWM pulse VBL.

The AND circuits 33a and 33b respectively output inverter driving signals Vout1 and Vout2 by respectively superimposing the PWM dimming pulse Vpwm1 and the PWM dimming pulse Vpwm2 on the black insertion PWM pulse VBL. The inverters 42a and 42b respectively drive two light-emission regions (fluorescent lamps 43a and 43b) independently using the inverter driving signals Vout1 and Vout2, respectively.

In this embodiment, the video processing portion 2b, the panel control circuit 11, the source driver 12, and the gate driver 13 correspond to one example of the panel driving portion, the fluorescent lamps 43a and 43b correspond to one example of the light source, and the PWM dimming driving circuit portion 3b, the backlight power supply circuit 41, and the inverters 42a and 42b correspond to one example of the light source driving portion. The rest is the same as the first embodiment.

The backlight dimming operation by the liquid crystal display configured as above will now be described. FIGS. 18A through 18H are timing charts used to describe the backlight dimming operation by the liquid crystal display shown in FIG. 17.

As is shown in FIGS. 18A through 18H, the divide one vertical period by five circuit 34 receives the vertical synchronization signal Vsyn from the video signal processing circuit 21, and outputs the divide-by-five synchronization signal 1/5Tv having a frequency five times the received frequency. The pulse count circuits 35a and 35b receive the luminance dimming light-ON duty data LD from the system control circuit 22 and the divide-by-five synchronization signal 1/5Tv, and respectively output the light-OFF start timing signal Pr1 having the start timing of the ON period same as the synchronization timing of the divide-by-five synchronization signal 1/5Tv and the light-ON period determined according to the light-ON duty data LD, and the light-ON start timing signal Pr2 having the start timing of the OFF period same as the synchronization timing of the divide-by-five synchronization signal 1/5Tv and the light-ON period determined according to the light-ON duty data LD.

The PWM generation circuits 36a and 36b respectively receive the light-OFF start timing signal Pr1 and the light-ON start timing signal Pr2 as well as the divide-by-five synchronization signal 1/5Tv, and respectively output the PWM dimming pulses Vpwm1 and Vpwm2 having the pulse width D during the ON period (light-ON period).

The black insertion dimming PWM generation portion 32 receives the black insertion duty data BD from the system control circuit 22 and the vertical synchronization signal Vsyn, and generates the light-OFF start timing signal PrBL in the pulse count circuit 37, and generates the black insertion PWM pulse VBL that comes on by the vertical synchronization signal Vsyn and goes off at the timing of the light-OFF start timing signal PrBL in the PWM generation circuit 38.

The AND circuits 33a and 33b respectively output the inverter driving signals Vout1 and Vout2 by respectively superimposing the PWM dimming pulse Vpwm1 and the PWM dimming pulse Vpwm2 on the black insertion PWM pulse VBL. In the backlight portion 4b, two light-emission regions (fluorescent lamps 43a and 43b) are independently dimmed by the inverter driving signals Vout1 and Vout2, respectively.

When attention is focused on arbitrary one cycle in each of the two kinds of the luminance dimming PWM dimming pulses Vpwm1 and Vpwm2, the light-ON period and the light-OFF period are disposed so that they are almost opposite to each other. It is therefore understood that light is emitted alternately as with a display on the TV by the interlace driving. Accordingly, it is possible to achieve the same effect achieved when the frequency of the luminance dimming PWM signal has doubled as with the interleave driving, which can in turn prevent or improve a flicker effectively.

In addition, because the PWM dimming pulses Vpwm1 and Vpwm 2 are set to have a frequency that is an integral multiple of the frequency of the vertical synchronization signal Vsyn, even when they are superimposed on the black insertion PWM pulse VBL, a whisker-shaped pulse will not be generated at the beginning of the vertical period. It is therefore possible to forestall a malfunction of the inverters 42a and 42b.

Further, because the light-ON period and the light-OFF period are consequently provided once within one vertical period of the black insertion PWM pulse VBL, it is also possible to improve the edge blur during the display of a motion picture. In this embodiment, the synchronization signal of the luminance dimming PWM signal is generated in the divide one vertical period by five circuit 34. It should be appreciated, however, that the synchronization signal does not necessarily divide one vertical period by five as long as it divides one vertical period by N (N=1, 2, 3, and so forth).

Another backlight dimming operation by the liquid crystal display configured as above will now be described. FIGS. 19A through 19H are timing charts used to describe another backlight dimming operation by the liquid crystal display shown in FIG. 17.

As are shown in FIGS. 19A through 19F, the divide-by-five synchronization signal 1/5Tv outputted from the divide one vertical period by five circuit 34, the light-OFF start timing signal Pr1 and the light-ON start timing signal Pr2 outputted from the pulse count circuits 35a and 35b, respectively, and the PWM dimming pulses Vpwm1 and Vpwm2 outputted from the PWM generation circuits 36a and 36b, respectively, are outputted in the same manner as FIGS. 18A through 18F.

Figure 19:
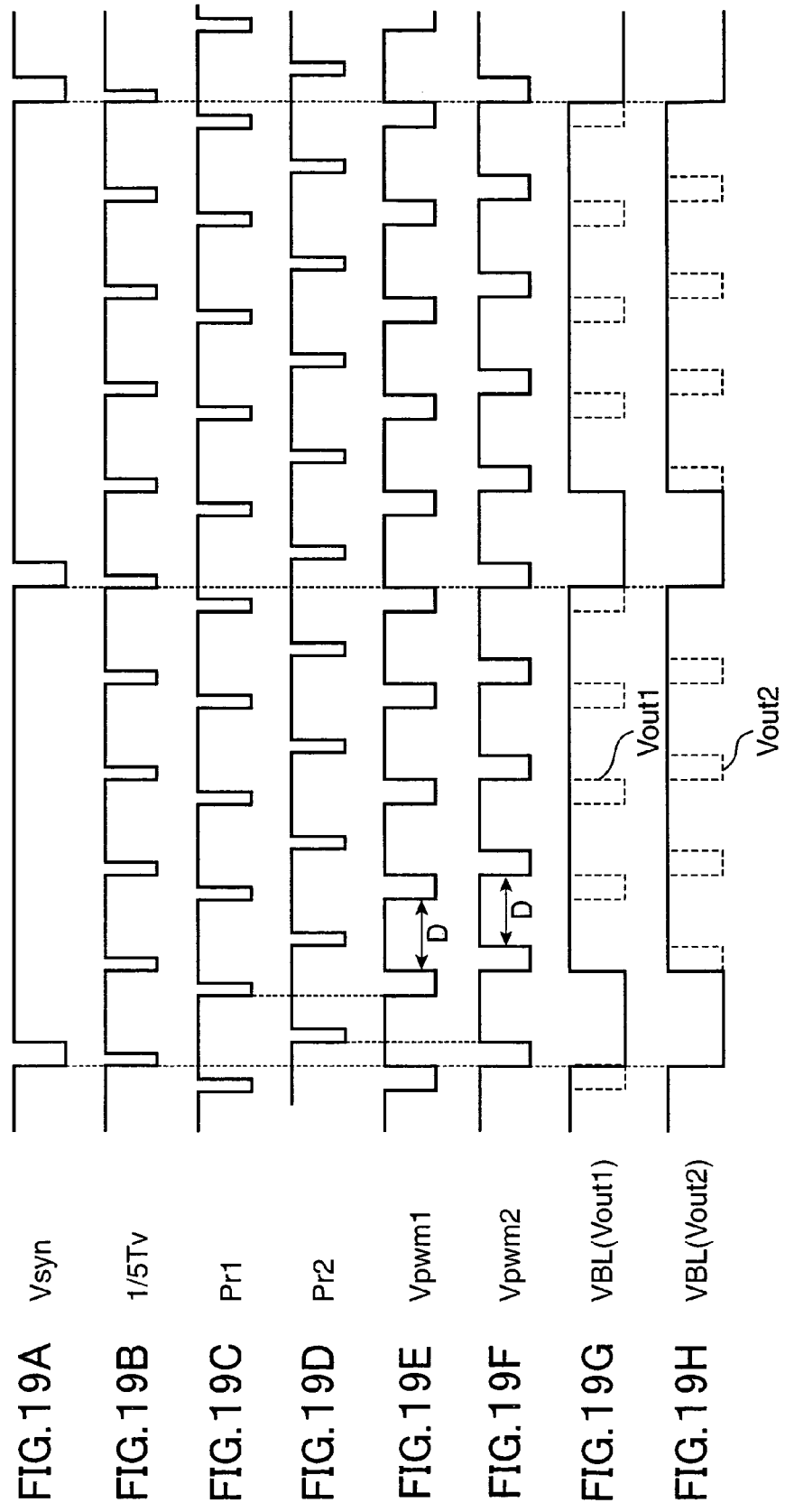
FIGS. 19A through 19H are timing charts used to describe another backlight dimming operation by the liquid crystal display shown in FIG. 17.

Subsequently, as are shown in FIG. 19G or FIG. 19H, the pulse count circuit 37 in the black insertion dimming PWM generation portion 32 receives the vertical synchronization signal Vsyn and the black insertion duty data BD, and outputs the light-ON start timing signal PrBL to generate the black insertion PWM pulse that starts the black insertion period in sync with the vertical synchronization signal Vsyn and has the black insertion period corresponding to the black insertion duty data BD. The PWM generation circuit 38 receives the vertical synchronization signal Vsyn and the light-ON start timing signal PrBL, and outputs the black insertion PWM pulse VBL that starts the black insertion period in sync with the vertical synchronization signal Vsyn and ends the black insertion period in sync with the light-ON start timing signal PrBL. The black insertion PWM pulse VBL to perform the black insertion dimming by the backlight for improving the motion picture visibility during the display of a motion picture is generated in this manner.

Subsequently, as is indicated by a broken line of FIG. 19G, the AND circuit 33a outputs the inverter driving signal Vout1 by superimposing the dimming PWM pulse Vpwm1 on the pulse of the light-ON period in the black insertion PWM pulse VBL. The inverter 42a lights ON or lights OFF the fluorescent lamp 43a using the inverter driving signal Vout1.

Also, as is indicated by a broken line of FIG. 19H, the AND circuit 33b outputs the inverter driving signal Vout2 by superimposing the dimming PWM pulse Vpwm2 on the pulse of the light-ON period of the black insertion PWM pulse VBL. The inverter 42b lights ON or lights OFF the fluorescent lamp 43b using the inverter driving signal Vout2.

As has been described above, in this embodiment, it is possible to provide the black insertion period of a certain period near the start point of the transition period of the liquid crystal panel 14 without being affected by the duty ratio of the dimming PWM pulse. It is therefore possible to perform the PWM dimming for adjusting the luminance of the liquid crystal panel 14 while performing concurrently the black insertion dimming by the backlight for improving the motion picture visibility during the display of a motion picture. As a consequence, in addition to the effect achieved by the backlight dimming operation shown in FIG. 18, the motion picture visibility can be enhanced further.

Fifth Embodiment

Figure 20:
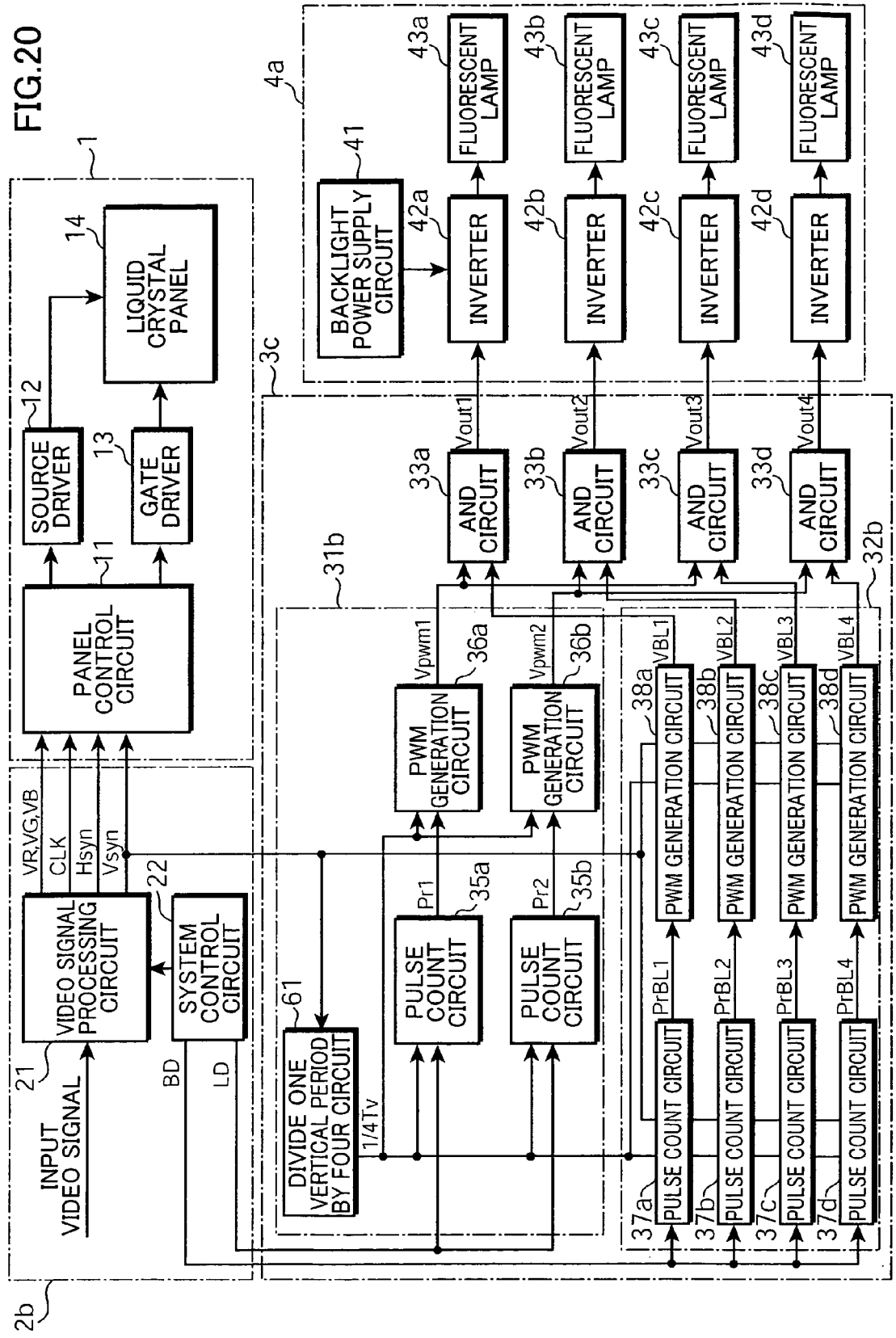
FIG. 20 is a block diagram showing the configuration of a liquid crystal display according to a fifth embodiment of the invention.

A liquid crystal display according to a fifth embodiment of the invention will now be described. FIG. 20 is a block diagram showing the configuration of the liquid crystal display according to the fifth embodiment of the invention. The liquid crystal display shown in FIG. 20 includes a liquid crystal module 1, a video processing portion 2b, a PWM dimming driving circuit portion 3c, and a backlight portion 4a. Because the liquid crystal module 1 and the video processing portion 2b are the same as their counterparts in the fourth embodiment, detailed description thereof are omitted herein.

The backlight portion 4a comprises four fluorescent lamps 43a through 43d provided on the back surface of the liquid crystal panel 14, inverters 42a through 42d that respectively drive the fluorescent lamps 43a through 43d independently by applying voltages thereto, and a backlight power supply circuit 41 that supplies the inverters 42a through 42d with power.

The PWM dimming driving circuit portion 3c comprises a luminance dimming PWM generation portion 31b, a black insertion dimming PWM generation portion 32b, and AND circuits 33a through 33d.

The luminance dimming PWM generation portion 31b comprises a divide one vertical period by four circuit 61 that receives the vertical synchronization signal Vsyn and outputs a divide-by-four synchronization signal 1/4Tv that divides one vertical period by four, a pulse count circuit 35a that receives the luminance dimming light-ON duty data LD from the system control circuit 22 and the divide-by-four synchronization signal 1/4Tv and outputs a light-OFF start timing signal Pr1 that gives a PWM dimming OFF instruction at a time point at which the PWM dimming ON period according to the light-ON duty data LD has passed since the synchronization timing of the divide-by-four synchronization signal 1/4Tv, a pulse count circuit 35b that receives the luminance dimming light-ON duty data LD from the system control circuit 22 and the divide-by-four synchronization signal 1/4Tv and outputs a light-ON start timing signal Pr2 that gives a PWM dimming ON instruction at a point in time at which the PWM dimming OFF period according to the light-ON duty data LD has passed since the synchronization timing of the divide-by-four synchronization signal 1/4Tv, a PWM generation circuit 36a that receives the light-OFF start timing signal Pr1 and the divide-by-four synchronization signal 1/4Tv and outputs a PWM dimming pulse Vpwm1 that starts the PWM dimming ON period in sync with the divide-by-four synchronization signal 1/4Tv and starts the PWM dimming OFF period in sync with the light-OFF start timing signal Pr1, and a PWM generation circuit 36b that receives the light-ON start timing signal Pr2 and the divide-by-four synchronization signal 1/4Tv and outputs a PWM dimming pulse Vpwm2 that starts the PWM dimming OFF period in sync with the divide-by-four synchronization signal 1/4Tv and starts the PWM dimming ON period in sync with the start timing signal Pr2.

The black insertion dimming PWM generation portion 32b comprises a pulse count circuit 37a that receives the vertical synchronization signal Vsyn, the divide-by-four synchronization signal 1/4Tv, and the black insertion duty data BD for black insertion dimming and outputs a light-OFF start timing signal PrBL1 having no delayed phases according to the divide-by-four synchronization signal 1/4Tv and the black insertion duty data BD, a pulse count circuit 37b that receives the vertical synchronization signal Vsyn, the divide-by-four synchronization signal 1/4Tv, and the black insertion duty data BD for black insertion dimming and outputs a light-OFF start timing signal PrBL2 having phases delayed by ¼ of one vertical period according to the divide-by-four synchronization signal 1/4Tv and the black insertion duty data BD, a pulse count circuit 37c that receives the vertical synchronization signal Vsyn, the divide-by-four synchronization signal 1/4Tv, and the black insertion duty data BD for black insertion dimming and outputs a light-OFF start timing signal PrBL3 having phases delayed by ½ of one vertical period according to the divide-by-four synchronization signal 1/4Tv and the black insertion duty data BD, a pulse count circuit 37d that receives the vertical synchronization signal Vsyn, the divide-by-four synchronization signal 1/4Tv, and the black insertion duty data BD for black insertion dimming and outputs a light-OFF start timing signal PrBL4 having phases delayed by ¾ of one vertical period according to the divide-by-four synchronization signal 1/4Tv and the black insertion duty data BD, and PWM generation circuits 38a through 38d that receive the vertical synchronization signal Vsyn, the divide-by-four synchronization signal 1/4Tv, and the light-OFF start timing signals PrBL1 through PrBL4 and output black insertion PWM pulses VBL1 through VBL4, respectively.

The AND circuit 33a outputs an inverter driving signal Vout1 by superimposing the PWM dimming pulse Vpwm1 and the black insertion PWM pulse VBL1. The AND circuit 33b outputs an inverter driving signal Vout2 by superimposing the PWM dimming pulse Vpwm2 and the black insertion PWM pulse VBL2. The AND circuit 33c outputs an inverter driving signal Vout3 by superimposing the PWM dimming pulse Vpwm1 and the black insertion PWM pulse VBL3. The AND circuit 33d outputs an inverter driving signal Vout4 by superimposing the PWM dimming pulse Vpwm2 and the black insertion PWM pulse VBL4. The inverters 42a through 42d respectively drive four light-emission regions (fluorescent lamps 43a through 43d) independently using the inverter driving signals Vout1 through Vout4, respectively.

In this embodiment, the video processing portion 2b, the panel control circuit 11, the source driver 12, and the gate driver 13 correspond to one example of the panel driving portion, the fluorescent lamps 43a through 43d correspond to one example of the light source, the PWM dimming driving circuit 3c, the backlight power supply circuit 41, and the inverters 42a through 42d correspond to one example of the light source driving portion. The rest is the same as the first embodiment.

The backlight dimming operation by the liquid crystal display configured as above will now be described. FIGS. 21A through 21J are timing charts used to describe the backlight dimming operation by the liquid crystal display shown in FIG. 20.

As is shown in FIGS. 21A through 21J, the divide one vertical period by four circuit 61 receives the vertical synchronization signal Vsyn from the video signal processing circuit 21, and outputs a divide-by-four synchronization signal 1/4Tv having a frequency four times the received frequency. The pulse count circuits 35a and 35b receive the luminance dimming light-ON duty data LD from the system control circuit 22 and the divide-by-four synchronization signal 1/4Tv, and respectively output the light-OFF start timing signal Pr1 having the start timing of the ON period same as the synchronization timing of the divide-by-four synchronization signal 1/4Tv and the light-ON period determined according to the light-ON duty data LD, and the light-ON start timing signal Pr2 having the start timing of the OFF period same as the synchronization timing of the divide-by-four synchronization signal 1/4Tv and the light-ON period determined according to the light-ON duty data LD.

The PWM generation circuits 36a and 36b respectively receive the light-OFF start timing signal Pr1 and the light-ON start timing signal Pr2 as well as the divide-by-four synchronization signal 1/4Tv, and respectively output the PWM dimming pulses Vpwm1 and Vpwm2 having the pulse width D during the ON period (light-ON period).

The black insertion dimming PWM generation portion 32b receives the black insertion duty data BD from the system control circuit 22, the divide-by-four synchronization signal 1/4Tv, and the vertical synchronization signal Vsyn. It then generates the light-OFF start timing signals PrBL1 through PrBL4 having phases delayed by ¼ of one vertical period with respect to one another in the pulse count circuits 37a through 37d, respectively, and generates the black insertion PWM pulses VBL1 through VBL4 that come ON at timing of the vertical synchronization signal Vsyn or at the phases delayed by ¼ of one vertical period with respect to one another and go OFF at timings of the light-OFF start timing signals PrBL1 through PrBL4 in the PWM generation circuits 38a through 38d, respectively.

The AND circuits 33a and 33c respectively output the inverter driving signals Vout1 and Vout3 by respectively superimposing the black insertion PWM pulse VBL1 and the black insertion PWM pulse VBL3 on the PWM dimming pulse Vpwm1. The AND circuits 33b and 33d respectively output the inverter driving signals Vout2 and Vout4 by respectively superimposing the black insertion PWM pulse VBL2 and the black insertion PWM pulse VBL4 on the PWM dimming pulse Vpwm2. In the backlight portion 4a, the four light-emission regions (fluorescent lamps 43a through 43d) are dimmed independently by the inverter driving signals Vout1 through Vout4, respectively.

When attention is focused on a given cycle in each of two kinds of the luminance dimming PWM dimming pulses Vpwm1 and Vpwm2, the light-ON period and the light-OFF period are disposed so that they are almost opposite to each other. It is therefore understood that light is emitted alternately as with a display on the TV by the interlace driving. It is thus possible to achieve the same effect achieved when the frequency of the luminance dimming PWM signal has doubled as with the interleave driving, which can in turn prevent or improve a flicker effectively.

In addition, because the PWM dimming pulses Vpwm1 and Vpwm2 are set to have frequencies 4·N (N=1, 2, 3, and so forth) times the frequency of the vertical synchronization signal Vsyn, even when they are superimposed on the black insertion PWM pulses VBL1 through VBL4, a whisker-shaped pulse will not be generated at the beginning of the vertical period. It is therefore possible to forestall a malfunction of the inverters 42a through 42d.

Further, because the phases of the black insertion PWM pulses VBL1 through VBL4 are delayed by ¼ of one vertical period with respect to one another, not only is it possible to suppress the edge blur from being inhomogeneous during the display of a motion picture in sync with a display on the liquid crystal panel 14, but it is also possible to improve the motion picture visibility across the entire screen.

In this embodiment, the synchronization signal of the luminance dimming PWM signal is generated in the divide one vertical period by four circuit 61. It should be appreciated, however, that the synchronization signal does not necessarily divide one vertical period by four as long as it divides one vertical period by M·N (M=2, 3, 4, and so forth, N=1, 2, 3, and so forth). When M is chosen from the range specified above in an arbitrary manner, as many fluorescent regions (fluorescent lamps) as M are necessary, and in order to drive these fluorescent regions, as many pulse count circuits as M and as many PWM generation circuits as M are necessary in the black insertion dimming PWM generation portion.

Another backlight dimming operation by the liquid crystal display configured as described above will now be described. FIGS. 22A through 22J are timing charts used to describe another backlight dimming operation by the liquid crystal display shown in FIG. 20.

Figure 21:
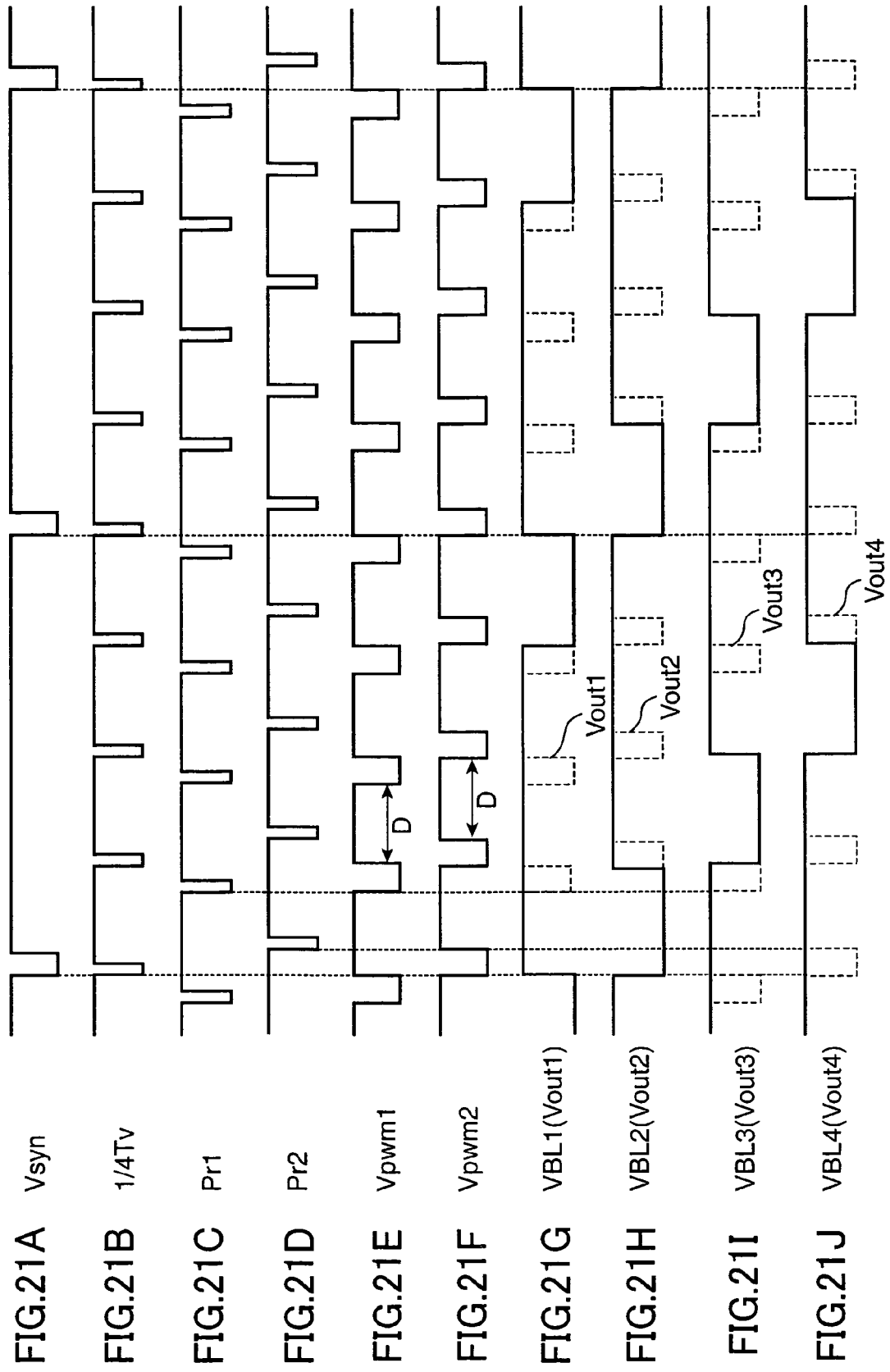
FIGS. 21A through 21J are timing charts used to describe a backlight dimming operation by the liquid crystal display shown in FIG. 20.

As are shown in FIGS. 22A through 22F, the divide-by-four synchronization signal 1/4Tv outputted from the divide one vertical period by four circuit 61, the light-OFF start timing signal Pr1 and the light-ON start timing signal Pr2 outputted from the pulse count circuits 35a and 35b, respectively, and the PWM dimming pulses Vpwm1 and Vpwm2 outputted from the PWM generation circuits 36a and 36b, respectively, are outputted in the same manner as FIG. 21.

Subsequently, as are shown in FIG. 22G through FIG. 22J, the pulse count circuits 37a through 37d in the black insertion dimming PWM generation circuit 32b receive the vertical synchronization signal Vsyn, the divide-by-four synchronization signal 1/4Tv, and the black insertion duty data BD, and respectively output the light-ON start timing signal PrBL1 to generate the black insertion PWM pulse that starts the black insertion period in sync with the vertical synchronization signal Vsyn and has the black insertion period corresponding to the black insertion duty data BD, and the light-ON start timing signals PrBL2 through PrBL4 having phases that are successively delayed by ¼ of one vertical period with respect to the light-ON start timing signal PrBL1. The PWM generation circuits 38a through 38d receive the vertical synchronization signal Vsyn, the divide-by-four synchronization signal 1/4Tv, and the light-ON start timing signal PrBL, and respectively output the black insertion PWM pulse VBL1 that starts the black insertion period in sync with the vertical synchronization signal Vsyn and ends the black insertion period in sync with the light-ON start timing signal PrBL1, and the black insertion PWM pulses VBL2 through VBL4 having the phases that are successively delayed by ¼ of one vertical period with respect to the black insertion PWM pulse VBL1. The black insertion PWM pulse VBL to perform the black insertion dimming by the backlight for improving the motion picture visibility during the display of a motion picture is generated in this manner.

Subsequently, as are indicated by broken lines of FIGS. 22G and 22I, the AND circuits 33a and 33c respectively output the inverter driving signals Vout1 and Vout3 by respectively superimposing the black insertion PWM pulse VBL1 and the black insertion PWM pulse VBL3 on the PWM dimming pulse Vpwm1. The inverters 42a and 42c respectively light ON or light OFF the fluorescent lamps 43a and 43c using the inverter driving signals Vout1 and Vout3, respectively.

Figure 22:
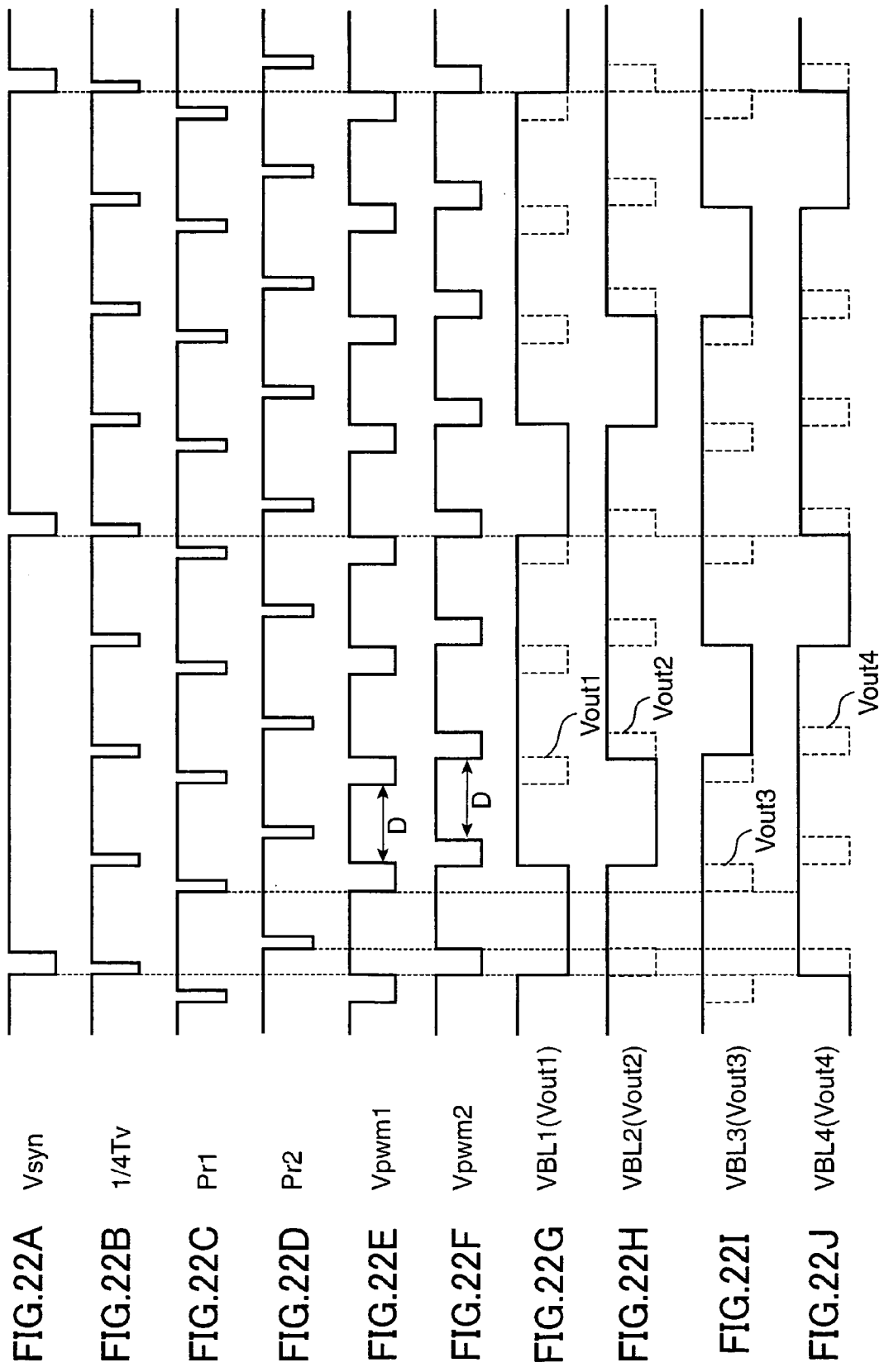
FIGS. 22A through 22J are timing charts used to describe another backlight dimming operation by the liquid crystal display shown in FIG. 20.

As are indicated by broken lines of FIG. 22H and FIG. 22J, the AND circuits 33b and 33d respectively output the inverter driving signals Vout2 and Vout4 by respectively superimposing the black insertion PWM pulse VBL2 and the black insertion PWM pulse VBL4 on the PWM dimming pulse Vpwm2. The inverters 42b and 42d respectively light ON or light OFF the fluorescent lamps 43b and 43d using the inverter driving signals Vout2 and Vout4, respectively.

As has been described above, in this embodiment, it is possible to provide the black insertion periods of a certain period successively near the start point of the transition period of the liquid crystal display 14 without being affected by the duty ratio of the dimming PWM pulse. It is thus possible to perform the PWM dimming for adjusting the luminance of the liquid crystal panel 14 while performing concurrently the black insertion dimming by the backlight for improving the motion picture visibility during the display of a motion picture. As a consequence, in addition to the effect achieved by the backlight dimming operation shown in FIGS. 21A through 21J, the motion picture visibility can be enhanced further.

Sixth Embodiment

Figure 23:
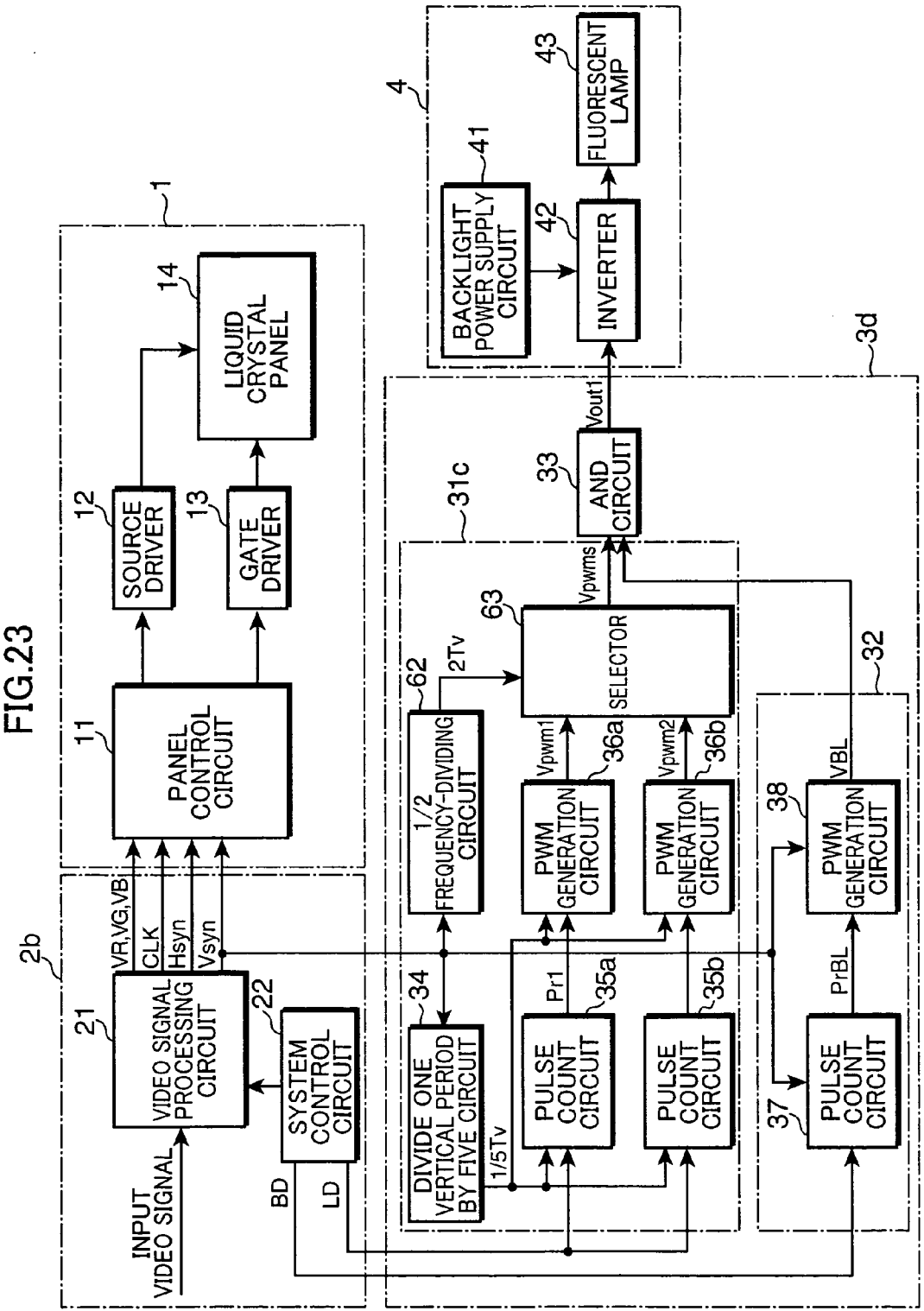
FIG. 23 is a block diagram showing the configuration of a liquid crystal display according to a sixth embodiment of the invention.
Figure 24:
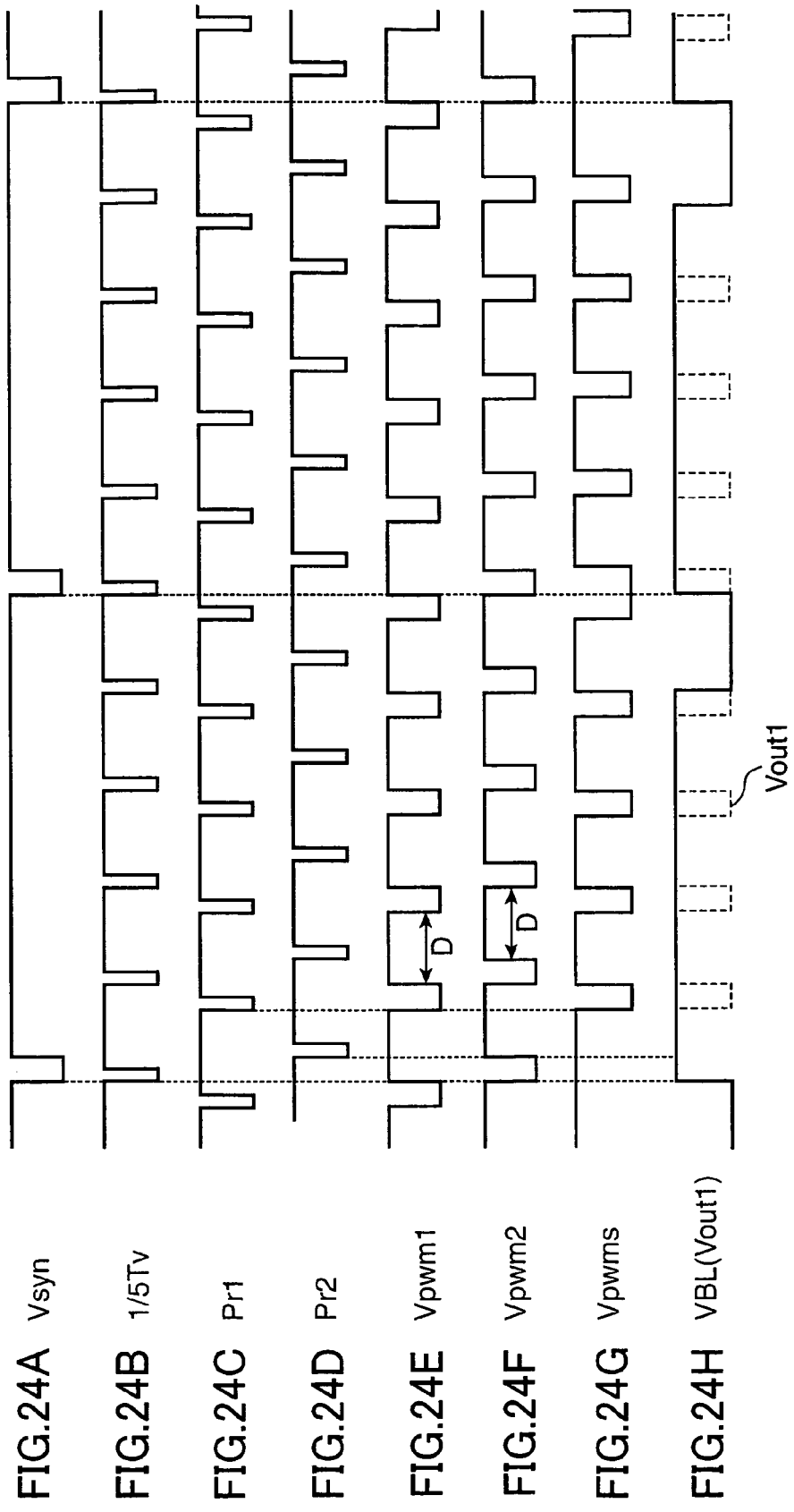
FIGS. 24A through 24H are timing charts used to describe a backlight dimming operation by the liquid crystal display shown in FIG. 23.

A liquid crystal display according to a sixth embodiment of the invention will now be described. FIG. 23 is a block diagram showing the configuration of the liquid crystal display according to the sixth embodiment of the invention. The liquid crystal display shown in FIG. 23 includes a liquid crystal module 1, a video processing portion 2b, a PWM dimming driving circuit portion 3d, and a backlight portion 4. Because the liquid crystal module 1 and the video processing portion 2b are the same as their counterparts in the fourth embodiment, detailed description thereof are omitted herein.

The backlight portion 4 comprises one fluorescent lamp 43 provided on the back surface of the liquid crystal panel 14, an inverter 42 that drives the fluorescent lamp 43 by applying a voltage thereto, and a backlight power supply circuit 41 that supplies the inverter 42 with power.

The PWM dimming driving circuit portion 3d comprises a luminance dimming PWM generation portion 31c, a black insertion dimming PWM generation portion 32, and an AND circuit 33.

The luminance dimming PWM generation circuit 31c comprises a divide one vertical period by five circuit 34 that receives the vertical synchronization signal Vsyn and outputs a divide-by-five synchronization signal 1/5Tv that divides one vertical period by five, a pulse count circuit 35a that receives the luminance dimming light-ON duty data LD from the system control circuit 22 and the divide-by-five synchronization signal 1/5Tv and outputs a light-OFF start timing signal Pr1 that gives a PWM dimming OFF-instruction at a point in time at which the PWM dimming ON period according to the light-ON duty data LD has passed since the synchronization timing of the divide-by-five synchronization signal 1/5Tv, a pulse count circuit 35b that receives the luminance dimming light-ON duty data LD from the system control circuit 22 and the divide-by-five synchronization signal 1/5Tv and outputs a light-ON start timing signal Pr2 that gives a PWM dimming ON instruction at a point in time at which the PWM dimming OFF period according to the light-ON duty data LD has passed since the synchronization timing of the divide-by-five synchronization signal 1/5Tv, a PWM generation circuit 36a that receives the light-OFF start timing signal Pr1 and the divide-by-five synchronization signal 1/5Tv and outputs a PWM dimming pulse Vpwm1 that starts the PWM dimming ON period in sync with the divide-by-five signal 1/5Tv and starts the PWM dimming OFF period in sync with the light-OFF start timing signal Pr1, a PWM generation circuit 36b that receives the light-ON start timing signal Pr2 and the divide-by-five synchronization signal 1/5Tv and outputs a PWM dimming pulse Vpwm2 that starts the PWM dimming OFF period in sync with the divide-by-five signal 1/5Tv and starts the PWM dimming ON period in sync with the light-ON start timing signal Pr2, a ½ frequency-dividing circuit 62 that receives the vertical synchronization signal Vsyn and ½ frequency-divides the received signal to output a ½ frequency-divided signal 2Tv, and a selector 63 that receives the PWM dimming pulses Vpwm1 and Vpwm2 and the ½ frequency-divided signal 2Tv and outputs a PWM dimming pulse Vpwms by switching between the PWM dimming pulses Vpwm1 and Vpwm2 per vertical period. Because the black insertion dimming PWM generation portion 32 is the same as the counterpart in the fourth embodiment, detailed descriptions thereof are omitted herein.

The AND circuit 33 outputs an inverter driving signal Vout1 by superimposing the PWM dimming pulse Vpwms and the black insertion PWM pulse VBL. The inverter 42 drives one light-emission region (fluorescent lamp 43) using the inverter driving signal Vout1.

In this embodiment, the video processing portion 2b, the panel control circuit 11, the source driver 12, and the gate driver 13 correspond to one example of the panel driving portion, and the PWM dimming driving circuit portion 3d, the backlight power supply circuit 41, and the inverter 42 correspond to one example of the light source driving portion. The rest is the same as the first embodiment.

The backlight dimming operation by the liquid crystal display configured as described above will now be described. FIGS. 24A through 24H are timing charts used to describe the backlight dimming operation by the liquid crystal display shown in FIG. 23.

As is shown in FIGS. 24A through 24H, the divide one vertical period by five circuit 34 receives the vertical synchronization signal Vsyn from the video signal processing circuit 21, and outputs the divide-by-five synchronization signal 1/5Tv having a frequency five times the received frequency. The pulse count circuits 35a and 35b receive the luminance dimming light-ON duty data LD from the system control circuit 22 and the divide-by-five synchronization signal 1/5Tv, and respectively output the light-OFF start timing signal Pr1 having the start timing of the ON period same as the synchronization timing of the divide-by-five synchronization signal 1/5Tv and the light-ON period determined according to the light-ON duty data LD, and the light-ON start timing signal Pr2 having the start timing of the OFF period same as the synchronization timing of the divide-by-five synchronization signal 1/5Tv and the light-ON period determined according to the light-ON duty data LD.

The PWM generation circuits 36a and 36b respectively receive the light-OFF start timing signal Pr1 and the light-ON start timing signal Pr2 as well as the divide-by-five synchronization signal 1/5Tv, and respectively output the PWM dimming pulses Vpwm1 and Vpwm2 having the pulse width D during the ON period (light-ON period).

The ½ frequency-dividing circuit 62 receives the vertical synchronization signal Vsyn and outputs the ½ frequency-divided signal. The selector 63 receives the PWM dimming pulses Vpwm1 and Vpwm2 and the ½ frequency-divided signal 2Tv, and outputs the PWM dimming pulse Vpwms by switching the PWM dimming pulses Vpwm1 and Vpwm2 per vertical period.

The black insertion dimming PWM generation portion 32 receives the black insertion duty data BD from the system control circuit 22 and the vertical synchronization signal Vsyn. It then generates the light-OFF start timing signal PrBL in the pulse count circuit 37 and generates the black insertion PWM pulse VBL that comes ON by the vertical synchronization signal Vsyn and goes OFF at the timing of the light-OFF start timing signal PrBL in the PWM generation circuit 38.

The AND circuit 33 outputs the inverter driving signal Vout1 by superimposing the PWM dimming pulse Vpwms and the black insertion PWM pulse VBL. In the backlight portion 4, one fluorescent lamp 43 is dimmed according to the inverter driving signal Vout1.

Herein, a comparison between a signal waveform in one cycle of a given vertical period of the luminance dimming PWM dimming pulse Vpwms and a signal waveform in one cycle of the adjacent vertical period reveals that the light-ON period and the light-OFF period are disposed so that they are almost opposite to each other. Light is therefore emitted alternately as with the interleave driving. It is thus possible to achieve the same effect achieved when the frequency of the PWM dimming pulse Vpwms has doubled, which can in turn prevent or improve a flicker effectively.

In addition, because the PWM dimming pulses Vpwm1 and Vpwm2 are set to be integral multiples of the frequency of the vertical synchronization signal Vsyn, even when they are superimposed on the black insertion PWM pulse VBL, a whisker-shaped pulse will not be generated at the beginning of the vertical period. It is thus possible to forestall a malfunction of the inverter 42.

Further, because the light-ON period and the light-OFF period are consequently provided once within one vertical period of the black insertion PWM pulse VBL, it is also possible to improve the edge blur during the display of a motion picture. In this embodiment, the synchronization signal of the luminance dimming PWM signal is generated in the divide one vertical period by five circuit 34. It should be appreciated, however, that the synchronization signal does not necessarily divide one vertical period by five as long as it divides one vertical period by N (N=1, 2, 3, and so forth).

Another backlight dimming operation by the liquid crystal display configured as above will now be descried. FIGS. 25A through 25H are timing charts used to describe another backlight dimming operation of the liquid crystal display shown in FIG. 23.

As are shown in FIG. 25A through FIG. 25G, the divide-by-five synchronization signal 1/5Tv outputted from the divide one vertical period by five circuit 34, the light-OFF start timing signal Pr1 and the light-ON start timing signal Pr2 outputted from the pulse count circuits 35a and 35b, respectively, and the PWM dimming pulses Vpwm1 and Vpwm2 outputted from the PWM generation circuits 36a and 36b, respectively, and the PWM dimming pulse Vpwms outputted from the selector 63 are outputted in the same manner as FIGS. 24A through 24G.

Figure 25:
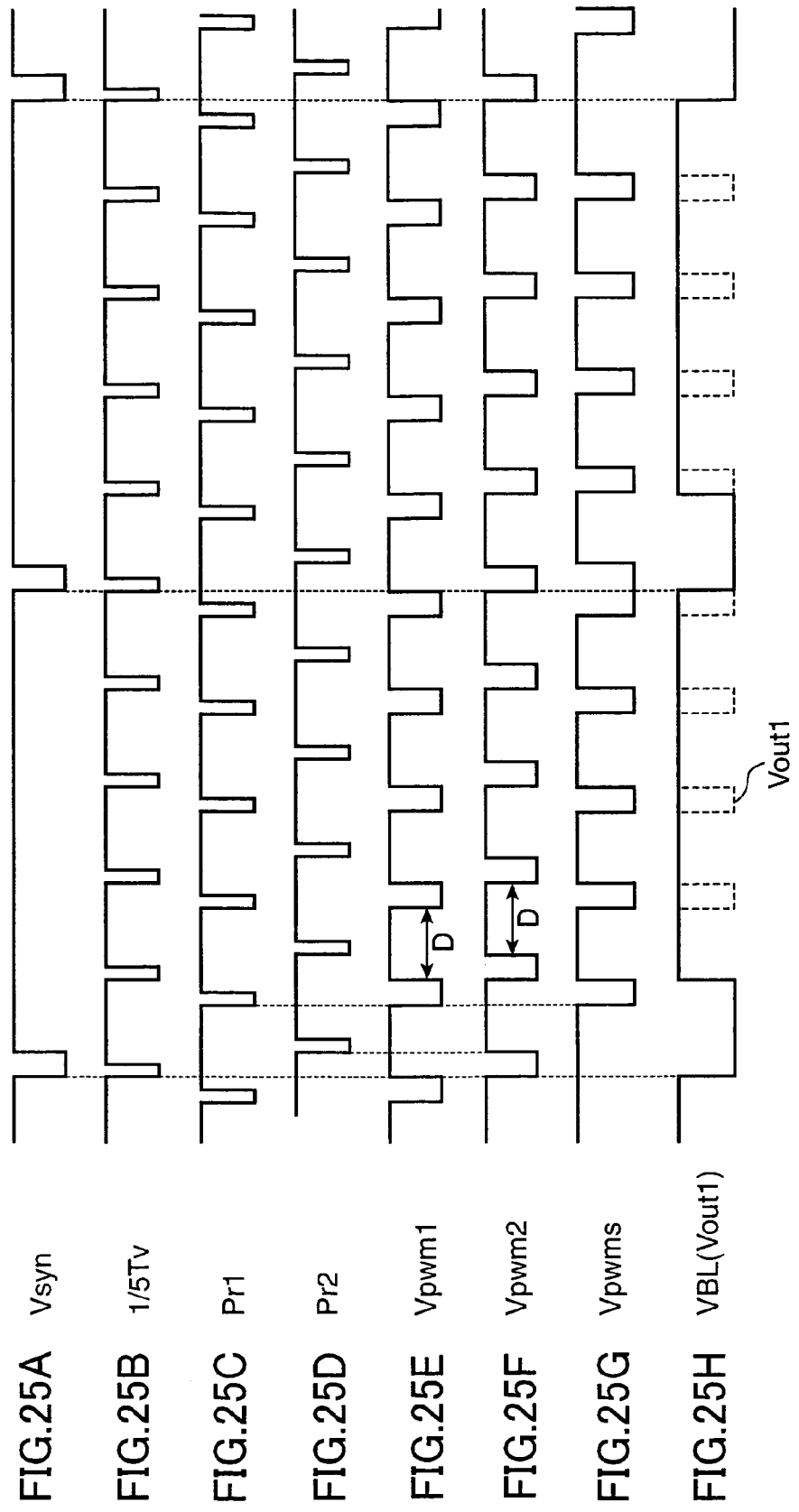
FIGS. 25A through 25H are timing charts used to describe another backlight dimming operation by the liquid crystal display shown in FIG. 23.

Subsequently, as is shown in FIG. 25H, the pulse count circuit 37 in the black insertion dimming PWM generation portion 32 receives the vertical synchronization signal Vsyn and the black insertion duty data BD, and outputs the light-ON start timing signal PrBL to generate the black insertion PWM pulse that starts the black insertion period in sync with the vertical synchronization signal Vsyn and has the black insertion period corresponding to the black insertion duty data BD. The PWM generation circuit 38 receives the vertical synchronization signal Vsyn and the light-ON start timing signal PrBL, and outputs the black insertion PWM pulse VBL that starts the black insertion period in sync with the vertical synchronization signal Vsyn and ends the black insertion period in sync with the light-ON start timing signal PrBL. The black insertion PWM pulse VBL to perform the black insertion dimming by the backlight for improving the motion picture visibility during the display of a motion picture is generated in this manner.

As is indicated by a broken line of FIG. 25H, the AND circuit 33 outputs the inverter driving signal Vout1 by superimposing the dimming PWM pulse Vpwms on the pulse of the light-ON period of the black insertion PWM pulse VBL. The inverter 42 lights ON or lights OFF the fluorescent lamp 43 using the inverter driving signal Vout1.

As has been described, in this embodiment, it is possible to provide the black insertion period of a certain period near the start point of the transition period of the liquid crystal display 14 without being affected by the duty ratio of the dimming PWM pulse. It is thus possible to perform the PWM dimming for adjusting the luminance of the liquid crystal panel 14 while performing concurrently the black insertion dimming by the backlight for improving the motion picture visibility during the display of a motion picture. As a consequence, in addition to the effect achieved by the backlight dimming operation shown in FIGS. 24A through 24H, the motion picture visibility can be enhanced further.

Seventh Embodiment

Figure 26:
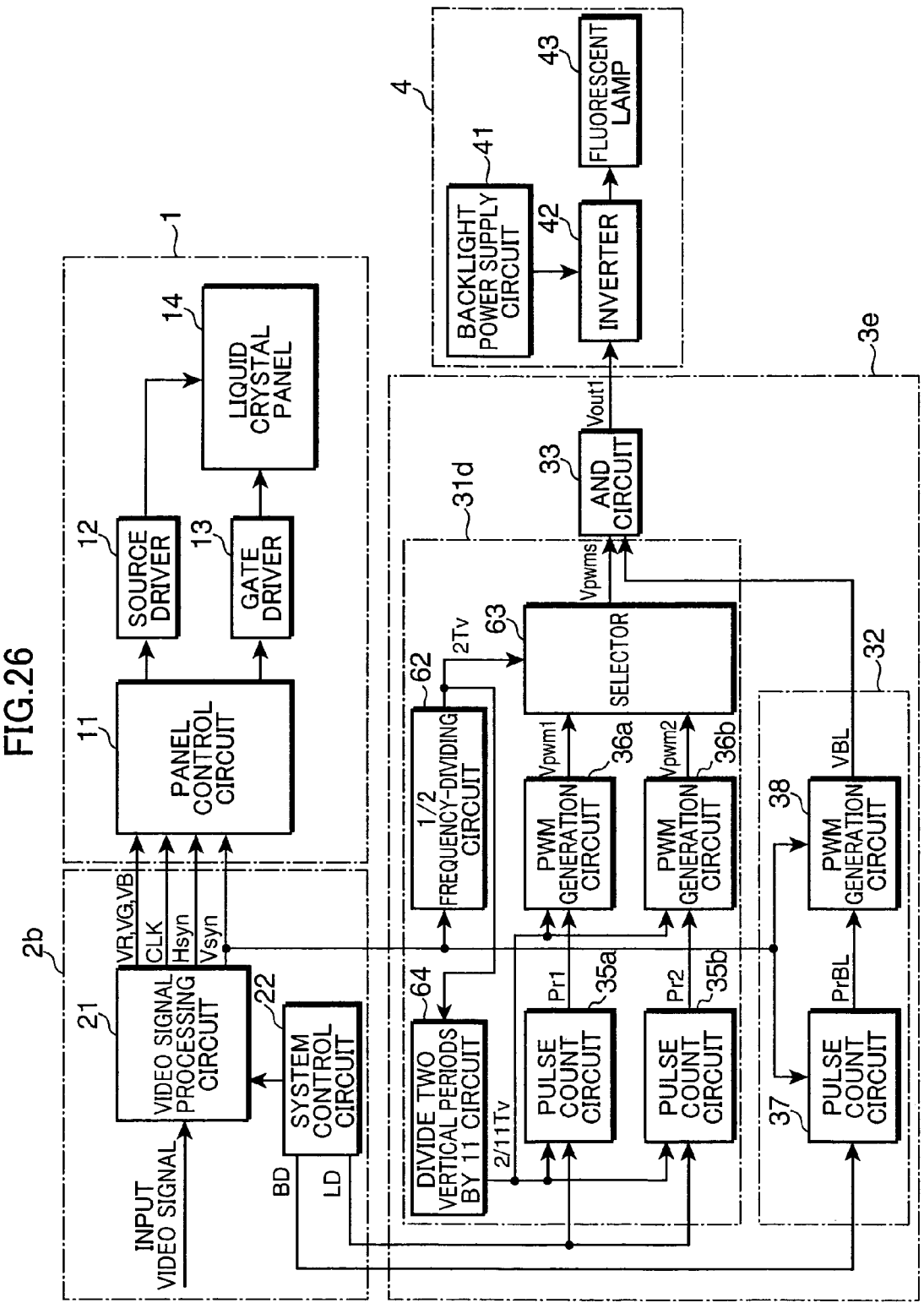
FIG. 26 is a block diagram showing the configuration of a liquid crystal display according to a seventh embodiment of the invention.

A liquid crystal display according to a seventh embodiment of the invention will now be described. FIG. 26 is a block diagram showing the configuration of the liquid crystal display according to the seventh embodiment of the invention. The liquid crystal display shown in FIG. 26 includes a liquid crystal module 1, a video processing portion 2b, a PWM dimming driving circuit portion 3e, and a backlight portion 4. Because the liquid crystal module 1 and the video processing portion 2b are the same as their counterparts in the fourth embodiment and the backlight portion 4 is the same as the counterpart in the sixth embodiment, detailed description of these components are omitted herein.

The PWM dimming driving circuit portion 3e comprises a luminance dimming PWM generation portion 31d, a black insertion dimming PWM generation portion 32, and an AND circuit 33.

The luminance dimming PWM generation portion 31d comprises a ½ frequency-dividing circuit 62 that receives the vertical synchronization signal Vsyn and ½ frequency-divides the received signal to output a ½ frequency-divided signal 2Tv, a divide two vertical period by 11 circuit 64 that receives the ½ frequency-divided signal 2Tv and outputs a divide-by-11 synchronization signal 2/11Tv that divides two vertical periods by 11, a pulse count circuit 35a that receives the luminance dimming light-ON duty data LD from the system control circuit 22 and the divide-by-11 synchronization signal 2/11Tv and outputs a light-OFF start timing signal Pr1 that gives a PWM dimming OFF instruction at a point in time at which the PWM dimming ON period according to the light-ON duty data LD has passed since the synchronization timing of the divide-by-11 synchronization signal 2/11Tv, a pulse count circuit 35b that receives the luminance dimming light-ON duty data LD from the system control circuit 22 and the divide-by-11 synchronization signal 2/11Tv and outputs a light-ON start timing signal Pr2 that gives a PWM dimming ON instruction at a point in time at which the PWM dimming OFF period according to the light-ON duty data LD has passed since the synchronization timing of the divide-by-11 synchronization signal 2/11Tv in a case where the synchronization timing of the divide-by-11 synchronization signal 2/11Tv in the first-half vertical period of the two vertical periods frequency-divided by the ½ frequency dividing circuit 62 is used as the second-half vertical period, a PWM generation circuit 36a that receives the light-OFF start timing signal Pr1 and the divide-by-11 synchronization signal 2/11Tv and outputs a PWM dimming pulse Vpwm1 that starts the PWM dimming ON period in sync with the divide-by-11 synchronization signal 2/11Tv and starts the PWM dimming OFF period in sync with the light-OFF start timing signal Pr1, a PWM generation circuit 36b that receives the light-ON start timing signal Pr2 and the divide-by-11 synchronization signal 2/11Tv and outputs a PWM dimming pulse Vpwm2 that starts the PWM dimming OFF period in sync with the divide-by-11 synchronization signal 2/11Tv in a case where the synchronization timing of the divide-by-11 synchronization signal 2/11Tv in the first-half vertical period of the two vertical periods frequency-divided by the ½ frequency-dividing circuit 62 is used as the second-half vertical period and starts the PWM dimming ON period in sync with the light-ON start timing signal Pr2, and a selector 63 that receives the PWM dimming pulses Vpwm1 and Vpwm2 and the ½ frequency-divided signal 2Tv and outputs a PWM dimming pulse Vpwms by switching the PWM dimming pulses Vpwm1 and Vpwm2 per vertical period. Because the black insertion dimming PWM generation portion 32 is the same as the counterpart in the fourth embodiment and the AND circuit 33 is the same as the counterpart in the sixth embodiment, detailed descriptions of these components are omitted herein.

In this embodiment, the video processing portion 2b, the panel control circuit 11, the source driver 12, and the gate driver 13 correspond to one example of the panel driving portion, and the PWM dimming driving circuit portion 3e, the backlight power supply circuit 41 and the inverter 42 correspond to one example of the light source driving portion The rest is the same as the first embodiment.

The backlight dimming operation by the liquid crystal display configured as above will now be described. FIGS. 27A through 27I are timing charts used to describe the backlight dimming operation by the liquid crystal display shown in FIG. 26.

As is shown in FIGS. 27A through 27I, the ½ frequency-dividing circuit 62 receives the vertical synchronization signal Vsyn and outputs the ½ frequency-divided signal 2Tv. The divide two vertical periods by 11 circuit 64 receives the ½ frequency-divided signal 2Tv and outputs the divide-by-11 synchronization signal 2/11Tv having a frequency 5.5 times the received frequency. The pulse count circuits 35a and 35b receive the luminance dimming light-ON duty data LD from the system control circuit 22 and the divide-by-11 synchronization signal 2/11Tv, and respectively output the light-OFF start timing signal Pr1 having the start timing of the ON period same as the synchronization timing of the divide-by-11 synchronization signal 2/11Tv and the light-ON period determined according to the light-ON duty data LD, and a light-ON start timing signal Pr2 having the start timing of the OFF period same as the synchronization timing of the divide-by-11 synchronization signal 2/11Tv in a case where the synchronization timing of the divide-by-11 synchronization signal 2/11Tv in the first-half vertical period of the two vertical periods frequency-divided by the ½ frequency-dividing circuit 62 is used as the second-half vertical period and the light-ON period determined according to the light-ON duty data LD.

The PWM generation circuits 36a and 36b respectively receive the light-OFF start timing signal Pr1 and the light-ON start timing signal Pr2 as well as the divide-by-11 synchronization signal 2/11Tv, and respectively output the PWM dimming pulses Vpwm1 and Vpwm2 having the pulse width D during the ON time (light-ON period).

The selector 63 receives the PWM dimming pulses Vpwm1 and Vpwm2 and the ½ frequency-divided signal 2Tv, and outputs the PWM dimming pulse Vpwms by switching the PWM dimming pulses Vpwm1 and Vpwm2 per vertical period so that one vertical period begins with the start timing of the ON period or the OFF period.

The black insertion dimming PWM generation circuit 32 receives the black insertion duty data BD from the system control circuit 22 and the vertical synchronization signal Vsyn. It then generates the light-OFF start timing signal PrBL in the pulse count circuit 37 and generates the black insertion PWM pulse VBL that comes ON by the vertical synchronization signal Vsyn and goes OFF at the timing of the light-OFF start timing signal PrBL in the PWM generation circuit 38.

The AND circuit 33 outputs the inverter driving signal Vout1 by superimposing the PWM dimming pulse Vpwms and the black insertion PWM pulse VBL. In the backlight portion 4, one fluorescent lamp 43 is dimmed according to the inverter driving signal Vout1.

A comparison between a signal waveform in one cycle of a given vertical period of the luminance dimming PWM dimming pulse Vpwms and a signal waveform in one cycle of the adjacent vertical period reveals that the light-ON period and the light-OFF period are disposed so that they are almost opposite to each other. Light is therefore emitted alternately as with the interleave driving. It is thus possible to achieve the same effect achieved when the frequency of the PWM dimming pulse Vpwms has doubled, which can in turn prevent or improve a flicker effectively.

In addition, because the PWM dimming pulse Vpwms is a signal combined in such a manner that the start timing of the ON period or the OFF period comes at the beginning of every vertical period, even when it is superimposed on the black insertion PWM pulse VBL, a whisker-shaped pulse will not be generated at the beginning of the vertical period. It is thus possible to forestall a malfunction of the inverter 42.

Further, because the light-ON period and the light-OFF period are consequently provided once within one vertical period of the black insertion PWM pulse VBL, it is also possible to improve the edge blur during the display of a motion picture. In this embodiment, the synchronization signal of the luminance dimming PWM signal is generated in the divide two vertical periods by 11 circuit 64. It should be appreciated, however, that the synchronization signal does not necessarily divide two vertical periods by 11 as long as it divides two vertical periods by N (N=1, 2, 3, and so forth).

Another backlight dimming operation by the liquid crystal display configured as above will now be described. FIGS. 28A through 28I are timing charts used to describe another backlight dimming operation by the liquid crystal display shown in FIG. 26.

Figure 27:
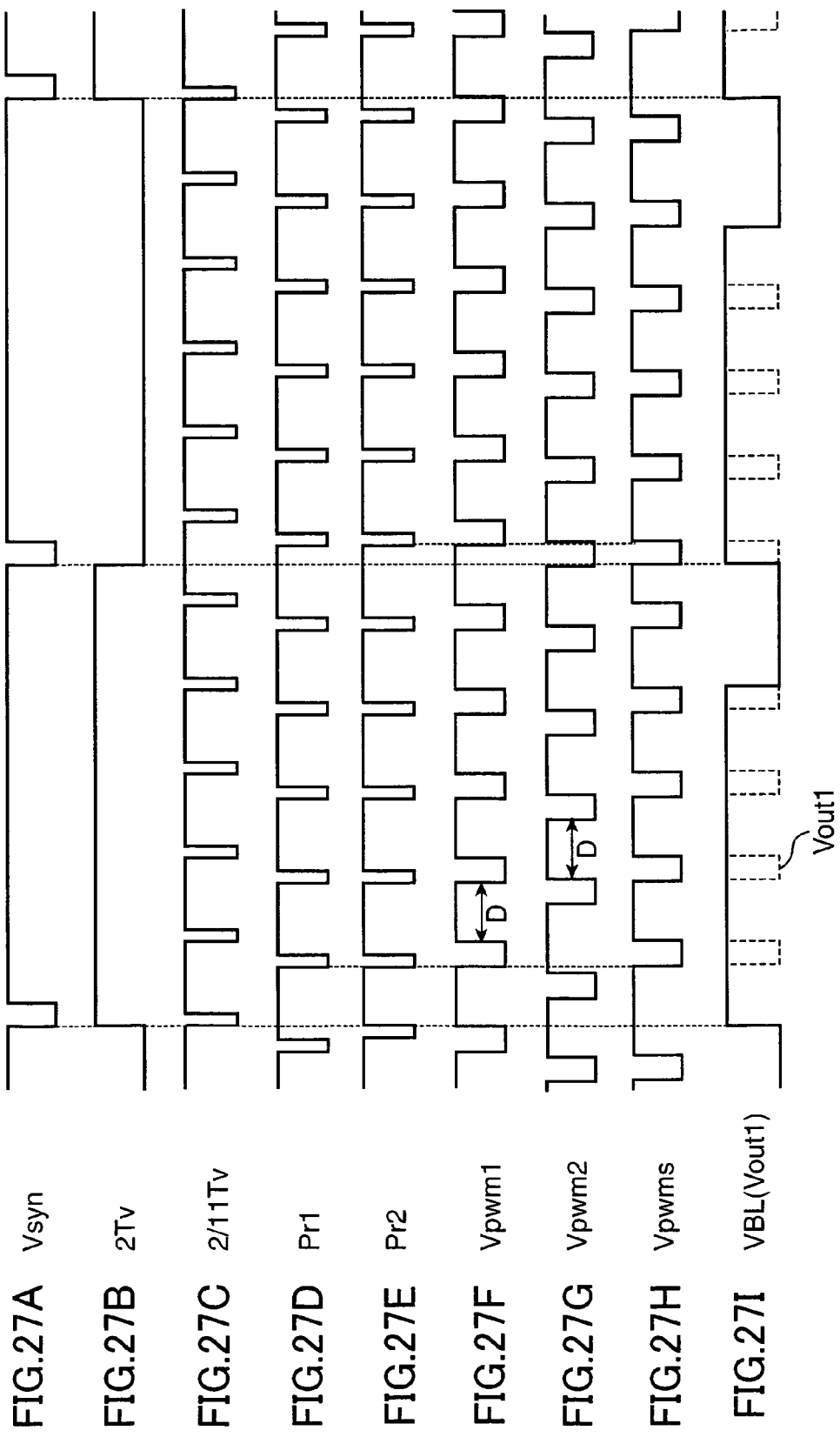
FIGS. 27A through 27I are timing charts used to describe a backlight dimming operation by the liquid crystal display shown in FIG. 26.
Figure 28:
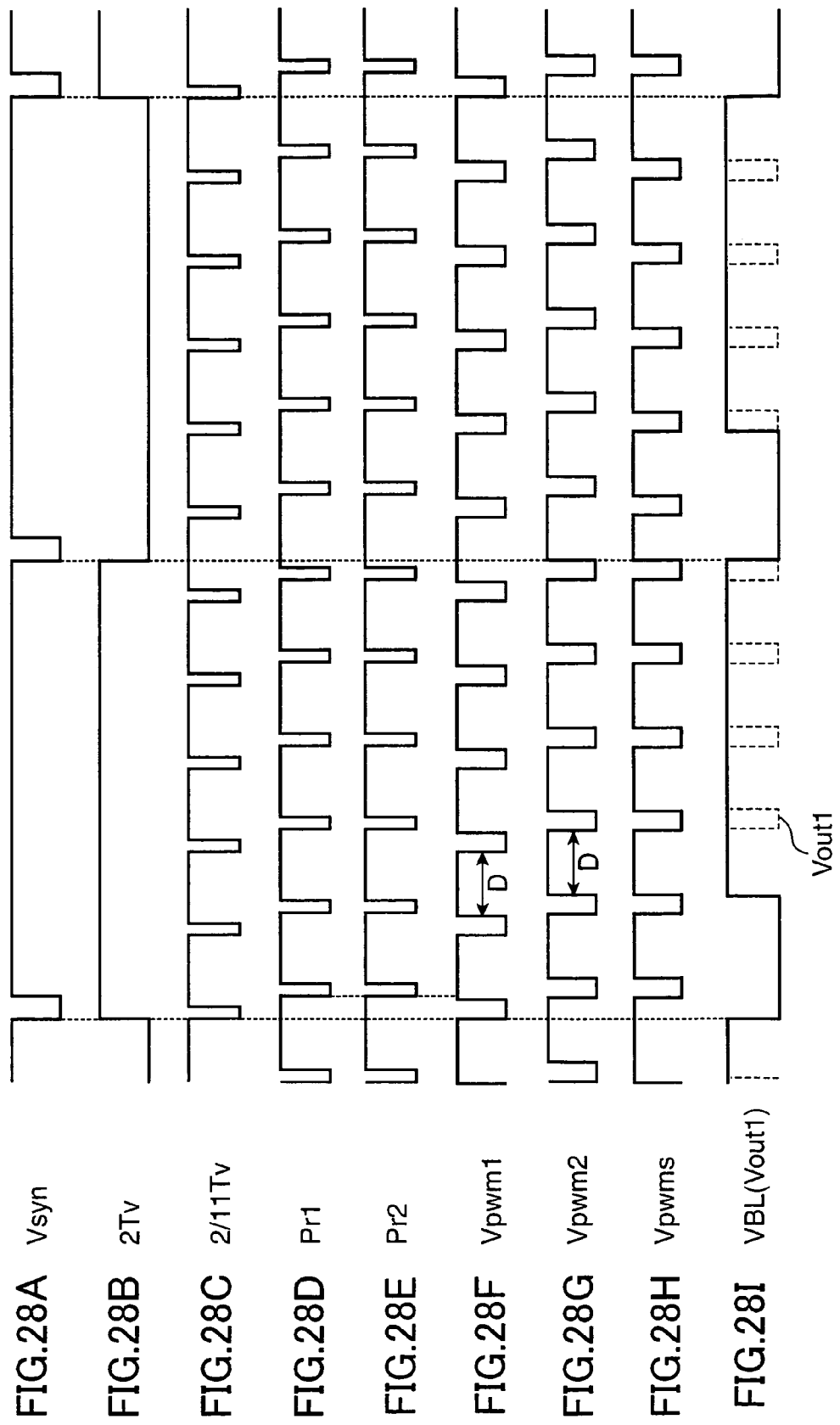
FIGS. 28A through 28I are timing charts used to describe another backlight dimming operation by the liquid crystal display shown in FIG. 26.
Figure 29:
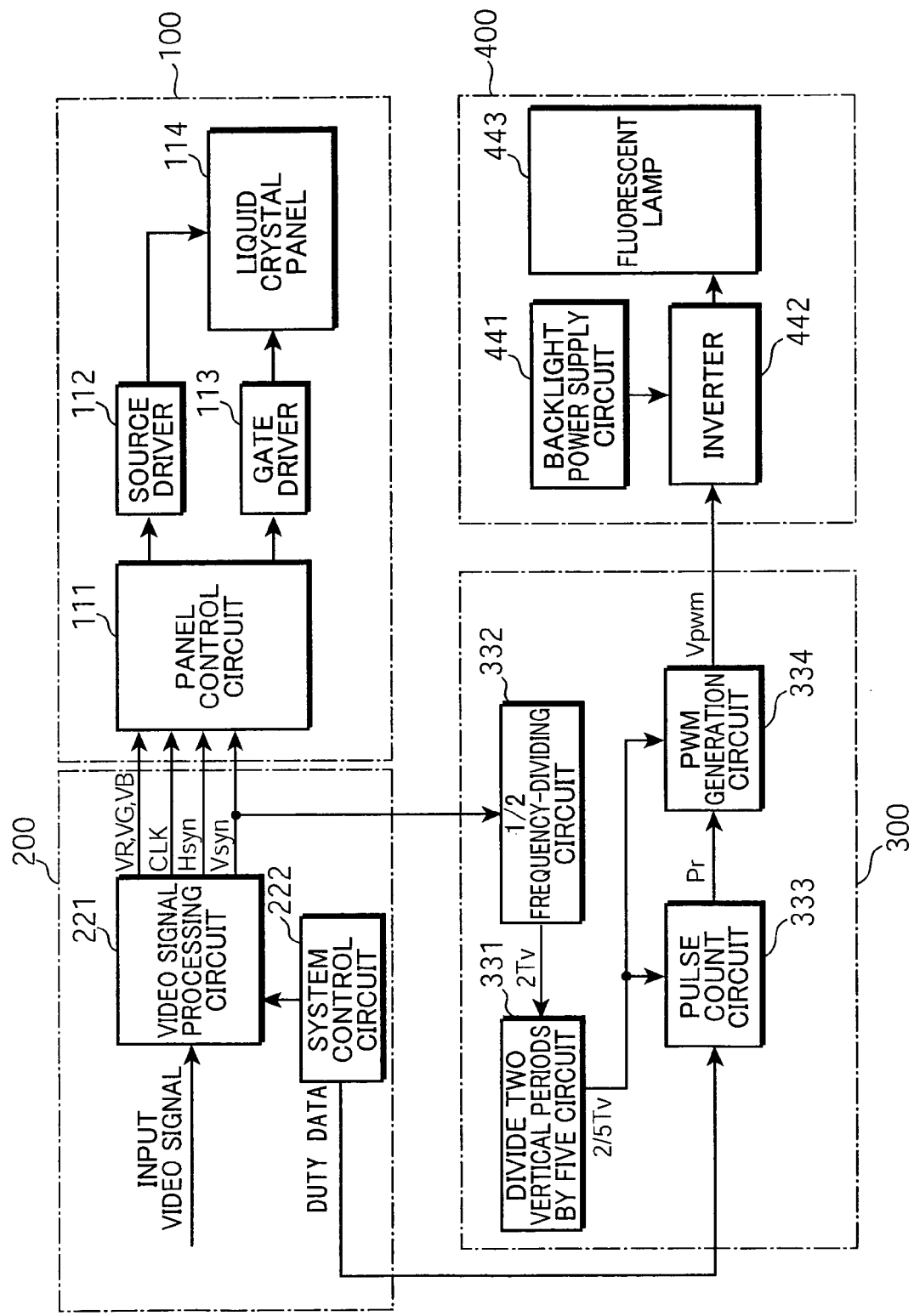
FIG. 29 is a block diagram showing the configuration of a liquid crystal display in the related art.
Figure 31A:
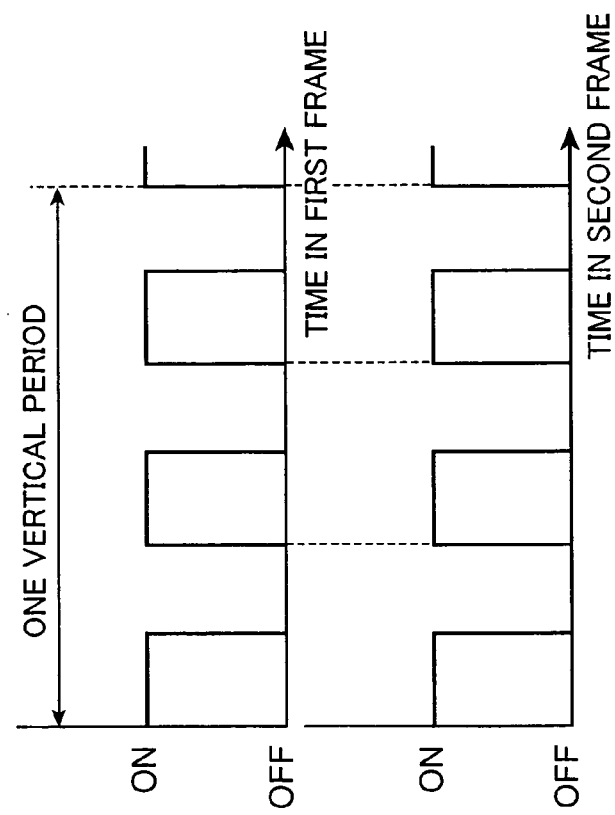
FIGS. 31A and 31B are views in which PWM dimming pulses of a first screen and a second screen within two vertical periods are aligned.
Figure 31B:
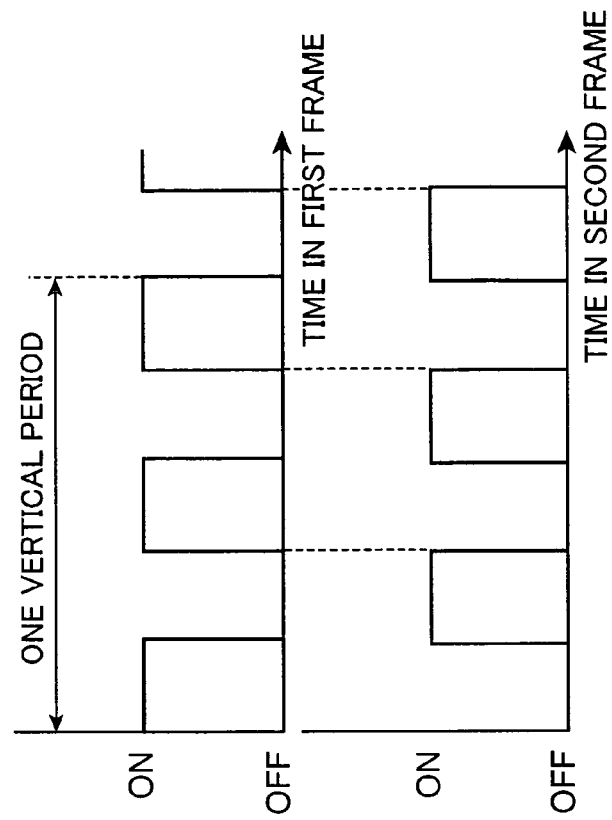
Figures 32A, 32B:
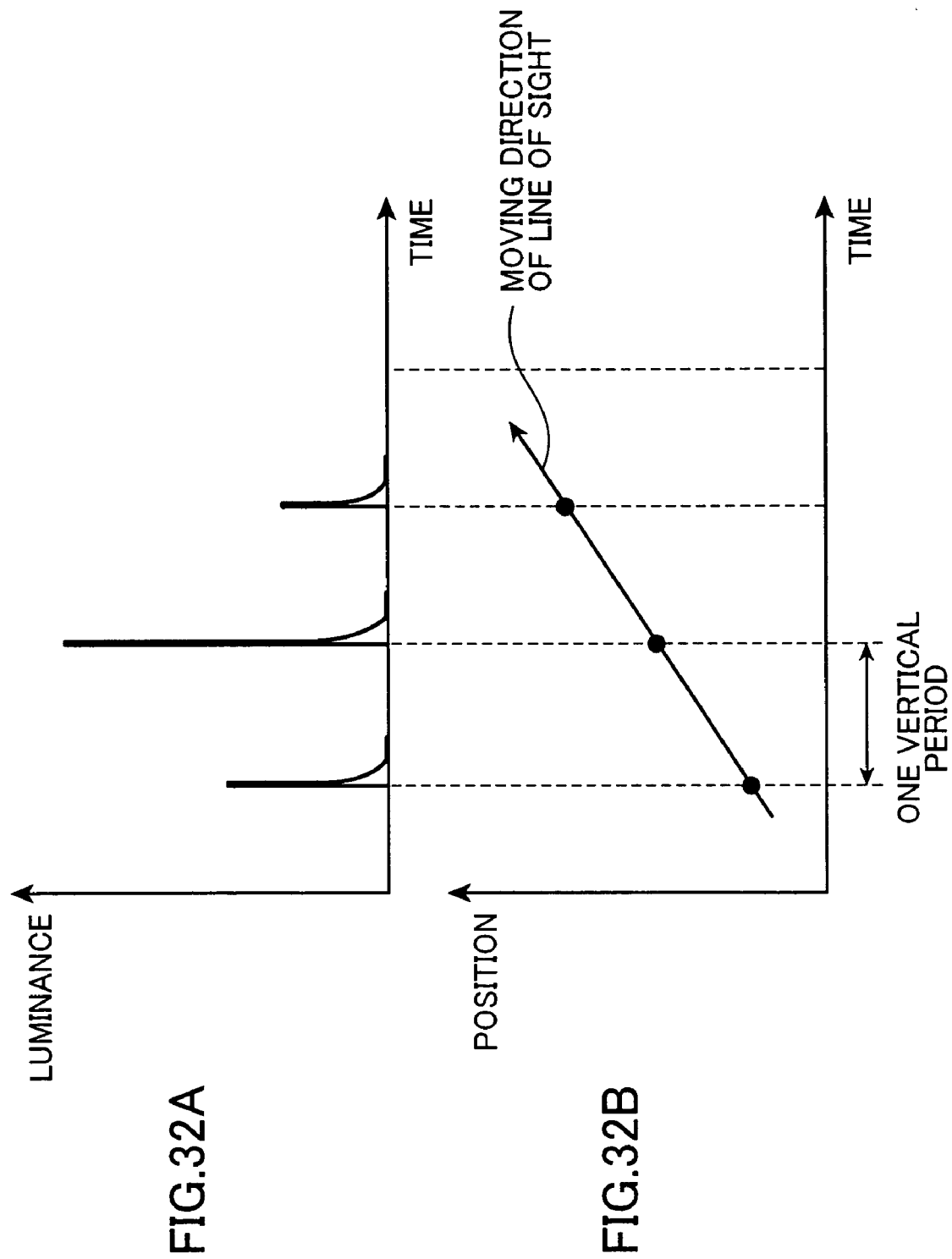
FIGS. 32A and 32B are schematic views used to describe the motion picture display capability of a CRT.
Figures 33A, 33B:
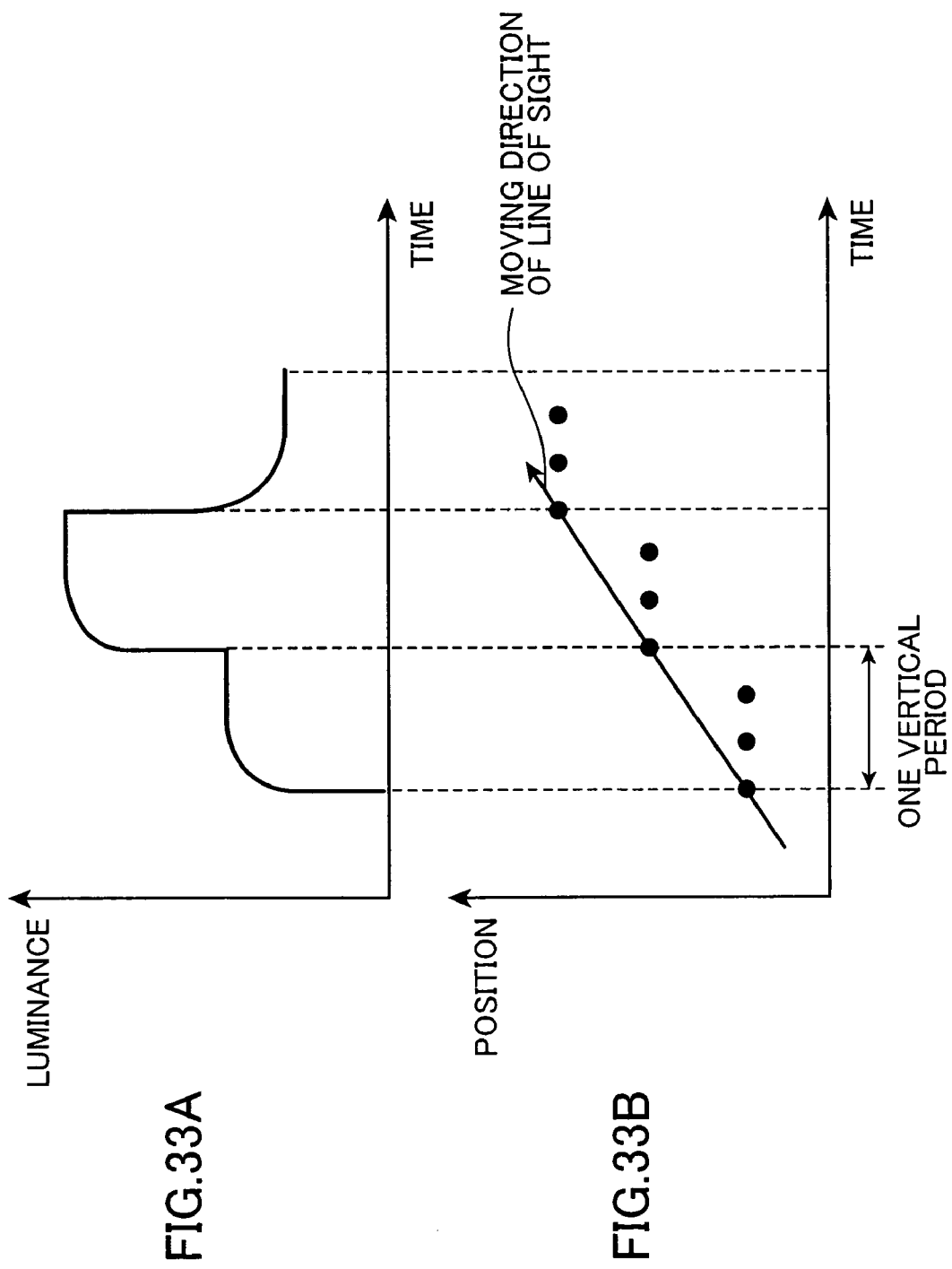
FIGS. 33A and 33B are schematic views used to describe the motion picture display capability of a liquid crystal display.
Figure 34:
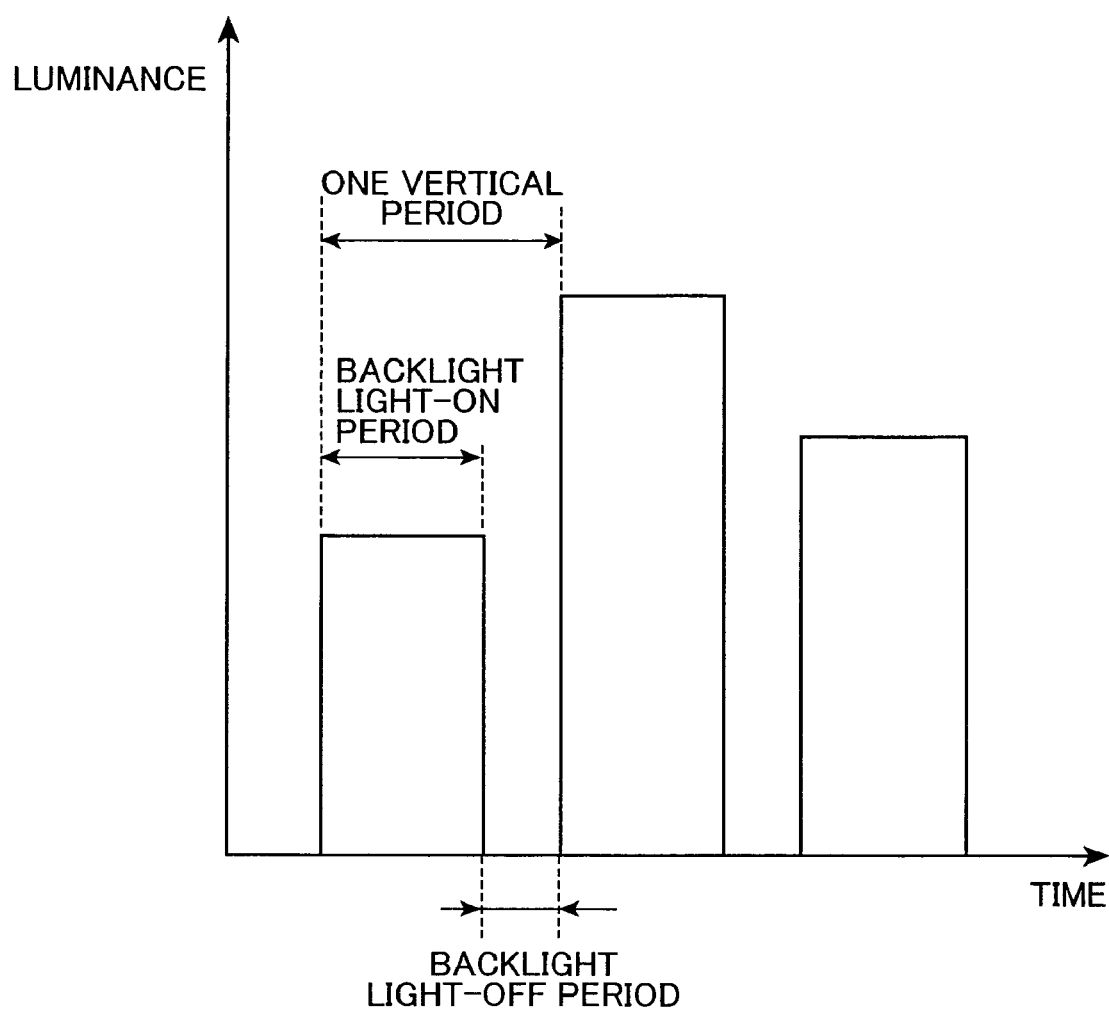
FIG. 34 is a view used to describe a display method for improving the edge blur.
Figure 35A:
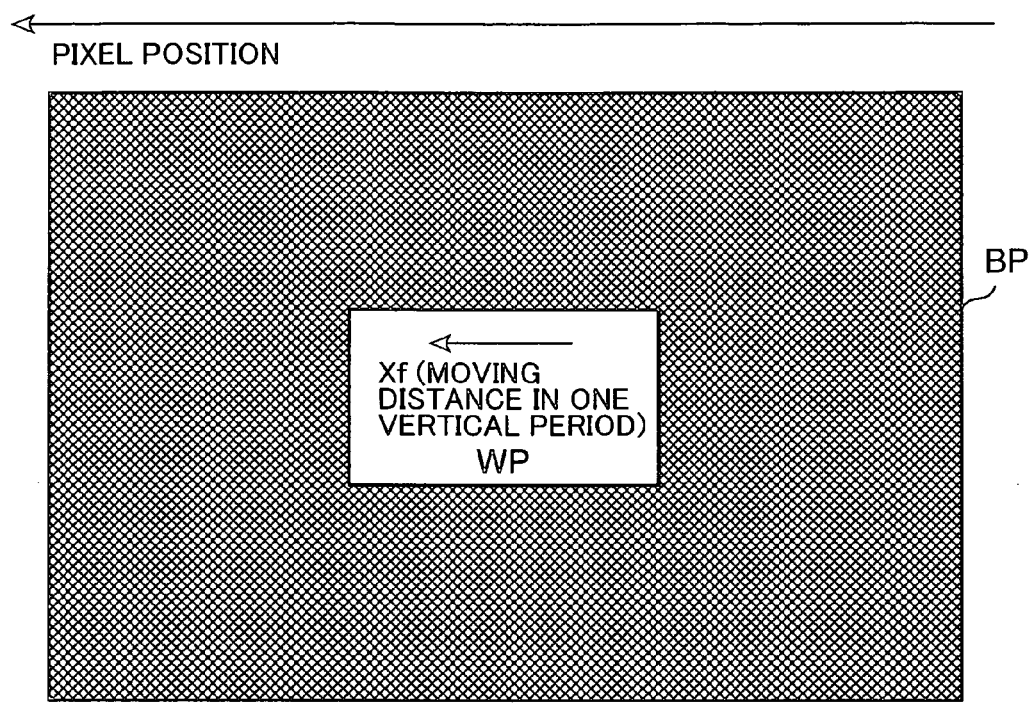
FIGS. 35A and 35B are views showing an example of a display pattern to evaluate the effect of black insertion dimming by the backlight.
Figure 35B:
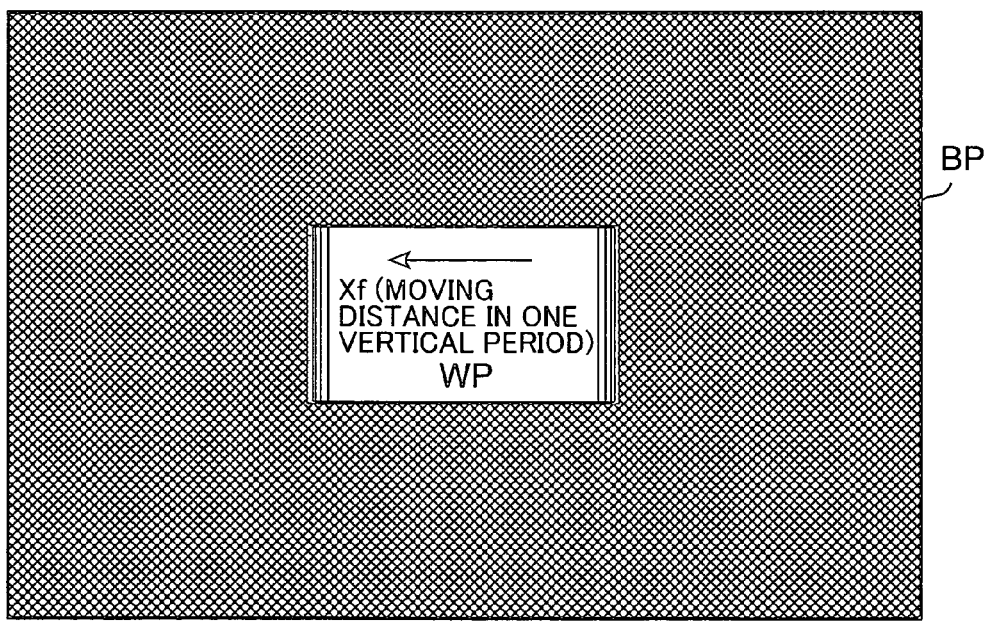
Figure 38:
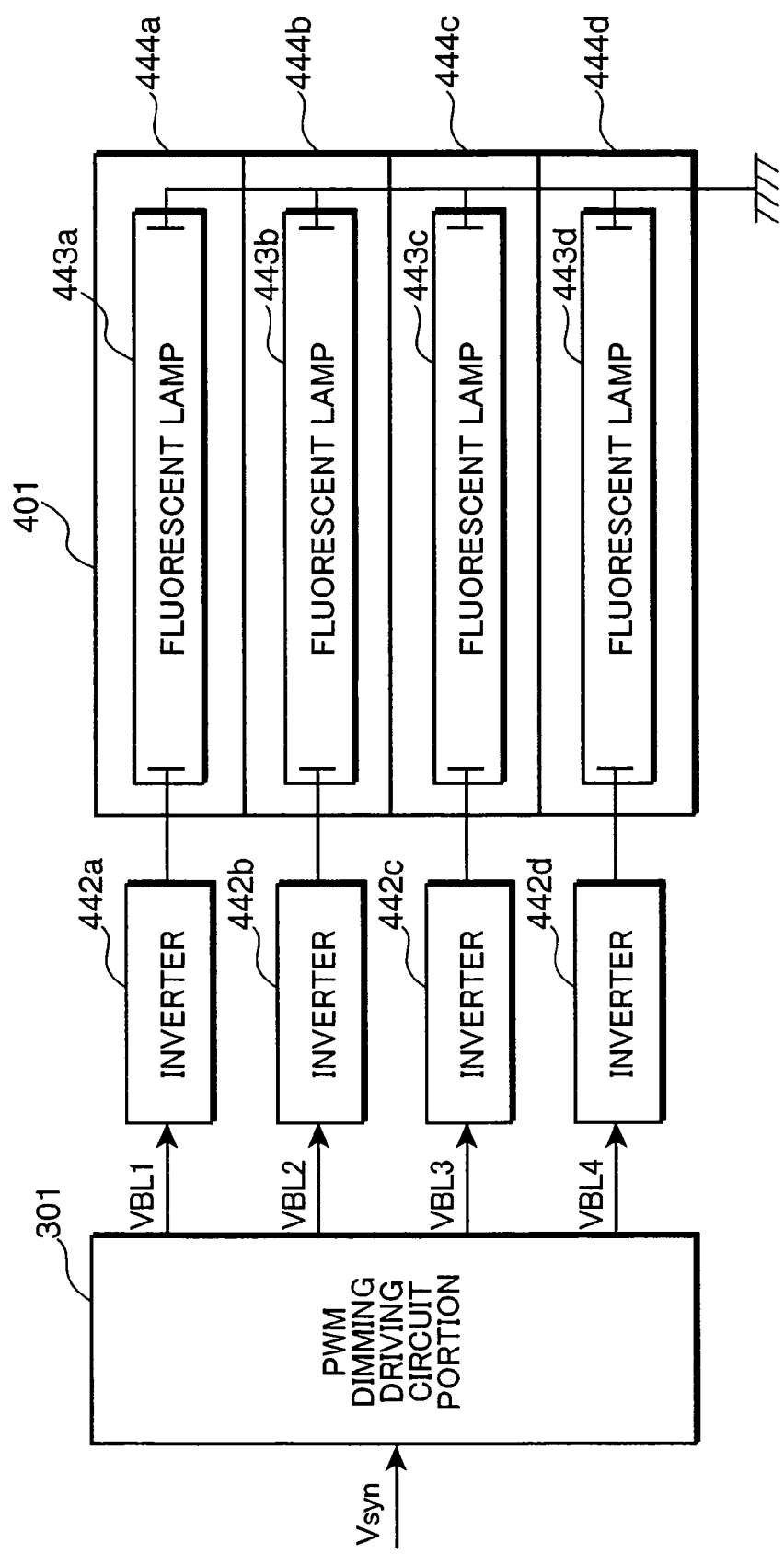
FIG. 38 is a block diagram showing the configuration of a major portion of a liquid crystal display in the related art for improving non-uniformity of the edge blur.

As are shown in FIG. 28A through FIG. 28C, the ½ frequency-divided signal 2Tv outputted from the ½ frequency-dividing circuit 62 and the divide-by-11 synchronization signal 2/11Tv outputted from the divide two vertical periods by 11 circuit 64 are outputted in the same manner as FIG. 27.

Subsequently, as are shown in FIG. 28D and FIG. 28E, the pulse count circuit 35a receives the luminance dimming light-ON duty data LD from the system control circuit 22 and the divide-by-11 synchronization signal 2/11Tv, and outputs the light-ON start timing signal Pr1 having the start timing of the OFF period same as the synchronization timing of the divide-by-11 synchronization signal 2/11Tv and the light-ON period determined according to the light-ON duty data LD. The pulse count circuit 35b outputs the light-ON start timing signal Pr2 having the start timing of the ON period same as the synchronization timing of the divide-by-11 synchronization signal 2/11Tv in a case where the synchronization timing of the divide-by-11 synchronization signal 2/11Tv in the first-half vertical period of the two vertical period frequency-divided by the ½ frequency-dividing circuit 62 as the second-half vertical period and the light-OFF period determined according to the light-ON duty data LD.

Subsequently, as are shown in FIG. 28F and FIG. 28G, the PWM generation circuits 36a and 36b respectively receive the light-ON start timing signal Pr1 and the light-OFF start timing signal Pr2 as well as the divide-by-11 synchronization signal 2/11Tv, and respectively output the PWM dimming pulses Vpwm1 and Vpwm2 having the pulse width D during the ON period (light-ON period).

Subsequently, as is shown in FIG. 28H, the selector 63 receives the PWM dimming pulses Vpwm1 and Vpwm2 and the ½ frequency-divided signal 2Tv, and outputs the PWM dimming pulse Vpwms by switching the PWM dimming pulses Vpwm1 and Vpwm2 per vertical period so that one vertical period starts with the start timing of the ON period or the OFF period.

Subsequently, as is shown in FIG. 28I, the pulse count circuit 37 in the black insertion dimming PWM generation portion 32 receives the vertical synchronization signal Vsyn and the black insertion duty data BD, and outputs the light-ON start timing signal PrBL to generate the black insertion PWM pulse that starts the black insertion period in sync with the vertical synchronization signal Vsyn and has the black insertion period corresponding to the black insertion duty data BD. The PWM generation circuit 38 receives the vertical synchronization signal Vsyn and the light-ON start timing signal PrBL, and outputs the black insertion PWM pulse VBL that starts the black insertion period in sync with the vertical synchronization signal Vsyn and ends the black insertion period in sync with the light-ON start timing signal PrBL. The black insertion PWM pulse VBL to perform the black insertion dimming by the backlight for improving the motion picture visibility during the display of a motion picture is generated in this manner.

Subsequently, as is indicated by a broken line of FIG. 28I, the AND circuit 33 outputs the inverter driving signal Vout1 by superimposing the dimming PWM pulse Vpwms on the pulse of the light-ON period of the black insertion PWM pulse VBL. The inverter 42 lights ON or lights OFF the fluorescent lamp 43 using the inverter driving signal Vout1.

As has been described above, in this embodiment, it is possible to provide the black insertion period of a certain period near the start point of the transition period of the liquid crystal panel 14 without being affected by the duty ratio of the dimming PWM pulse. It is therefore possible to perform the PWM dimming for adjusting the luminance of the liquid crystal panel 14 while performing concurrently the black insertion dimming by the backlight for improving the motion picture visibility during the display of a motion picture. As a consequence, in addition to the effect achieved by the backlight dimming operation shown in FIGS. 18A through 18H, the motion picture visibility can be enhanced further.

The embodiments described above can be combined in an arbitrary manner when the need arises. For example, in the second embodiment, the PWM dimming driving circuit portion 3 shown in FIG. 5 can be replaced with the PWM dimming driving circuit portion 3d shown in FIG. 23 or the PWM dimming driving circuit portion 3e shown in FIG. 26.

In this case, the inverter driving signal Vout1 generated as is shown in FIGS. 24A through 24H or FIGS. 27A through 27I and the inverter driving signals Vout2 through Vout4 generated by delaying the phase of the inverter driving signal Vout1 successively by the ¼ vertical period delay circuits 5a through 5c of three stages are inputted into the inverters 42a through 42d, respectively, to dim the fluorescent lamps 43a through 43d independently.

Hence, regarding the inverter driving signal Vout1 at the first stage, it is possible to prevent or improve a flicker effectively as has been described in the sixth embodiment or the seventh embodiment. Moreover, no whisker-shaped pulse caused by interferences with the black insertion PWM pulse will be generated. In addition, because the phases of the inverter driving signals Vout2 through Vout4 are merely shifted as a whole, it is also possible to prevent or improve a flicker within the fluorescent lamps 43b through 43d that are dimmed by the respective PWM dimming pulses, and no whisker-shaped pulses caused by interferences with the black insertion PWM pulse will be generated.

Because the light-ON period and the light-OFF period are provided once within one vertical period in the inverter driving signals Vout1 through Vout4, and the phases are delayed by ¼ of one vertical period with respect to one another, the blinking timings of the four fluorescent lamps 43a through 43d are in sync with a display on the liquid crystal panel 14. Hence, not only is it possible to prevent the edge blur from becoming inhomogeneous during the display of a motion picture, but it is also possible to improve the motion picture visibility across the entire screen.

In the embodiments described above, because the light-emission region (fluorescent lamp) is divided by four and dimmed independently, a ¼ vertical period delay circuit is used as the delay circuit. It should be appreciated, however, that when the light-emission region is divided by M (M=1, 2, 3, and so forth), the inverter driving signal Vout1 is delayed (M−1) times using 1/M vertical period delay circuit.

According to the liquid crystal display of the invention, when configured according to the embodiments as described above, black insertion dimming of the light source is enabled or the backlight is lit ON successively in order to enhance the motion picture capability, while the generation of a whisker-shaped pulse caused by the interleave driving performed to suppress a flicker when the luminance dimming is performed by the PWM dimming can be suppressed. It is therefore possible to forestall a malfunction and a braking of the backlight light-ON circuit. The invention is therefore useful to a device, such as a liquid crystal TV, that needs dimming at a high luminance contrast ratio by the PWM dimming.

As has been described, a liquid crystal display of the invention includes: a liquid crystal panel; a panel driving portion for driving the liquid crystal panel; a light source provided on a back surface of the liquid crystal panel; and light source driving portion for driving the light source in such a manner that a black insertion period during which the light source is lit OFF and a light-ON period during which the light source is lit ON are provided within one vertical period and PWM-driving the light source so as to be lit ON and lit OFF repetitively during the light-ON period.

According to this liquid crystal display, because the light source is driven in such a manner that the black insertion period during which the light source is lit OFF and the light-ON period during which the light source is lit ON are provided within one vertical period, it is possible to enhance the motion picture visibility by the black insertion dimming. At the same time, because the light source is PWM-driven so as to be lit ON and lit OFF repetitively during the light-ON period, it is possible to perform the dimming over a broad range in a stable manner at a low current without generating unwanted pulses.

It is preferable that the light source driving portion drives the light source in such a manner that respective periods are provided in sync with a vertical synchronization signal in order of the black insertion period and the light-ON period. In this case, because respective periods are provided in sync with the vertical synchronization signal in order of the black insertion period and the light-ON period, the black insertion period can be inserted at a phase such that makes the MPRT value satisfactory, which can in turn enhance the motion picture visibility further.

It is preferable that the light source driving portion drives the light source in such a manner that a transition period of transmittance of the liquid crystal panel overlaps the black insertion period when the liquid crystal panel is driven by the panel driving portion. In this case, because the transition period of the transmittance of the liquid crystal panel overlaps the black insertion period, it is possible to lessen the overlapping of the stationary period of the transmittance of the liquid crystal panel and the black insertion period. Hence, because as much light from the light source as possible is allowed to pass through during the stationary period, not only is it possible to display an image corresponding to the panel transmittance in a satisfactory manner, but it is also possible to insert the black insertion period at a phase such that makes the MPRT value satisfactory, which can in turn enhance the motion picture visibility further.

It is preferable that the light source driving portion drives the light source in such a manner that the black insertion period starts near a start point of a transition period of transmittance of the liquid crystal panel driven by the panel driving portion. In this case, because the black insertion period can be inserted at a phase such that makes the MPRT value most satisfactory, the motion picture visibility can be enhanced further.

It is preferable that the light source includes M light sources provided, respectively, in divided regions obtained by dividing the liquid crystal panel by M in a vertical direction, and the light source driving portion drives the M light sources in such a manner that the black insertion period and the light-ON period are provided within one vertical period while being delayed by a 1/M cycle of a vertical synchronization signal with respect to one to another and PWM-drives the M light sources so as to be lit ON and lit OFF repetitively during the light-ON period.

In this case, because the black insertion period during which the respective light sources are lit OFF and the light-ON period during which the light sources are lit ON are provided within one vertical period and the black insertion period can be inserted at a phase such that makes the motion picture visibility satisfactory for the M light sources, it is possible to enhance the motion picture visibility across the entire liquid crystal panel. In addition, because the light sources are PWM-driven so as to be lit ON and lit OFF repetitively during the respective light-ON periods, it is possible to perform the dimming over a broad range in a stable manner at a low current without generating unwanted pulses.

It is preferable that the light source driving portion drives the M light sources in such a manner that a percentage of the black insertion period in one vertical period is equal to (M−2)/M or less (M is an integer equal to 3 or greater). In this case, irregular motion picture blur can be improved, which can in turn enhance the motion picture visibility further.

It is preferable that the light source driving portion drives the M light sources in such a manner that a percentage of the black insertion period in one vertical period is 20% or greater. In this case, the motion picture blur can be improved, which can in turn enhance the motion picture visibility further.

It is preferable that the light source includes four light sources provided, respectively, in divided regions obtained by dividing the liquid crystal panel by four in a vertical direction, and that the light source driving portion drives the four light sources in such a manner that a percentage of the black insertion period in one vertical period is 20% or greater and 50% or less with a delay of a ¼ cycle of the vertical synchronization signal with respect to one to another and PWM-drives the four light sources so as to be lit ON and lit OFF repetitively during the light-ON period. In this case, four light sources can be dimmed in a suitable manner.

It is preferable that the light source includes eight light sources provided, respectively, in divided regions obtained by dividing the liquid crystal panel by eight in a vertical direction, and that the light source driving portion drives the eight light sources in such a manner that a percentage of the black insertion period in one vertical period is 20% or greater and 75% or less with a delay of a ⅛ cycle of the vertical synchronization signal with respect to one to another and PWM-drives the eight light sources so as to be lit ON and lit OFF repetitively during the light-ON period. In this case, eight light sources can be dimmed in a suitable manner.

It is preferable that the light source driving portion includes: a first signal generation portion for generating a black insertion signal having the black insertion period and the light-ON period within one vertical period in sync with a vertical synchronization signal; a second signal generation portion for generating a dimming PWM signal in sync with the vertical synchronization signal; a limiting portion for generating a limiting black insertion signal that limits the black insertion period in the black insertion signal in such a manner that a pulse width of a narrow pulse having a pulse width narrower than a pulse width of the PWM signal among plural pulses generated from an AND of the black insertion signal and the PWM signal will not become smaller than a specific value; and a driving portion for driving the light source using a composite signal generated from an AND of the PWM signal and the limiting black insertion signal.

In this case, the limiting black insertion signal is generated, which signal limits the black insertion period in the black insertion signal in such a manner that the pulse width of a narrow pulse having a pulse width narrower than the pulse width of the PWM signal among plural pulses generated from an AND of the black insertion signal and the PWM signal will not become smaller than a specific value, and the light source is driven using a composite signal generated from the AND of the PWM signal and the limiting black insertion signal. The pulse width of the narrow pulse can be therefore limited to the pulse width of the specific value or greater. It is thus possible to perform the dimming over a broad range in a stable manner at a low current without generating unwanted pulses.

Also, a driving method of the invention is a driving method of driving a light source provided on a back surface of a liquid crystal panel, wherein the light source is driven in such a manner that a black insertion period during which the light source is lit OFF and a light-ON period during which the light source is lit ON are provided within one vertical period and the light source is PWM-driven so as to be lit ON and lit OFF repetitively during the light-ON period.

According to this driving method, because the light source is driven in such a manner that the black insertion period during which the light source is lit OFF and the light-ON period during which the light source is lit ON are provided within one vertical period, it is possible to enhance the motion picture visibility by the black insertion dimming. At the same time, because the light source is PWM-driven so as to be lit ON and lit OFF repetitively during the light-ON period, it is possible to perform the dimming over a broad range in a stable manner at a low current without generating unwanted pulses.

INDUSTRIAL APPLICABILITY

According to the liquid crystal display of the invention, not only is it possible to enhance the motion picture visibility, but it is also possible to perform the dimming over a broad range in a stable manner at a low current without generating unwanted pulses. The liquid crystal display of the invention is therefore useful as a liquid crystal display having a light source provided on the back surface of the liquid crystal panel.

The invention claimed is:

1. A liquid crystal display comprising:
   a liquid crystal panel;
   a panel driving portion for driving the liquid crystal panel;
   a light source provided on a back surface of the liquid crystal panel; and
   a light source driving portion for driving the light source in such a manner that a black insertion period during which the light source is turned OFF and a light-ON period during which the light source is turned ON are provided within one vertical period and PWM-driving the light source so as to be turned ON and turned OFF repetitively during the light-ON period, wherein:
   the light source includes M light sources provided, respectively, in divided regions obtained by dividing the liquid crystal panel by M in a vertical direction; and
   the light source driving portion drives the M light sources in such a manner that the black insertion period and the light-ON period are provided within the one vertical period while being delayed by a 1/M cycle of a vertical synchronization signal with respect to one to another, and PWM-drives the M light sources so as to be turned ON and turned OFF repetitively during the light-ON period.

2. The liquid crystal display according to claim 1, wherein:
   the light source driving portion drives each of the M light sources in such a manner that respective periods are provided in sync with the vertical synchronization signal in order of the black insertion period and the light-ON period.

3. The liquid crystal display according to claim 1, wherein:
   the light source driving portion drives each of the M light sources in such a manner that a transition period of transmittance of the liquid crystal panel overlaps the black insertion period when the liquid crystal panel is driven by the panel driving portion.

4. The liquid crystal display according to claim 1, wherein:
   the light source driving portion drives each of the M light sources in such a manner that the black insertion period starts near a start point of a transition period of transmittance of the liquid crystal panel driven by the panel driving portion.

5. The liquid crystal display according to claim 1, wherein:
   the light source driving portion drives the M light sources in such a manner that a percentage of the black insertion period in one vertical period is equal to (M−2)/M or less, M being an integer equal to 3 or greater.

6. The liquid crystal display according to claim 1, wherein:
   the light source driving portion drives the M light sources in such a manner that a percentage of the black insertion period in one vertical period is 20% or greater.

7. A liquid crystal display comprising:
   a liquid crystal panel;
   a panel driving portion for driving the liquid crystal panel;
   a light source provided on a back surface of the liquid crystal panel; and
   a light source driving portion for driving the light source in such a manner that a black insertion period during which the light source is turned OFF and a light-ON period during which the light source is turned ON are provided within one vertical period and PWM-driving the light source so as to be turned ON and turned OFF repetitively during the light-ON period, wherein:
   the light source includes four light sources provided, respectively, in divided regions obtained by dividing the liquid crystal panel by four in a vertical direction; and
   the light source driving portion drives the four light sources in such a manner that a percentage of the black insertion period in the one vertical period is 20% or greater and 50% or less with a delay of a ¼ cycle of a vertical synchronization signal with respect to one to another, and PWM-drives the four light sources so as to be turned ON and turned OFF repetitively during the light-ON period.

8. A liquid crystal display comprising:
   a liquid crystal panel;
   a panel driving portion for driving the liquid crystal panel;
   a light source provided on a back surface of the liquid crystal panel; and
   a light source driving portion for driving the light source in such a manner that a black insertion period during which the light source is turned OFF and a light-ON period during which the light source is turned ON are provided within one vertical period and PWM-driving the light source so as to be turned ON and turned OFF repetitively during the light-ON period, wherein:
   the light source includes eight light sources provided, respectively, in divided regions obtained by dividing the liquid crystal panel by eight in a vertical direction; and
   the light source driving portion drives the eight light sources in such a manner that a percentage of the black insertion period in the one vertical period is 20% or greater and 75% or less with a delay of a ⅛ cycle of a vertical synchronization signal with respect to one to another, and PWM-drives the eight light sources so as to be turned ON and turned OFF repetitively during the light-ON period.

9. A liquid crystal display comprising:
   a liquid crystal panel;
   a panel driving portion for driving the liquid crystal panel;
   a light source provided on a back surface of the liquid crystal panel; and
   a light source driving portion for driving the light source in such a manner that a black insertion period during which the light source is turned OFF and a light-ON period during which the light source is turned ON are provided within one vertical period and PWM-driving the light source so as to be turned ON and turned OFF repetitively during the light-ON period, wherein the light source driving portion includes:
   a first signal generation portion for generating a black insertion signal having the black insertion period and the light-ON period within the one vertical period in sync with a vertical synchronization signal;
   a second signal generation portion for generating a dimming PWM signal in sync with the vertical synchronization signal;
   a limiting portion for generating a limiting black insertion signal that limits the black insertion period in the black insertion signal in such a manner that a pulse width of a narrow pulse having a pulse width narrower than a pulse width of the PWM signal among plural pulses generated from an AND of the black insertion signal and the PWM signal will not become smaller than a specific value; and a driving portion for driving the light source using a composite signal generated from the AND of the PWM signal and the limiting black insertion signal.

10. A driving method of driving M light sources provided on a back surface of a liquid crystal panel, respectively, in divided regions obtained by dividing the liquid crystal panel by M in a vertical direction, comprising:

driving the M light sources in such a manner that a black insertion period during which the M light sources are turned OFF and a light-ON period during which the M light sources are turned ON are provided within one vertical period while being delayed by a 1/M cycle of a vertical synchronization signal with respect to one to another, and PWM-driving the M light sources so as to be turned ON and turned OFF repetitively during the light-ON period.

11. A driving method of driving a light source provided on a back surface of a liquid crystal display panel, the driving method comprising:

driving the light source in such a manner that a black insertion period during which the light source is turned OFF and a light-ON period during which the light source is turned ON are provided within one vertical period, and PWM-driving the light source so as to be turned ON and turned OFF repetitively during the light-ON period, wherein the driving of the light source includes:

generating a black insertion signal having the black insertion period and the light-ON period within the one vertical period in sync with a vertical synchronization signal;

generating a dimming PWM signal in sync with the vertical synchronization signal;

generating a limiting black insertion signal that limits the black insertion period in the black insertion signal in such a manner that a pulse width of a narrow pulse having a pulse width narrower than a pulse width of the PWM signal among plural pulses generated from an AND of the black insertion signal and the PWM signal will not become smaller than a specific value; and driving the light source using a composite signal generated from the AND of the PWM signal and the limiting black insertion signal.

* * * * *